US006886035B2

(12) United States Patent
Wolff

(10) Patent No.: US 6,886,035 B2
(45) Date of Patent: Apr. 26, 2005

(54) DYNAMIC LOAD BALANCING OF A NETWORK OF CLIENT AND SERVER COMPUTER

(75) Inventor: James J. Wolff, Santa Barbara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 331 days.

(21) Appl. No.: 10/145,423

(22) Filed: May 13, 2002

(65) Prior Publication Data

US 2003/0126200 A1 Jul. 3, 2003

Related U.S. Application Data

(63) Continuation of application No. 09/709,254, filed on Nov. 8, 2000, now abandoned, which is a continuation of application No. 09/060,869, filed on Apr. 15, 1998, now Pat. No. 6,185,601, which is a continuation-in-part of application No. 08/905,307, filed on Aug. 1, 1997, now Pat. No. 5,999,930, which is a continuation-in-part of application No. PCT/US97/12843, filed on Aug. 1, 1997.
(60) Provisional application No. 60/023,218, filed on Aug. 2, 1996.

(51) Int. Cl.[7] .............................................. G06F 15/16
(52) U.S. Cl. ...................... 709/219; 709/203; 709/217; 709/223; 709/235; 718/104; 718/105

(58) Field of Search ................................. 709/200–203, 709/205–206, 217–219, 223–229, 235, 238–239; 718/102–105

(56) References Cited

U.S. PATENT DOCUMENTS

| | | | | |
|---|---|---|---|---|
| 5,548,724 A | * | 8/1996 | Akizawa et al. | 709/203 |
| 5,603,029 A | * | 2/1997 | Aman et al. | 709/105 |
| 5,729,685 A | * | 3/1998 | Chatwani et al. | 709/224 |
| 5,774,660 A | * | 6/1998 | Brendel et al. | 709/201 |
| 5,898,870 A | * | 4/1999 | Okuda et al. | 709/104 |
| 6,101,508 A | * | 8/2000 | Wolff | 709/223 |
| 6,185,601 B1 | * | 2/2001 | Wolff | 709/203 |

* cited by examiner

Primary Examiner—Bharat Barot

(57) ABSTRACT

Methods for load rebalancing by clients in a network are disclosed. Client load rebalancing allows the clients to optimize throughput between themselves and the resources accessed by the nodes. A network, which implements this embodiment of the invention, can dynamically rebalance itself to optimize throughput by migrating client I/O requests from over_utilized pathways to under_utilized pathways. Client load rebalancing allows a client to re-map a path through a plurality of nodes to a resource. The re-mapping may take place in response to a redirection command from an overloaded node.

19 Claims, 46 Drawing Sheets

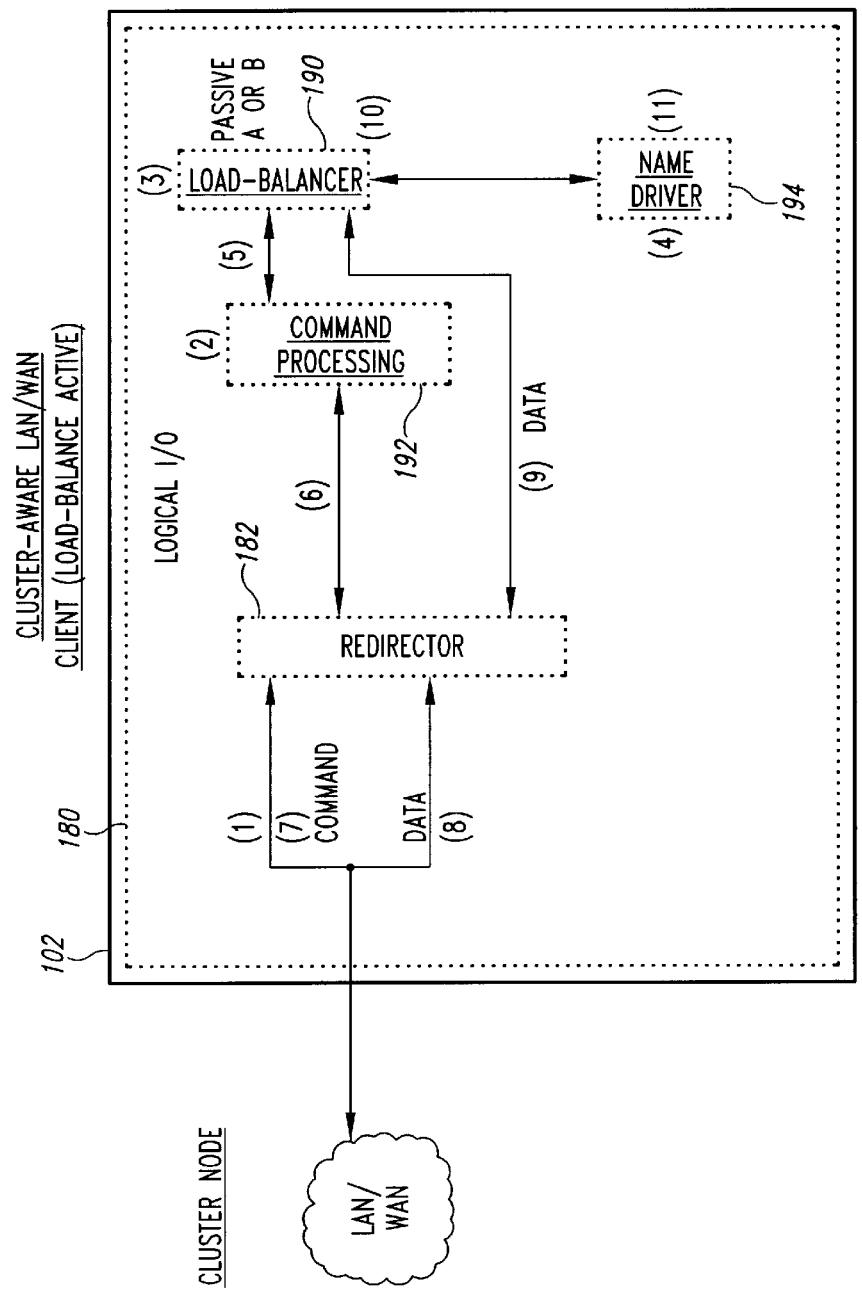

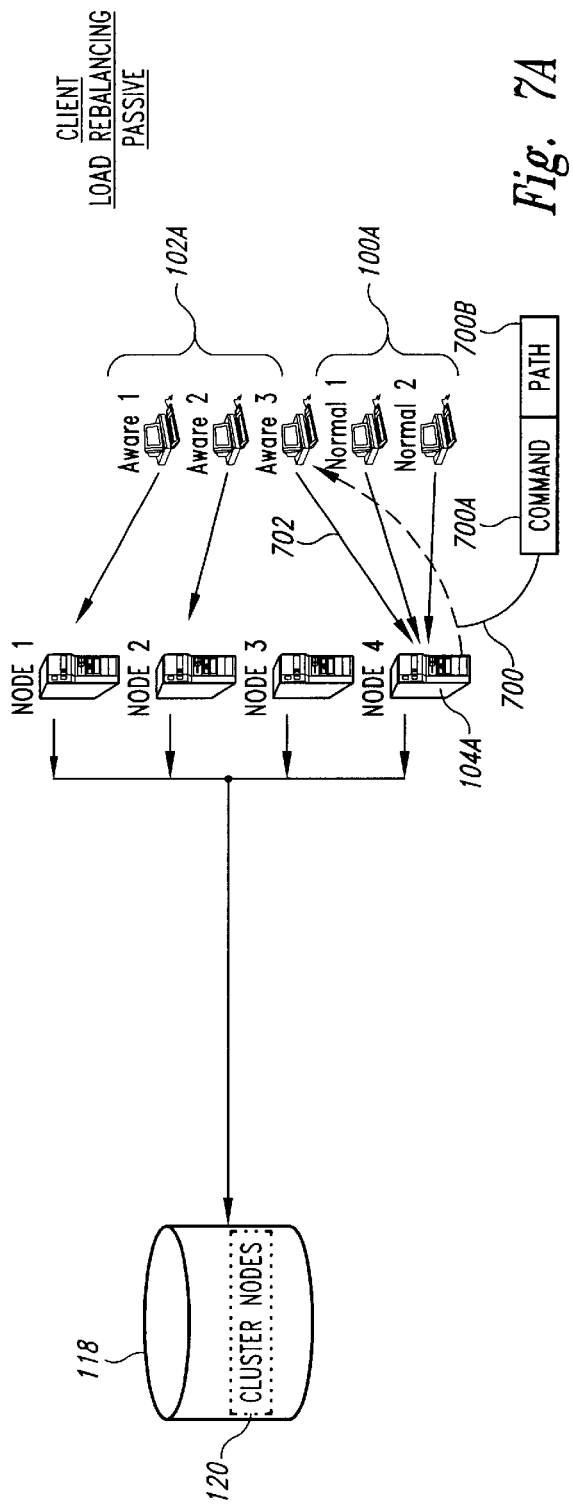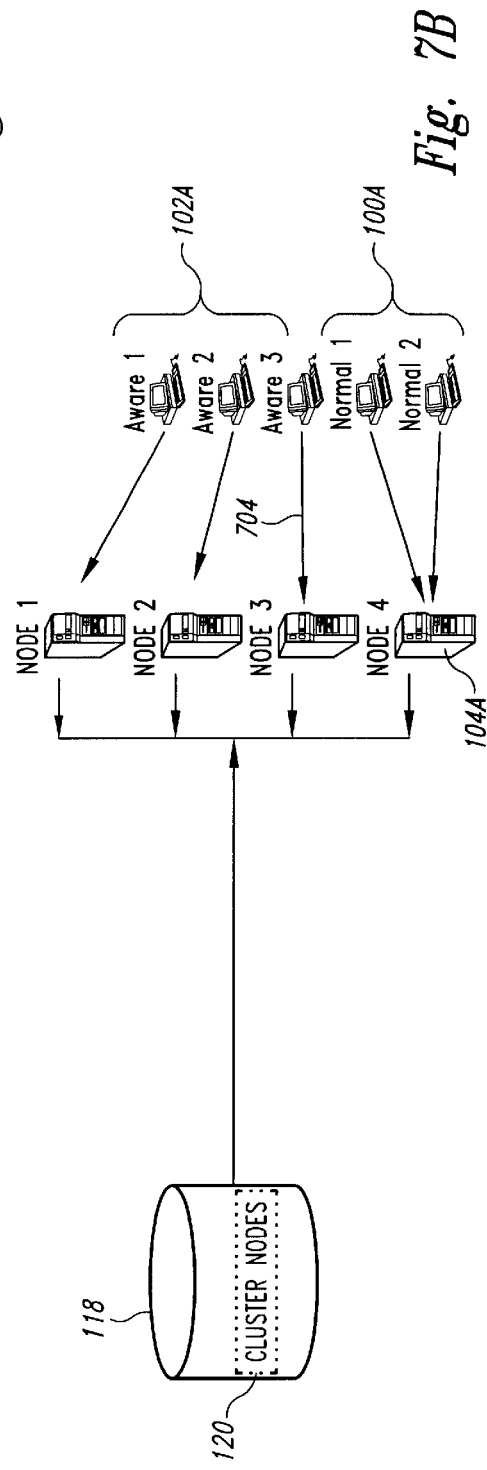

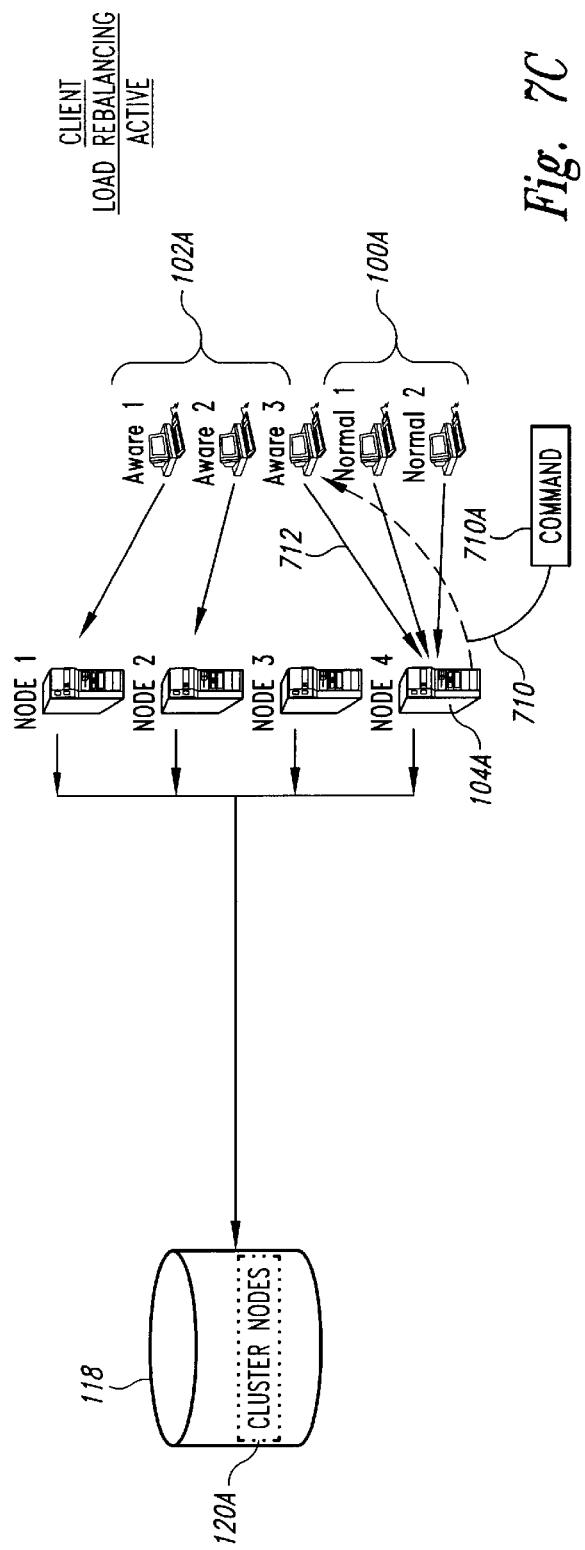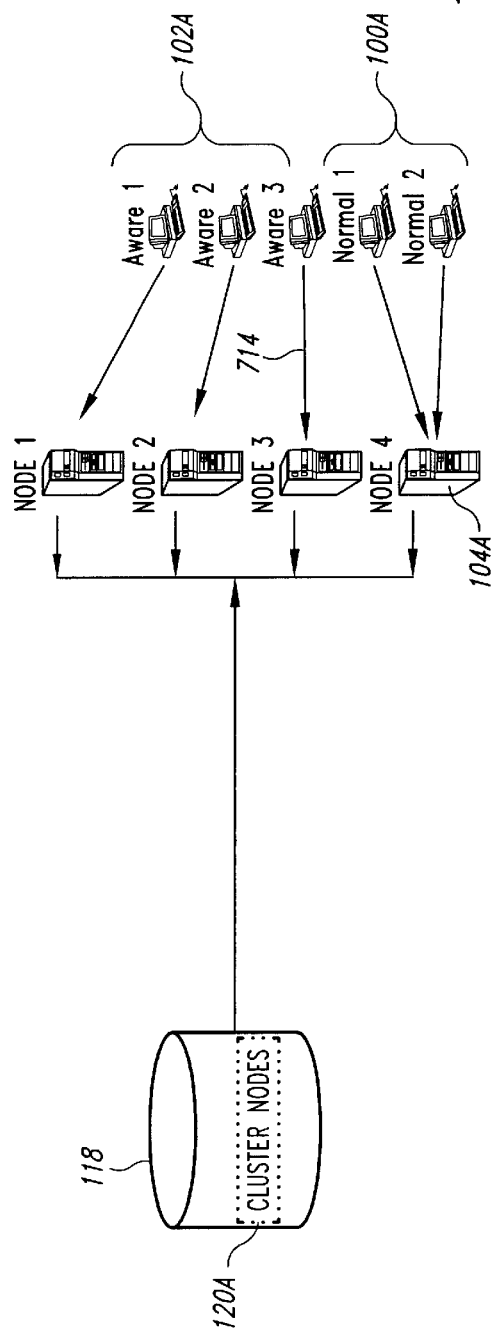

RESOURCE REBALANCING

DYNAMIC LOAD BALANCING OF A NETWORK OF CLIENT AND SERVER COMPUTER

CROSS-REFERENCE TO RELATED APPLICATIONS

This application is a continuation of U.S. application Ser. No. 09/704,254, filed Nov. 8, 2000 now abandoned which is a continuation of U.S. application Ser. No. 09/060,869, filed Apr. 15, 1998 now U.S. Pat. No. 6,185,601.

This application is a continuation-in-part of U.S. application Ser. No. 08/905,307 filed Aug. 1, 1997, now U.S. Pat. No. 5,999,930, entitled "Method and Apparatus for Distributed Control of a Shared Storage Volume" by inventor James J. Wolff, and claims the benefit of prior filed copending Provisional Application No. 60/023,218 filed on Aug. 2, 1996. The present application is related to U.S. patent application Ser. No. 08/905,287, filed Aug. 1, 1997, now U.S. Pat. No. 6,076,104, entitled "Distributed Resource and Project Management" by inventor James J. Wolff, U.S. patent application Ser. No. 08/904,828, filed Aug. 1, 1997, now U.S. Pat. No. 6,009,828, entitled "Method and Apparatus for Distributed Control of a Database" by inventor James J. Wolff, and International Application No. PCT/US97/12843 filed Aug. 1, 1997, entitled "Method and Apparatus for Allowing Distributed Control of Shared Resources" by inventors James J. Wolff and David Lathrop. Each of the above-cited applications is incorporated herein by reference in its entirety.

BACKGROUND OF THE INVENTION

1. Field of the Invention

The field of the present invention relates generally to a system for distributing the I/O request load over the components of a network. More particularly, the field of the invention relates to distributing the responsibility for carrying out I/O requests among various servers on a network.

2. Related Art

For a number of decades, information has been shared among computers in many various forms. A popular form that has developed is the network filesystem which almost universally have four capabilities: 1) They share a view of a filesystem among multiple computers and allow normal file operations to be performed by them; 2) They have security to control who can do what to the filesystem; 3) They have byte-level file range locking which allows a method for multiple independent users of the file to coordinate changes to the file maintaining coherency and; 4) They often are functional in a heterogeneous computing environment allowing different computers and different operating systems to share the same filesystem.

File and total dataset sizes are increasing. Movement from analog to digital storage and manipulation of information and media continues to grow. Sustained bandwidth of storage are also increasing. Personal computers with enormous processing power are increasingly affordable.

Computer Networks require file servers which frequently operate under the client/server paradigm. Under this paradigm multiple clients make I/O requests which are directed to a particular resource on the network. A server on the network receives and carries out the I/O requests. When a server receives multiple I/O requests the server queues them and then services them one at a time. Once a queue begins to accumulate, subsequent I/O requests must sit in the queue until the previous I/O requests are serviced. As a result, the server can become a bottleneck in the network.

A single server in the network frequently manages the data structures for files corresponding to a particular resource. This arrangement prevents modification of the files corresponding to a resource by multiple servers. Such a modification would cause the file system to become corrupt since there would be no means of maintaining the data structures in a logical and coherent manner. As a result, a single server receives the I/O requests for a particular resource. If that resource is being heavily used, the server can develop a substantial queue of I/O request while other servers on the network remain idle.

The use of a single server for managing files for a resource can also create network problems when the single server crashes and is no longer active on the network. Some networks will lose access to the resource in response to the crash. Other networks include a back up server which becomes engaged to manage the files previously managed by the crashed server. The backup server may also be subject to crashing. Further, the backup server is required to manage the I/O requests of two servers increasing the opportunity for the backup server to create a bottleneck or crash.

What is needed is an improved system and method for distributed processing over a network. Such a system would remove the bottlenecks and disadvantages associated with current distributed networks, while at the same time maintaining its advantages. Such a system would further allow the distribution of processes to function and be managed in a cross platform environment.

SUMMARY OF THE INVENTION

Methods for load rebalancing by clients in a network are disclosed. Client load rebalancing allows the clients to optimize throughput between themselves and the resources accessed by the nodes. A network which implements this embodiment of the invention can dynamically rebalance itself to optimize throughput by migrating client I/O requests from overutilized pathways to underutilized pathways.

Client load rebalancing refers to the ability of a client enabled with processes in accordance with the current invention to remap a path through a plurality of nodes to a resource. The remapping may take place in response to a redirection command emanating from an overloaded node, e.g. server. These embodiments disclosed allow more efficient, robust communication between a plurality of clients and a plurality of resources via a plurality of nodes. Resources can include but are not limited to computers, memory devices, imaging devices, printers and data sets. A data set can include a database or a file system for example.

In an embodiment of the invention a method for load balancing on a network is disclosed. The network includes at least one client node coupled to a plurality of server nodes, and at least one resource coupled to at least a first and a second server node of the plurality of server nodes. The method comprises the acts of:

receiving at a first server node among the plurality of server nodes a request for the at least one resource;

determining a utilization condition of the first server node; and re-directing subsequent requests for the at least one resource to a second server node among the plurality of server nodes in response to the determining act.

In another embodiment of the invention the method comprises the acts of:

sending an I/O request from the at least one client to the first server node for the at least one resource;

determining an I/O failure of the first server node; and re-directing subsequent requests from the at least one client for the at least one resource to an other among the plurality of server nodes in response to the determining act.

In still another embodiment of the invention a method for load balancing on a network is disclosed. The the network includes at least one client node coupled to a plurality of server nodes and at least a first and a second resource coupled to respectively a first and a second server node among the plurality of server nodes. The method comprises the acts of:

receiving at the first server node a request from the at least one client node for the first resource;

determining a utilization condition on the first of the plurality of server nodes; and re-directing subsequent requests for the first resource to the second resource via the second server node based on a determination that the first and second resources offer similar features and in response to the determining act.

BRIEF DESCRIPTION OF THE DRAWINGS

FIGS. 4A–D show the software modules associated with respectively the handling of IOs by an aware client, the handling of a fail-over and fail-back by an aware client, and the passive and active management of load rebalancing by a client.

FIGS. 7A–D show details of alternate embodiments of client load balancing introduced above in connection with FIG. 1A.

DESCRIPTION OF THE INVENTION

The following description is presented to enable a person skilled in the art to make and use the invention, and is provided in the context of a particular application and its requirements. Various modifications to the preferred embodiment will be readily apparent to those skilled in the art and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

To deliver their promise to the majority of cost-conscious computing environments, clustered filesystems must deliver the same functionality that is common to distributed filesystems such as NFS or Novell, including support for a standard widely accepted, highly robust, on-disk filesystem structure, such as Microsoft's NTFS. Furthermore, they must clearly demonstrate applicability for use with Storage Area Networks, Clusters and System Area Networks and provide advantages in availability, scaling, symmetry, and single system image A clustered system benefits from the clustered filesystem's availability and scaling. An example would be a Web Serving application, which now can be distributed because the nodes in the cluster use the same filesystem allowing the same html pages to be accessed. Range-locking can be used to coordinate any updates in a coherent manner.

Figure 1A:
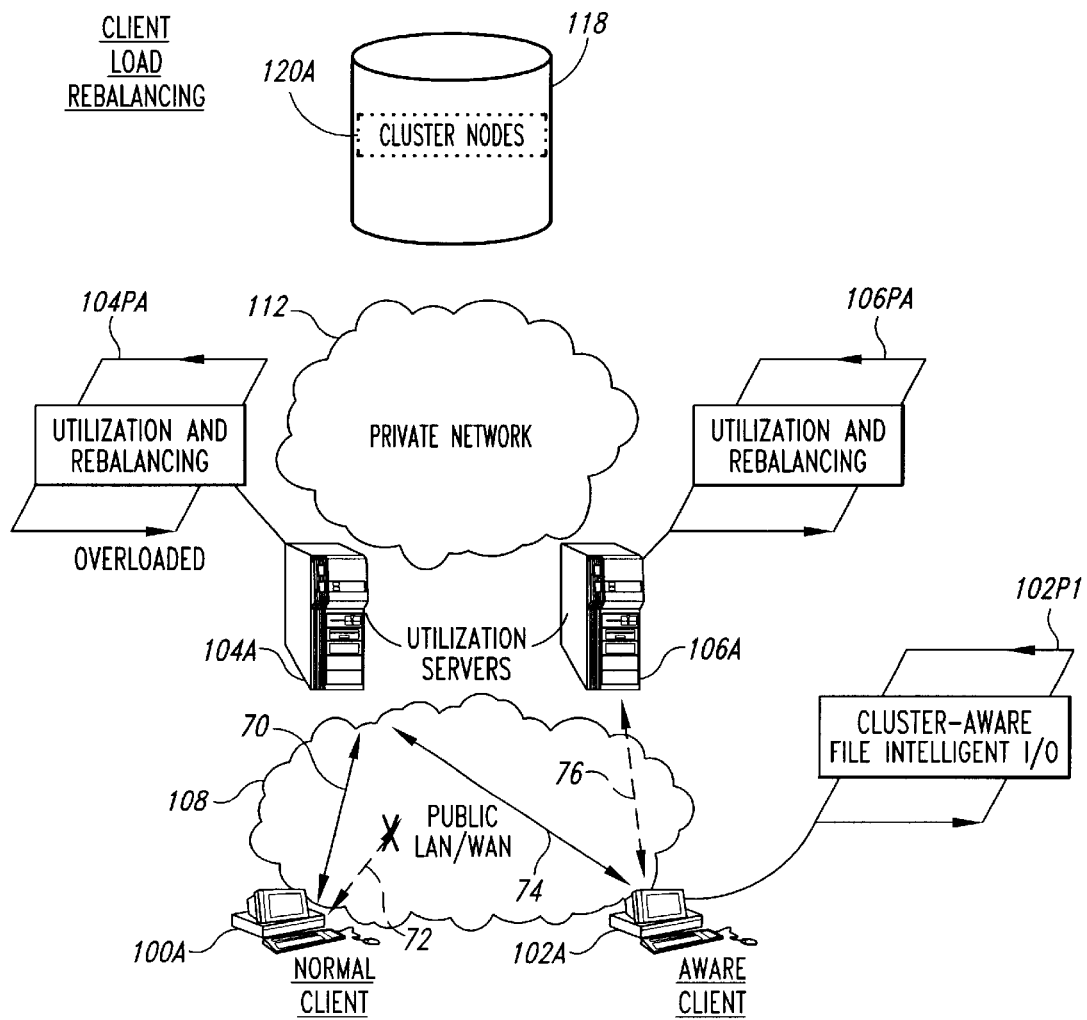
FIGS. 1A–C show alternate embodiments of the current invention for respectively, client load rebalancing, distributed I/O and resource load rebalancing.
Figure 1B:
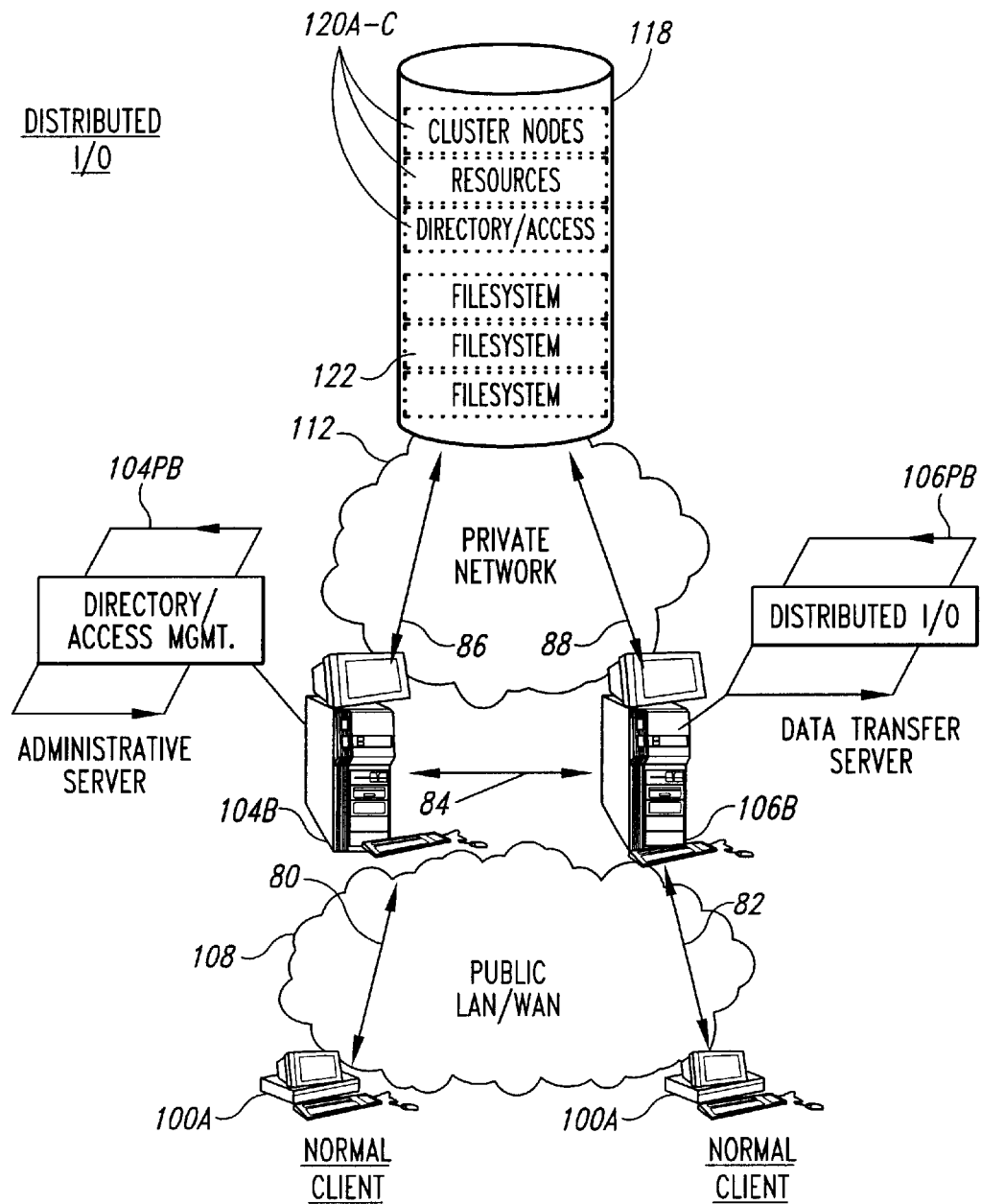
Figure 1C:
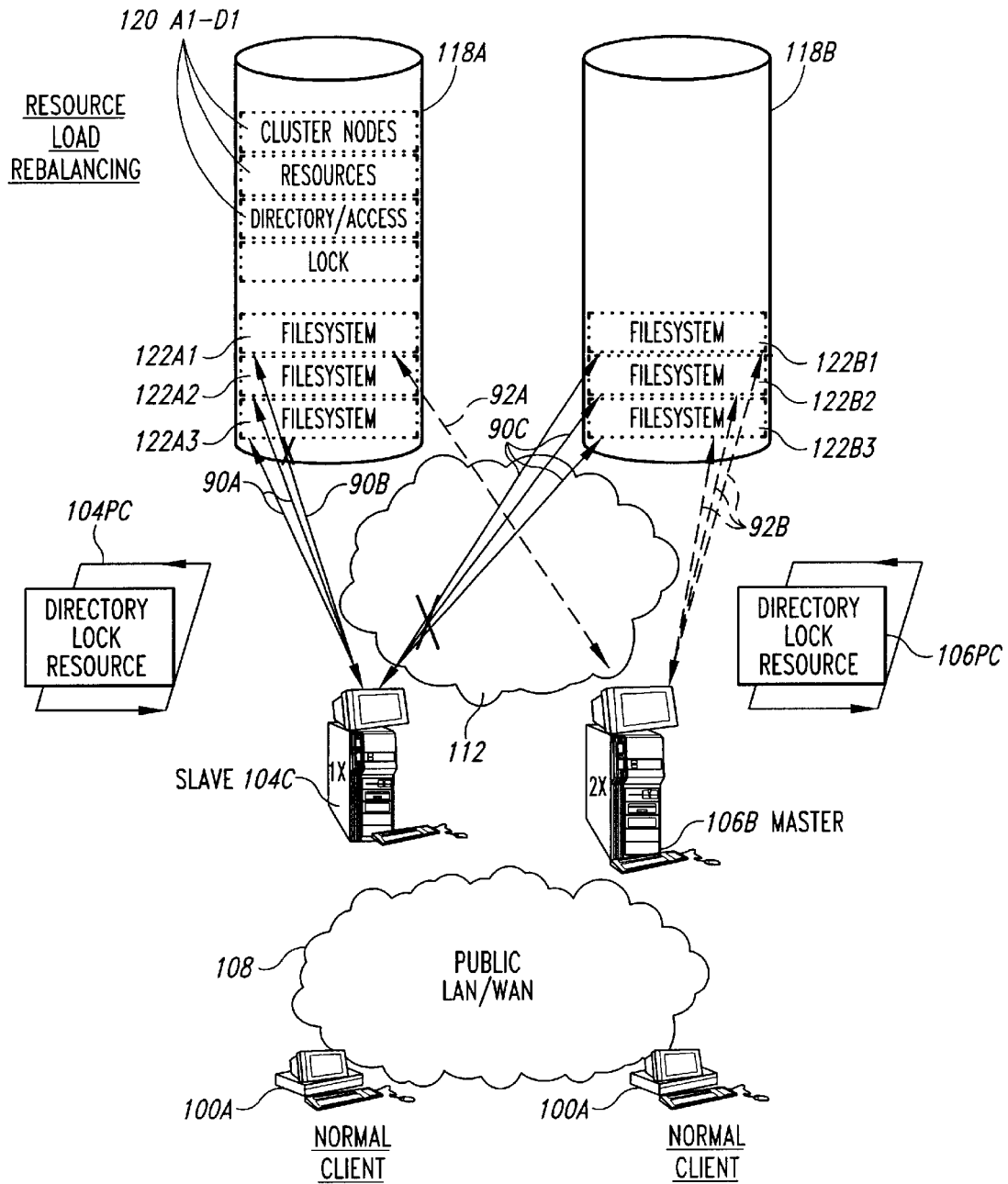

FIGS. 1A–C show alternate embodiments of the current invention for respectively, client load rebalancing, distributed Input and Output (I/O) and resource load rebalancing. These embodiments allow more efficient, robust communication between a plurality of clients and a plurality of resources via a plurality of nodes. Resources can include but are not limited to computers, memory devices, imaging devices, printers and data sets. A data set can include a database or a file system for example. Nodes can include but are not limited to computers, gateways, bridges and routers. Clients can include but are not limited to: computers, gateways, bridges, routers, phones, and remote access devices. Clients may be coupled to nodes directly over a network. Nodes may be coupled to resources individually or in combination over a network directly.

In FIG. 1A an embodiment of client load rebalancing is shown. Client load rebalancing refers to the ability of a client enabled with processes in accordance with the current invention to remap a path through a plurality of nodes to a resource. The remapping may take place in response to a redirection command emanating from an overloaded node, e.g. server. This capability allows the clients to optimize throughput between themselves and the resources accessed by the nodes. A network which implements this embodiment of the invention can dynamically rebalance itself to optimize throughput by migrating client I/O requests from overutilized pathways to underutilized pathways.

In FIG. 1A a plurality of clients interface via a plurality of nodes with a resource. A memory resource 118, nodes, e.g. utilization servers 104A–106A, and clients, e.g., a normal client 100A and an aware client 102A are shown. Servers/nodes/clustered filesystem nodes (CFNs) 104A–106A are connected to the storage resource through a private network 112. The private network can be implemented in any number of ways provided that both server 104A and server 106A can access memory resource 118. The private network can include such interfaces as small computer system interface (SCSI), fibre channel, and could be realized for example with either circuit switch protocols such as time division multiplexing (TDM) or packet switch protocols such as 802.x. Alternate implementations of private network 112 in accordance with the current invention are set forth in each of the copending applications including International Application No. PCT/US97/12843 filed Aug. 1, 1997, entitled "Method and Apparatus for Allowing Distributed Control of Shared Resources" by inventors James J. Wolff and David Lathrop at pages 9–41 and FIGS. 1–5 which are incorporated herein by reference in their entirety as if fully set forth herein.

The servers 104A–106A are both connected via a network 108 to both the normal client 100A and the aware client 102A. The network 108 may include any network type including but not limited to a packet switch local area network (LAN) such as Ethernet or a circuit switched wide area network such as the public switch telephone network (PSTN).

In operation at time T=0 normal client 100A is shown accessing memory resource 118 via path 70 through overloaded server 104. At the same time aware client 102A is shown accessing memory resource 118 via path 74 through overloaded server 104A At time T=1 processes 102P1 implemented on aware client 102A detect the overload condition of server 104A and access memory resource 118 via an alternate path 76 through server 106A. Thus, in this subsequent state the load on server 104A is reduced and the access by aware client 102A to memory resource 118 is enhanced. Normal client 100A cannot initiate the processes discussed above in connection with the aware client 102A and is unable to select itself an alternate path 72 to the underutilized server 106A.

The detection of an overload condition on servers 104A–106A can be made by respectively processes 104PA, 106PA running on the servers. Alternately the overload condition can be detected by the client, on the basis of the round trip time for communications between aware client 102A and server 104. Remapping of an alternate path can be intelligently on the basis of an overall utilization and path table or randomly on the basis of client queries to alternate nodes in response to an overload condition. In the embodiment shown in FIG. 1A, clients communicate across one network with nodes while the nodes communicate across another network with resources. As will be obvious to those skilled in the art the current invention can be applied with equal advantage on a single network on which clients, nodes, and resources coexist. Additionally, what are shown as separate clients and nodes can alternately be implemented as a single physical unit. These and other embodiments of the client load rebalancing portion of the invention will be discussed in greater detail in connection with FIGS. 7A–D, 10G, and 10I. Alternately, a second resource could have a similar feature, e.g. a mirred data set, and in this instance a determination to redirect would redirect to the second resource.

FIG. 1B shows an alternate embodiment of the current invention in which concurrent input/output through a plurality of nodes, e.g. servers, to resources, e.g. file systems 122 via memory resource 118 is provided. Concurrent access to a resource allows a higher volume of I/O traffic to the resource, while maintaining file system integrity and security. In the embodiment shown in FIG. 1B concurrent access to a resource is shown by splitting the traditional I/O request into an administrative portion and a data transfer portion. One node handles the administrative portion of all I/Os to a given resource (volume/file system) through any of the plurality of nodes while all nodes including the administrative node may concurrently handle data transfers to and from the resource.

FIG. 1B includes resources, e.g. file systems 122 located on memory resource 118; nodes, e.g. servers 104B–106B and normal clients 100A Memory resource 118 includes a configuration database 120A–C and a plurality of resources (volumes/file systems) generally file systems 122. Servers 104B–106B respectively include complementary processes 104PB–106PB for handling concurrent I/O requests from either of clients 100A for a file system resource on memory resource 118. The memory resource 118 is connected via private network 112 to both servers 104B–106B. Each of servers 104B–106B communicate with normal clients 100A via network 108.

In operation one of the servers, i.e. server 104B, is responsible for maintaining the integrity and security of the certain file systems 122 on memory resource 118, according to information stored in the configuration database 120A–C. A server that is responsible for a file system is identified as the administrative server for that file system. Each file system is assigned to be maintained by an administrative server. There is only one administrative server per resource, e.g. volume/file system, at any time. A server that is an administrative server with respect to one file system can be a data transfer server with respect to another file system. The administrative server handles the access, security, free space, and directories for the file system, e.g. the file system metadata in the form of the physical layout (on disk structure) of the file system. Both servers 104A–106A can function as data transfer servers and handle the transmission or receipt of data to or from file systems 122 from either client. Processes 104PB and 106PB use the configuration database 120A–C to determine on the basis of entries in that database, which server is performing the administrative and which the data transfer functions for each resource. When an I/O request for a resource is received by a data transfer server that server looks up the administrative server for that resource in the RAM resident dynamic version of the configuration database 120A–C and sends the I/O request to the administrative server. A response from that server in the form of a block list of actual physical sectors on the memory resource 118 allows the data transfer server to handle the actual data transfer to/from the file system resource.

The location of the data at a physical level being read from or written to the file systems 122 is determined by the server running the administrative functions for that file system, e.g. processes 104PB on server 104B. Therefore, when normal client 100A makes an I/O request via path 82 of server 106B for a file system 122 on memory resource 118 the following process in 106PB is engaged in by server 106B. Server 106B passes the I/O request via path 84 directly to the administrative server 104B. The administrative server determines if the request is from a client having access privileges to the specific file system 122. Processes 104PB then determine whether the request involves the allocation of additional free space and if that is the case allocates that free space. In the case where free space allocation requires the space to be processed (in additional to the normal metadata handling of the allocation tables), such as zeroing out sectors, that step is deferred for process 106PB to handle. Finally, the processes 104PB determine the physical location on the memory resource 118 at which the specific file system resource request, including any allocated free space, resides. Processes 104PB then pass via path 84 a block list to the processes 106PB on server 106B. Subsequent I/O requests, e.g. reads and writes, to the specific blocks on the block list are handled by server 106B via path 88 to volume/file system 122 on memory resource 118.

When client 100A makes a request via path 80 directly to the administrative server 104B for a file system 122, the I/O request is handled completely by processes 104PB. Since server 104B is both the administrative server and also has traditional I/O functional capability, the security and directory management function, as well as the data transfer function, is handled by the processes 104PB. I/O requests for the desired file system 122 are handled by server 104B via path 86.

Several embodiments of the current invention for distributing I/O functions to a resource, e.g. file systems 122; between a plurality of nodes, e.g. servers 104B–106B are described in the following FIGS. 8, 10F–G and accompanying text. Generally by allowing one server to handle the administrative management of a resource while allowing all servers including the managerial server to handle the actual passing of data associated with the I/O request allows for increased bandwidth between clients and the resource. As will be obvious to those skilled in the art this embodiment can be implemented with client processes running directly on servers 104B–106B in conjunction with the I/O processes 104PB–106PB. As will be described and discussed in greater detail in the following figures and text the administrative processes can, when combined with the embodiment of the invention described in FIG. 1C, migrate from one server to another among the plurality of servers. This latter embodiment is useful when for example servers become disabled or off-line.

FIG. 1C shows another embodiment of the current invention in which resource rebalancing processes are set forth. Resource rebalancing includes remapping of pathways between nodes, e.g. servers, and resources, e.g. volumes/file systems. Load rebalancing allows the network to reconfigure itself as components come on-line/off-line, as components fail, and as components fail back.

In the embodiment shown in FIG. 1C, memory resources 118A–B, servers 104C–106C and normal clients 100A are shown. Memory resource 118A includes configuration database 120A1–D1. The cluster configuration database includes: a clustered node database, a resource database, a directory/access table and a database lock. Memory resource 118A also includes a plurality of file systems generally 122A1–3 and associated directory and access tables. It will be apparent to those skilled in the art the each resource/volume/file system includes a directory and access table which refers to the metadata associated with the resource, which among other things, describes the physical layout of the resource. Memory resource 118B includes a plurality of file systems 122B1–3 and associated directory and access tables. Server 104C includes processes 104PC while server 106C includes processes 106PC. In the example shown, server 106C has twice the processing capability of server 104C.

Clients 100A are connected via a network 108 to each of servers 104C–106C. Each of servers 104C–106C is connected to both of memory resource 118A–B via private network 112. In operation at time t=0 server 104C alone is operational. Processes 104PC cause server 104C to accept and process requests for any of file systems 122A1–3, 122B1–3 on respectively memory resource 118A–B. At time t=0 server 104C is shown accessing file systems 122A2–3 via paths 90A, file system 122A1 via path 90B, and file systems 122B1–B3 via paths 90C. At time t=1 server 106C and 104C are operational. When server 106C comes on-line resident processes 106PC seize control of the configuration database 120A1–D1 by placing a lock in the lock portion 120-D1 of the database. While this lock is in place, any other server attempting to rebalance the resources will see that rebalancing is taking place by another server when it fails to obtain the lock. Server 106C thus becomes the temporary master of the resource rebalancing process.

The master uses the configuration database records for all volumes, and active nodes to rebalance the system. Rebalancing the system takes into account: preferred resource-server affiliations, expected volume traffic, relative server processing capability, and group priority and domain matches, all of which are contained in configuration database 120A1–B1. Optimal remapping between the existing servers 104C–106C and the available memory resources 118A–B is accomplished by processes 106PC. These results are replicated to each servers copy of the dynamic RAM resident configuration database 120A2–B2, the results are published and received by processes 104PC on server 104C, and the lock 120D1 is removed. Subsequent to the load rebalancing server 106C takes on responsibility for handling via path 92B I/O requests for file systems 122B1–B3. Further administrative access to these file systems via paths 90C from server 104C ceases. An additional path 92A between server 106C and file system 122A1 is initiated and the path 90B between that same file system and server 104C is terminated. Thus, after resource rebalancing server 106C handles I/O requests for four out of the six file systems namely 122A1, 122B1–B3 while server 104C handles only file systems 122A2–3. Several embodiments of the load rebalancing embodiment just discussed will be set forth in the accompanying figures and text.

Each of the embodiments and variations thereof can be practiced individually or in combination without departing from the teachings of this invention. For example, client load rebalancing and distributed I/O can be combined. Client load rebalancing and resource rebalancing can be combined. Distributed I/O and resource rebalancing can be combined. Client load rebalancing, distributed I/O and resource rebalancing can be combined.

Figure 2A:
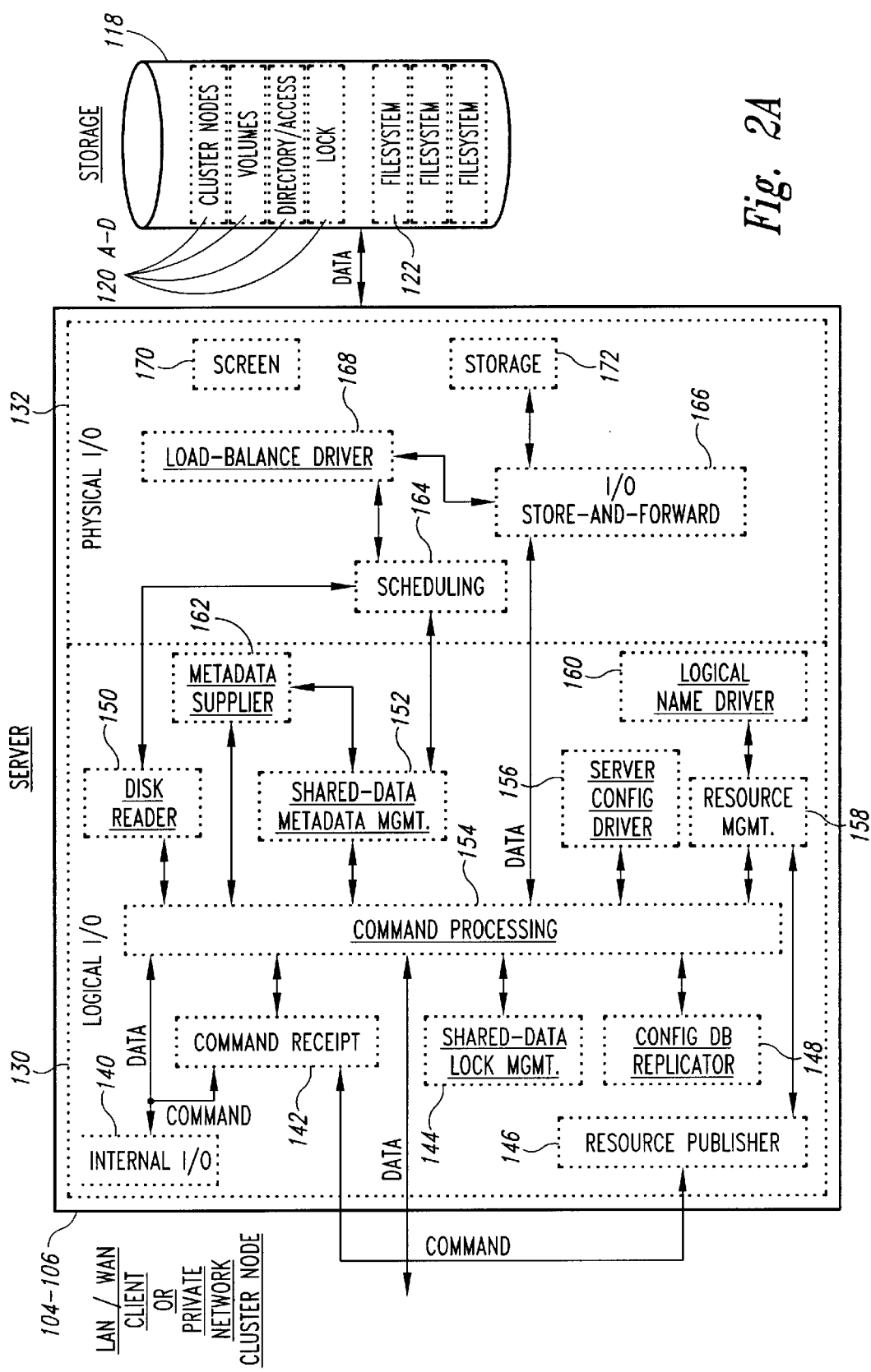
FIGS. 2A–B show the software modules present on respectively the server and client for enabling client load balancing, distributed I/O and resource rebalancing embodiments.

FIG. 2A shows the software modules present on server 104 for enabling client load balancing, distributed I/O and resource rebalancing embodiments of the current invention. FIG. 2A shows server 104 and memory resource 118. Server 104 includes a logical I/O unit 130 and a physical I/O unit 132. The logical I/O unit includes an internal I/O module 140, a resource publisher 146, a command receipt module 142, a shared data lock management module 144, a configuration database replicator module 148, a command processing module 154, a disk reader module 150, a shared data metadata management module 152, a server configuration driver 156, a resource management module 158, a logical name driver module 160 and a metadata supplier module 162. The physical I/O unit 132 includes a scheduling module 164 an I/O store and forward module 166, a load balance driver 168, a screen driver 170 and a storage driver 172. The memory resource 118 includes file systems 122 and configuration database 120.

The command receipt module 142, the command processing module 154 and the resource publisher 146 are all connected to the network 108 and private network 112 (see FIGS. 1A–C.) The command processing unit is connected to the internal I/O module 140, the command receipt module 142, the shared data lock management module 144, the configuration database replicator module 148, the resource management module 158, the server configuration driver 156, the shared data metadata management module 152, the metadata supplier module 162, the disk reader module 150 and I/O store and forward 166. The resource management module 158 is connected to the resource publisher 146 and to the logical name driver module 160. The metadata supplier module 162 is connected to the shared data metadata management module 152. The scheduling module 164 is connected to both the disk reader module 150 and to the shared data metadata management module 152. The I/O store and forward module 166 is connected to a command processing module 154 and to the load balance driver 168 as well as the storage driver 172. The scheduling module 164 is connected to the load balance driver 168. The screen driver 170 is connected to a display [not shown]. The storage driver 172 is connected to memory resource 118.

Functionally, each of the modules performs in the manner specified in the following description.

INTERNAL I/O MODULE 140: This module is the source where internally generated I/O (e.g. from an application on the node itself) enters the processing system. The internal I/O generates a command to command receipt module 142, and sends/receives I/O data through command processing module 154.

COMMAND RECEIPT MODULE 142: This module is where file system I/O requests are received and queued up, either from internal I/O module 140, or from the private network 112 (from a data transfer server), or from a normal or aware client on network 108. The I/O is thus tagged with the source type for future decision making.

RESOURCE PUBLISHER 146: This module is responsible for maintaining the network namespace describing the available resources on this node. It is the module that actually interacts with the network in order for normal and aware clients to figure out which resources are available on this node. The resource publisher 146 interacts with the resource management module 158 and logical name driver module 160 to obtain the actual information that should be published in the network namespace. An example of information would be a list of file-shares (e.g. volumes) that this node could accept I/O commands for.

RESOURCE MGMT. MODULE 158: This module is responsible for delivering resources for publishing in the namespace to the resource publisher 146. The resource manager interacts with the logical name driver module 160 to obtain a translation of the proper resources and how they should appear in the network namespace, and provides a path for the logical name driver module 160 to communicate through command processing module 154 and server configuration driver 156 to build said namespace mapping information.

LOGICAL NAME DRIVER MODULE 160: This module determines how the available resources should be presented in the network namespace, in a consistent and logical manner. The logical namespace presents a persistent view of the resources on the network, and the physical namespace the individual physical connection points used at anytime to service the persistent logical resource.

COMMAND PROCESSING MODULE 154: This module is responsible for obtaining the next command for processing from the command receipt module 142, and dispatching it to various other modules for continued processing. This dispatching depends on the particular command and also the source type that an I/O command was tagged with in the command receipt module 142. A list of the other modules it dispatches commands to are shared data lock manager 144, configuration database replicator module 148, server configuration driver 156, resource management module 158, shared-data metadata management module 152 and disk reader module 150.

CONFIGURATION DATABASE REPLICATOR MODULE 148: This module is responsible for replicating the copy of required records of the configuration database 120 (see FIGS. 5A–D) stored in node memory to other nodes as a result of the server configuration driver 156 calling it. It is called when a node first appears on the network, during a fail-over after a node failure, or when a node fails back. It guarantees every online node has an identical copy of the server configuration database. These tables reflect the current state of the servers/clustered file system nodes (CFNs) as a whole and specifically the individual state of each node as to which file system is the administrative server for.

SERVER CONFIGURATION DRIVER 156: This module is responsible for managing the server configuration database 120 (see FIGS. 5A–D), responding to requests from a node to get a copy of the current server configuration database (FIG. 10H process 1352), sending a command to set the configuration database (FIG. 10H process 1354), rebalancing the database in the case of a node coming up on the network, first time up or during fail-back, and fail-over, and determining who the administrative server for a volume is in response to an I/O by examining the server configuration database (see FIG 10B). Command processing module 154 calls server configuration driver 156 to determine whether this CFN is the administrative server for the I/O in question.

SHARED-DATA LOCK MGMT MODULE 144: This module is called by the command processing module 154 to determine if the I/O operation in question violates any locking semantics. Furthermore, this module is called to lock or unlock a range in a file (FIG. 10H process 1366, 1368). This module also cooperates in the caching and opportunistic locking mechanisms to efficiently cache administrative server block lists, and break locks requiring cached file buffers to be committed (FIG. 10H step 1364) to stable storage (see U.S. Pat. No. 5,628,005 for more information on opportunistic locking).

SHARED-DATA METADATA MGMT MODULE 152: This module is called by command processing module 154 and metadata supplier module 162 in order to translate a logical I/O operation into a physical I/O operation resulting in a block list used to carry out the file I/O operation directly to the volume. If called from command processing module 154, it then passes the physical I/Os onto scheduling module 164 for carrying out the I/O. If called from metadata supplier module 162, it simply returns the physical I/O translation back to metadata supplier module 162.

DISK READER MODULE 150: This module is called by command processing module 154 in the case where an I/O operation is requested in which the server configuration driver 156 has indicated that this node is not the administrative server for the file I/O operation in question. The disk reader module 150 determines the administrative server for the I/O from the server configuration driver 156 and sends the I/O request onto the administrative server with a source type request message for translation into a physical I/O block list. Upon failure of the administrative server, the disk reader module 150 instructs the server configuration database to be rebalanced by calling the server configuration driver 156. Upon success, the physical I/O translation table is returned from the administrative servers metadata supplier module 162 at which time the disk reader module 150 forwards the physical I/O onto scheduling module 164 for completion.

METADATA SUPPLIER MODULE 162: This module is called by command processing module 154 as part of the process to service the receipt of a I/O request tagged as Source Transaction Operation (STOP) type 1B1 during processing in command receipt module 142. This type of I/O operation is a request received by the administrative server's metadata supplier module 162 from a data transfer server's disk reader module 150. The metadata supplier module 162 translates the logical I/O operation into a physical I/O block list and returns this table back to the disk reader module 150 that was the source of the I/O operation as a STOP-1B2 response message. The metadata supplier module 162 obtains the logical to physical I/O translation by calling the shared-data metadata management module 152.

SCHEDULING MODULE 164: This module is called to schedule physical I/O operations in an efficient manner. It can be called by the shared-data metadata management module 152, or disk reader module 150. In either case, it is given the information necessary to carry out the I/O directly to the memory resource(s) 118.

LOAD-BALANCE DRIVER 168: This module is called upon during the carrying out of physical I/O operations to gather and periodically report load-balancing utilization statistics. It is responsible for maintaining counters and performing utilization calculations based on total I/O subsystem usage over time. Periodically, at a time determined by an update interval field in the cluster node database 120A (see FIG. 5A), it reports its usage to possibly several places depending on the embodiment, including but not limited to, a usage record in the cluster configuration database, a file server, or a load-balance monitor. Further, after each I/O operation, it determines if the current I/O utilization has exceeded the configured load-balance utilization threshold. If so, it conducts a determination depending on the embodiment that results in a message to an aware-client to either redirect I/O for a particular resource to a specific node (See FIGS. 7A–B), or to redirect I/O to any suitable node (See FIGS. 7C–D).

I/O STORE-AND-FORWARD MODULE 166: This module is called upon to issue individual physical I/O operations, and pass/store the related data into appropriate memory buffers. In the case of internal I/O originating from processes on the node, the I/O store and forward module 166 simply gets/delivers the data from/to the memory buffers associated with the internal I/O. In the case of I/O originating from clients, temporary memory resources are associated with the I/O, and data is gotten/delivered there. Furthermore, client generated I/O requires the I/O store and forward module 166 to retrieve data from the client network and send data to the client network depending on whether the operation is write or read respectively. After the client data is transferred, the temporary memory resources are freed to be used at another time.

STORAGE DRIVER 172: This module is called upon by the I/O store and forward module 166 to carry out the physical I/O to the physical storage bus. This driver transmits/receives command and data to the storage resource to accomplish the I/O operation in question.

SCREEN DRIVER 170: This module is responsible for presenting a GUI of the OS and any application executing on the node that typically require human consumption of the visual information.

Figure 2B:
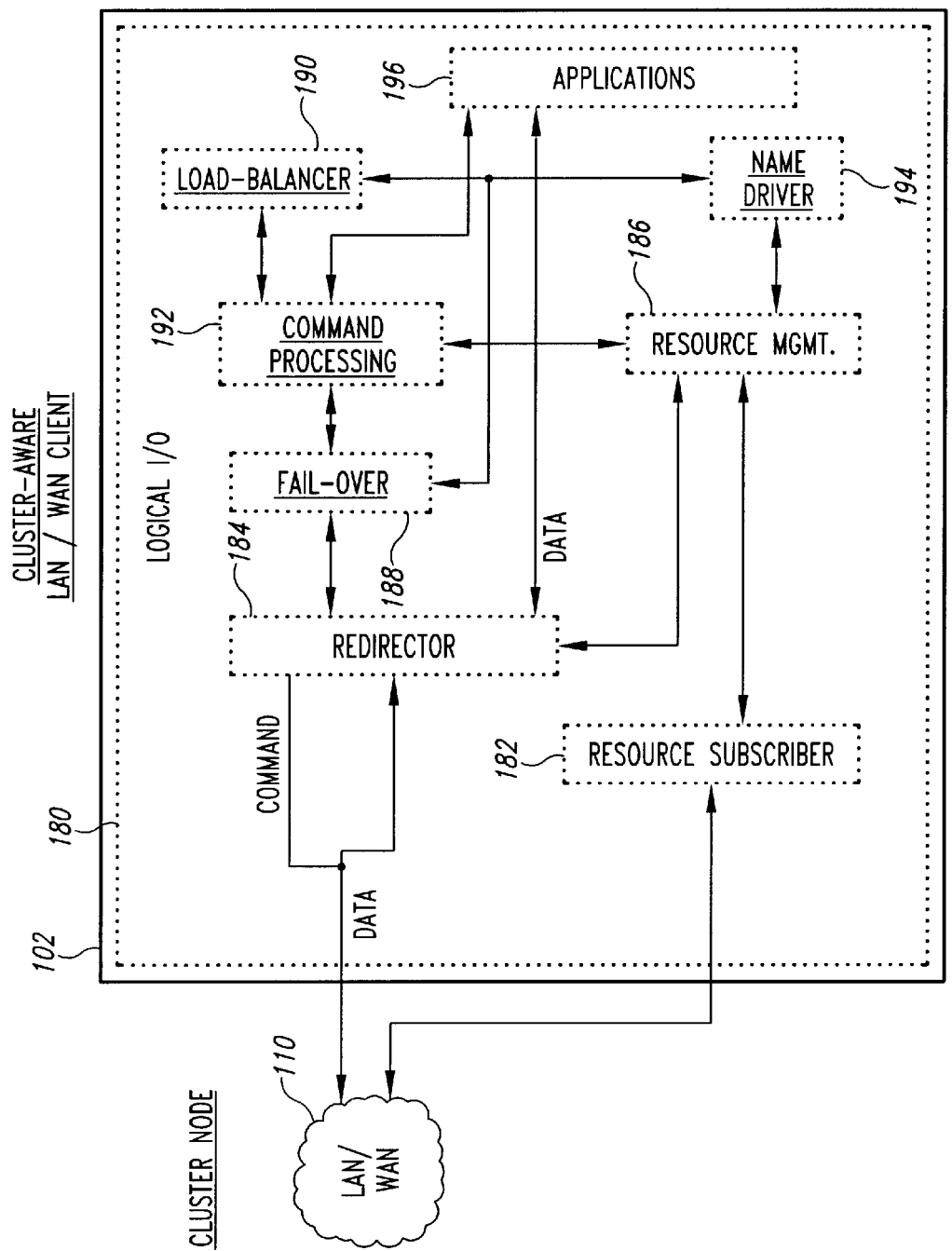

FIG. 2B shows software modules associated with an aware client 102A–B which interfaces with the network 108 (see FIG. 1A). The aware client software modules may reside on a server which implements client processes or a stand alone unit as shown in FIG. 1A. The aware client includes a resource subscriber module 182, a redirector module 184, a resource management module 186, a fail-over module 188, a load-balancer module 190, a command processing module 192, a name driver module 194 and one or more application modules 196.

The resource subscriber module 182 and the redirector module 184 are both connected to the network 108 (see FIG. 1A). The redirector module 184 and the resource subscriber 182 are both connected individually to the resource management module 186. The redirector module is also connected to the fail-over module 188 and to the application modules 196. The fail-over module 188 is connected both to the name driver module 194 as well as to the command processing module 192. The load balancer module 190 is connected to the name driver module 194 and to the command processing module 192. The command processing module 192 is connected to the resource management module 186, load balancer module 190 and to the application modules 196. The name driver module 194 is also connected to the resource management module 186.

The functional relationship between the software module is as follows.

RESOURCE SUBSCRIBER MODULE 182: This module is responsible for retrieving from the network the namespace describing the resources available for use by the clients on the network. It interacts with resource management 186 to respond to a request for retrieval, and to deliver the resource information back.

RESOURCE MGMT MODULE 186: This module is responsible for managing the information about distinct resources available on the network and connection information associated with each. It calls the resource subscriber module 182 for gathering resource information from the network, and is called by redirector module 184 to determine resource to node path information. It calls name driver module 194 to gather multi-path information and conduct single system image (SSI) presentation and redirection. It is called by command processing module 192 to verify single system image resource to actual node translation information.

APPLICATION MODULES 196: This module refers to any application (process) running on the aware-client that generates I/O operations. It calls command processing module 192 to carry out the given I/O operation.

COMMAND PROCESSING MODULE 192: This module is responsible for carrying out an I/O operation. It has to determine whether the requested I/O is destined for an internally controlled resource or externally controlled resource. If it is not a well-known internally controlled resource, it calls resource management module 186 which calls name driver module 194 to determine the appropriate (if any) resource this I/O is directed to. It then passes the I/O for processing to fail-over module 188.

NAME DRIVER MODULE 194: This module is responsible for presenting the SSI to the system which is the enabling mechanism allowing transparent I/O recovery. It is called upon in the case of load-balancing to redirect future I/O for a resource to another node and in the case of I/O recovery to retry the I/O on another node. Both result in transparent I/O recovery and load-balancing. This is accomplished by name driver module 194 maintaining of an abstraction mapping of the network namespace resources, combining all available paths for each volume to each node as a single computing resource available for use by the rest of the system. Load-balancer module 190 calls it to remap future I/O while fail-over module 188 calls it to retry I/O on another path (see FIG. 6).

FAIL-OVER MODULE 188: This module is responsible for transparently recovering a failed I/O operation. Command processing module 192 calls it to complete the I/O operation. Fail-over module 188 issues the I/O to redirector module 184. If the I/O fails, fail-over module 188 calls name driver module 194 to find an alternate path for the I/O operation, and reissues it. Upon success, data is returned to the I/O issuer (see FIG. 9B).

LOAD-BALANCER MODULE 190: This module is responsible for receiving a command to load-balance the aware-client from a node. There are several embodiments of aware-client load-balancing (FIGS. 7A–D). A receipt of a direct load-balance to a particular node causes load-balancer module 190 to call name driver module 194 to redirect future I/O (See FIGS. 7A–B). A receipt of a generic load balance request causes the load-balancer module 190 to perform one of the embodiments described in FIGS. 7C–D which again result in a call to the name driver module 194 to redirect future I/O to a particular CFN.

REDIRECTOR MODULE 184: This module is responsible for the communications between an aware-client and specific nodes to the physical client network. It receives I/O commands for execution from fail-over module 188 and gets/delivers data from the I/O directly from/to the memory buffers associated with the I/O (from the application modules 196). It also receives load-balancing commands from CFNs and passed them to the load-balancer module 190 for handling.

Categorization of I/O Types

An important aspect of the clustered filesystem to keep in mind is that multiple paths to the data are available. The potential ultimate usage of the clustered filesystem must be clearly understood in terms of the applications and the clients that use them. There are four main types of usage by applications and clients that depend on where the client is and how they use the application and what the application is and where it exists in relation to the clustered filesystem. These I/O types originate inside and outside the clustered filesystem, and inside and outside the cluster system when used with the clustered filesystem (e.g. MCS, VIA etc . . . ) where the clustered filesystem is simply made available (using standard interfaces) as another resource with clustering capabilities as part of the greater clustered system. These distinctly different types of I/O are characterized by the source of the transaction operation. This paper therefore define the four major I/O transaction types as Source Transaction Operation (STOP) types 1–4. Taken together, these four types of usage are the ways the clustered filesystem provides benefits in the areas of availability, scaling, symmetry, and single system image. Each of these is discussed next, the last two in terms of a Microsoft Cluster Server.

STOP Types 1A, 1B(1,2,3): This usage would be best characterized in terms of a trusted workgroup, two simple examples being Digital Video and Prepress which transfer and share very large files consisting of large I/Os. In the case of Digital Video a suite of editors working on the same project, or different projects use the same source footage simultaneously accessing the same media files from multiple editing stations. In Prepress a suite of editors manipulate very large image files and page layouts. A complex example being Distributed Processing (Compute Cluster, Distributed Database, any Distributed Application). The important aspect of this work group is that the actual applications and the clients that use them exist on the computers that collectively makeup the clustered filesystem. All I/O generated in this environment would automatically benefit from transparent I/O recovery and scaling as the software that manages the clustered filesystem exists on each machine node in the workgroup and adds these capabilities. The clustered filesystem is enclosed in that it uses a private network, based on Fibre Channel Standard (FCS), such as a FC-AL or switched fabric, for its node to node connections. This requires minimal security measures because it is assumed any node connected in the private network can be trusted to directly access the storage subsystem in a proper, non-destructive, secure, law-abiding fashion. STOP-1A specifically refers to an I/O carried out by a CFN that is also the Metadata Server for the filesystem in question. STOP-1B specifically refers to an I/O carried out by a CFN who is not the Metadata Server for the filesystem. STOP-1B1 is the communication from the CFN's Disk Reader to the Metadata Supplier of the CFN who is the Metadata Server. STOP-1B2 is the communicate from the CFN's Metadata Supplier who is the Metadata Server sending the block list to the Disk Reader on the CFN who originated the I/O. STOP-1B3 is the I/O to the shared storage which is generated from the block list returned to the Disk Reader from the CFN who originated the I/O.

STOP Type 2A(1,2): The clustered file system I/O capabilities of a given client can take two forms which we shall define as normal clients and enabled-clients. A normal client is one which has no special awareness of the clustered filesystem, and hence has absolutely no additional software installed in the computer. It sees the clustered filesystem as a normal network filesystem "file-share" published in the namespace of the network and thereby decides to attach to a single Clustered Filesystem Node (CFN) as the server for access to that share. In this case, the clustered filesystem is exposed to the public network as a series of symmetric filesystem server entry-points each giving the client an identical view of the filesystem. All subsequent I/O from this client is carried out by the clustered filesystem through this single CFN. From the normal client's perspective this all occurs in the same manner as traditional client/server I/O today. Availability is dealt with in the traditional way by retrying the I/O until successful or erroring out. An I/O failure can occur, for instance, if the CFN to which the I/O was issued has crashed. If this occurs, it may become available at a later time once restarted. In this respect, availability is the same as traditional client/server I/O. However, if the I/O recovery errors out, the client or application has the option available to manually attach to the clustered filesystem through another CFN to retry the operation. This recovery could be done automatically but would have to be programmed into the issuing application. Scaling and load-balancing are accomplished through the symmetry provided by the clustered filesystem. This is done manually by distributing a group of normal clients among different attach points to the clustered filesystem via the different CFNs whom publish unique attach points in the namespace viewable by the normal clients. Distributed applications are supported in the traditional manner, save for much higher scaling limits, because the clustered filesystem supports a single view of the filesystem no matter where it is viewed from, including the range-locking of files. Normal clients attaching to the clustered filesystem through different CFN points will see the exact same filesystem and hence the range-locks will be in effect regardless of which file was opened on which CFN. This allows distributed applications to scale by using range-locking and/or accessing the same files/filesystems to distribute its activities. STOP-2A1 is a normal client generated I/O which occurs on the CFN who is the Metadata Server for the filesystem. STOP-2A2 is a normal client generated I/O which occurs on the CFN who is not the Metadata Server for the filesystem.

STOP Type 2B (1,2): An enable-client is one which has special clustered filesystem-aware software installed. The enabled-client has all the capabilities of a normal client with some important additions. Clustered filesystem awareness allows availability, scaling, symmetry, single system image and load-balancing to transparently be extended to the public network. The enabled-client now views the exposed clustered filesystem as a single system image, not a group of symmetric nodes. This is an important abstraction that allows the virtualization of the clustered filesystem. The software on the enabled-client presents this single system image to the operating system and all client applications transact through this virtual interface. The software translates the I/O request to the virtual interface to an actual transaction to a particular CFN. Availability is automatic because I/O recovery is accomplished when the I/O to a failed CFN is redirected to another CFN for completion after which the original I/O is completed successfully back through the virtual interface. Scaling and load-balancing is accomplished automatically as the enabled-client is able to redirect I/O to another cluster node at the request of the clustered filesystem. Distributed applications function as well. All disk access is coordinated. Symmetry is achieved allowing any filesystem I/O to function identically regardless of which node initiated it. STOP-2B1 is an enable client generated I/O which occurs on the CFN who is the Metadata Server for the filesystem. STOP-2B2 is an enabled client generated I/O which occurs on the CFN who is not the Metadata Server for the filesystem.

Availability: Availability business can continue when a server or component fails. STOP 1 availability is provided in terms of Metadata server fail-over and fail-back mechanisms so that the I/O can be recovered. STOP 2 availability is provided in terms of symmetry and virtualization through the single system image allowing manual and transparent client I/O recovery.

Scaling: Coherency is maintained partly by using a distributed lock manager. This allows an application to grow beyond the capacity of the biggest available server. Multiple high-speed paths to the data and range-locks provided by the distributed lock manager allow distributed applications to scale. STOP-1 and STOP-3 scale directly with the clustered filesystem while STOP-2 and STOP-4 scale as public network access to the clustered filesystem scales.

Symmetry: Metadata Server and Hemingway Client cache coordinates direct storage subsystem access. STOP-1 and STOP-3 can execute applications on the same storage directly. If those are distributed applications in the sense that they work together to manipulate a dataset they will benefit from this symmetry. STOP-2 and STOP-4 can utilize distributed applications that execute at the source or services of such applications that execute on a server/cluster node in the same way. Everyone sees the same filesystem and can perform functionally identical I/O from anywhere.

Single System Image: Virtualization is particularly applicable to STOP 1 and STOP 2B(1,2) where a single system image of the file system is presented, allowing I/O recovery, application load balancing and storage centric disaster tolerance. This is a key building block allowing bigger than mainframe systems to be built incrementally.

Figure 3A:
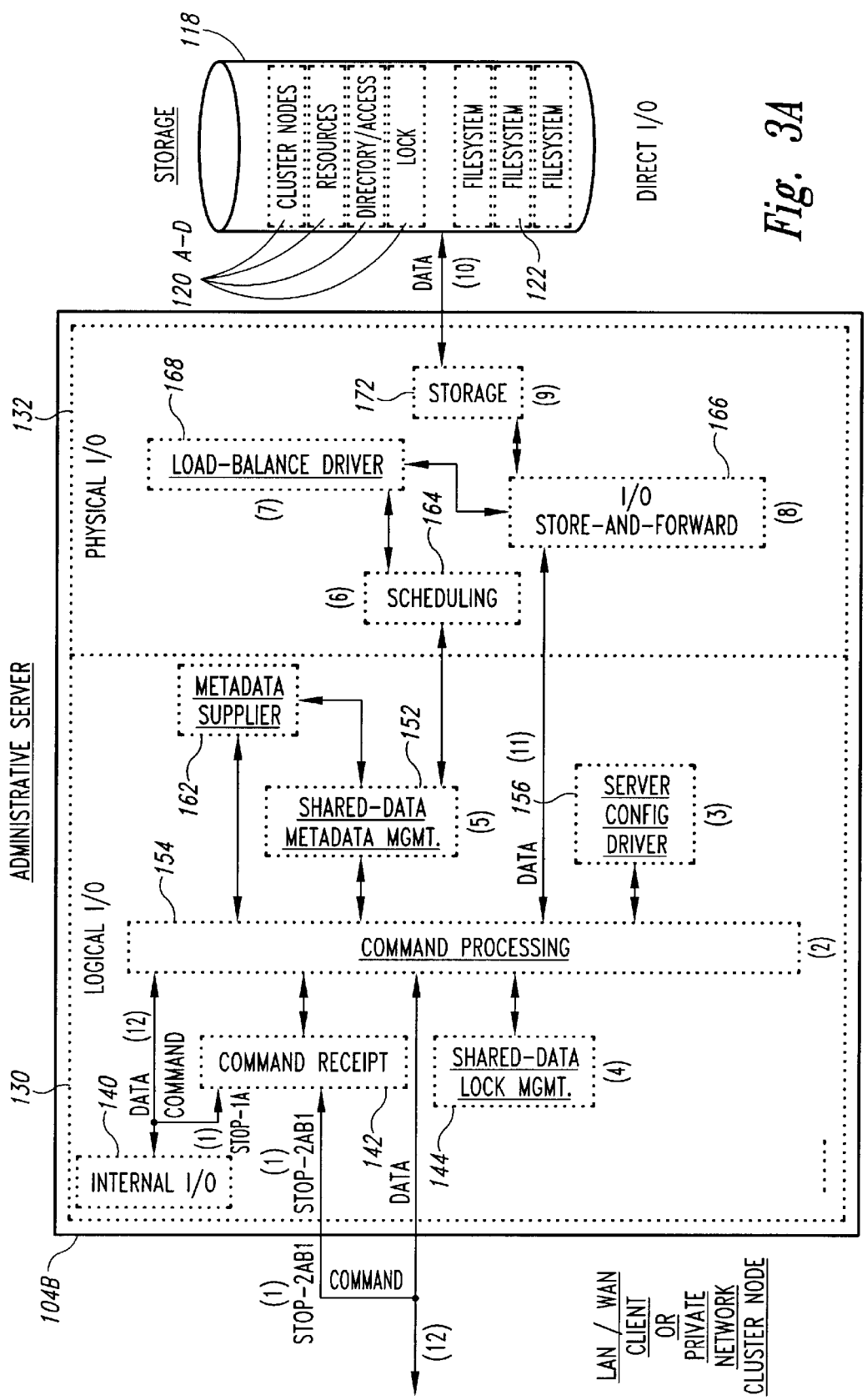
FIGS. 3A–C show the functioning of the server node software modules shown in FIG. 2A for various implementations of distributed I/O handling shown in FIG. 1B.
Figure 3B:
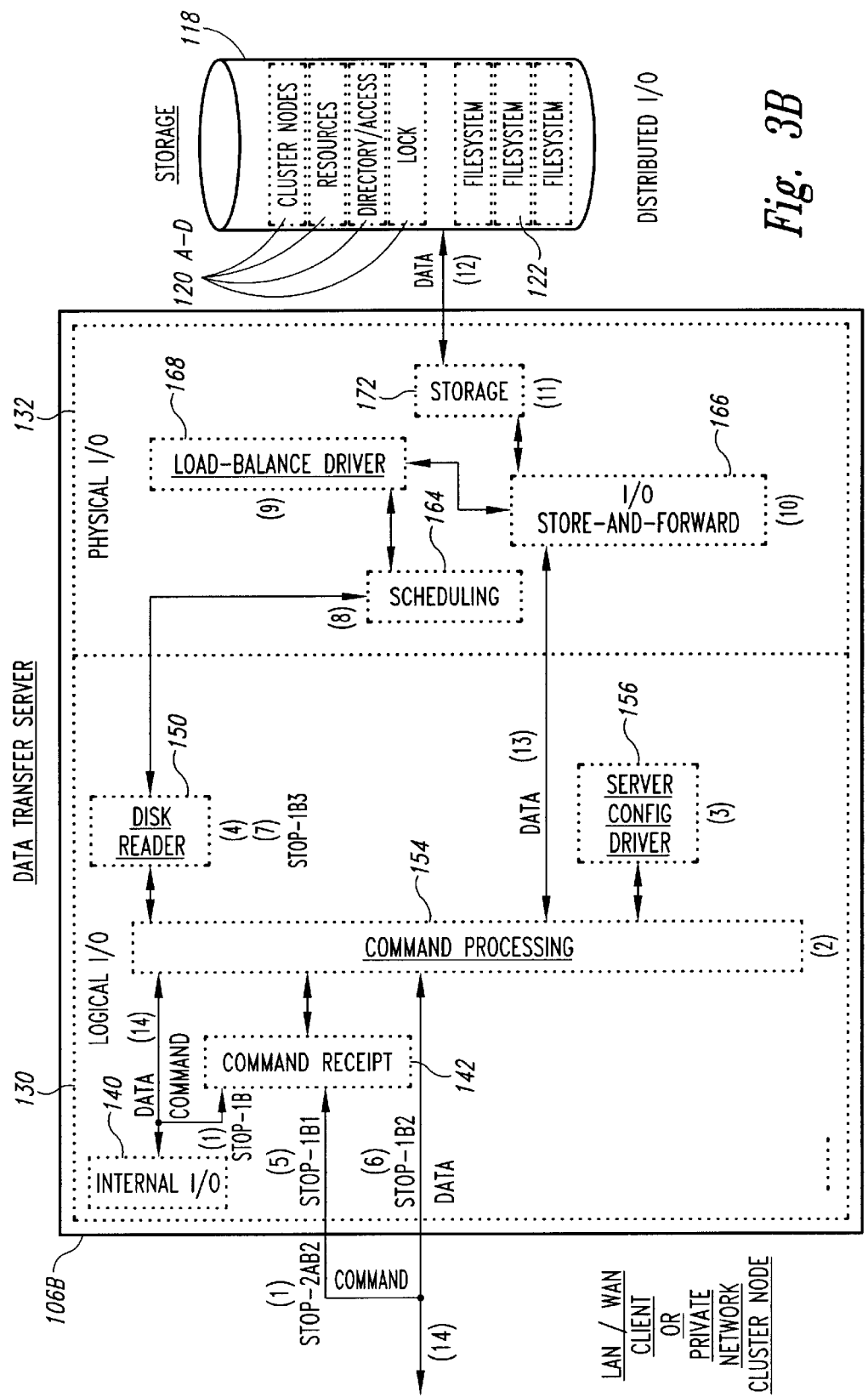
Figure 3C:
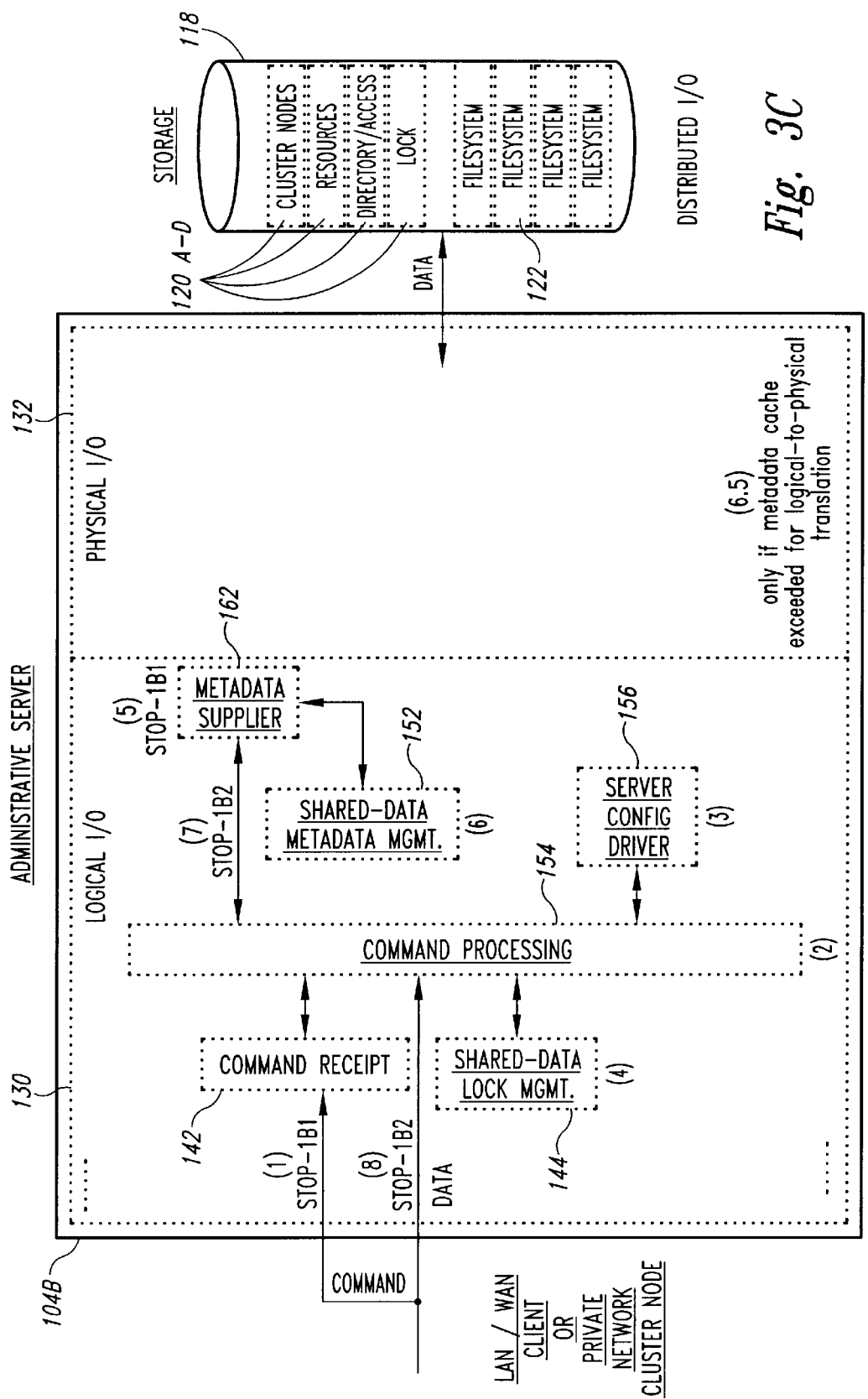

FIGS. 3A–C show the functioning of the server node software modules shown in FIG. 2A for various implementations of distributed I/O handling shown in FIG. 1B.

FIG. 3A shows the software modules required for the administrative server 104B to handle both the administrative and data transfer functions associated with an I/O request. (See FIG. 1B I/O request 80 and response 86.) Processing begins by the receipt of an I/O request at command receipt module 142. The I/O request is tagged with the source identifier indicating the origin of the I/O request, e.g. client 100A (see FIG. 1B) and that request and tag are passed to the command processing module 154. The command processing module 154 determines that the I/O request should be passed to the server configuration driver 156. The server configuration driver uses information obtained from the configuration database 120A–C (see FIGS. 1B, 5B) to determine which among the plurality of servers 104B–106B (see FIG. 1B) is designated as the administrative server for the requested file system. In the example shown in this FIG. 3A, the server processing the request is also the administrative server for the requested file system. Control passes from the server configuration driver to the shared data lock management module 144. This module is called by the command processing module to determine if the I/O operation in question violates any locking semantics. Assuming there are no access violations, control is then passed by the command processing module to the shared data metadata management module 152. This module is called by the command processing unit in order to translate a logical I/O operation into a physical I/O operation resulting in a block list used to carry out file I/O operation directly to the file system. This module passes physical I/O's onto scheduling module 164. Scheduling module 164 schedules the physical I/O operations in an efficient manner. Control is then passed to load balanced driver 168. This module gathers and periodically reports load balancing utilization statistics which statistics can be utilized for client load balancing (see FIG. 1A.) Control is then passed to the I/O store and forward module 166. The I/O store and forward module is responsible for handling the individual physical I/O operations where data is passed between the network and the storage module through the command processing module 154, the I/O store and forward module 166 and the storage driver 172. The storage driver 172 carries out the actual physical I/O interface with the memory resource 118.

FIGS. 3B–C show the complementary relationships associated with distributed I/O between an administrative server and a data transfer server in accordance with the embodiments shown in FIG. 1B. FIG. 3B shows the software modules associated with the handling of an I/O request by the data transfer server 106B while FIG. 3C shows the software modules associated with handling the administrative portions of the I/O request initially received by data transfer server 106B and handled administratively by administrative server 104B.

Processing in FIG. 3B begins with the receipt of an I/O request by the command receipt module 142. A request is tagged by source and passed to the command processing module 154. On the basis of the source and type of request the command processing module passes the request to the server config driver which determines it is not the administrative server for the resource I/O request. Command processing module 154 then calls disk reader module 150. The disk reader module 150 determines the administrative server for the volume on which the requested file system resides. Control is then passed to the command receipt module 142 which sends to the administrative server the I/O request. If the I/O is read or write, then the logical I/O is passed to the administrative server for translation to physical sectors on the resource to which the read or write I/O request should be directed. The response to that request in the form of a block list is received by the command processing module 154. The command processing module passes the block list to the disk reader module 150. The disk reader module forwards the physical I/O locations from the block list to the scheduling module 164. The scheduling module 164 schedules I/O operations in an efficient manner. Control is then passed to the load balance driver 168 which accumulates utilization statistics based on I/O requests and which periodically reports these. These statistics are useful when implementing the client load balancing embodiments and resource rebalancing embodiments of the invention described and discussed above in connection with FIGS. 1A–C. Control is then passed to the I/O store and forward module 166. The I/O store and forward module passes data between the network and the memory resource 118 via the command processing module 154, the I/O store and forward module 166 and the storage driver 172. The storage module carries out the physical I/O to the memory resource 118.

FIG. 3C shows the software modules associated with the handling by an administrative server 104B of a distributed I/O request passed from a data transfer server 106B (see FIGS. 1B, 3B). Processing begins with the receipt of a I/O request. If it is a read or write I/O request then the logical I/O needs to be translated into storage device ID(s) and physical sector list for the distributed I/O request which is received from the data transfer server by command receipt module 142. The request is tagged with source information by the command receipt module and passed to the command processing module 154. The command processing module determines on the basis of I/O type and source that the request is passed to the server configuration driver 156. The server configuration driver 156 obtains a copy of the current configuration database 120 (see FIG. 1B.) Control is then passed to the shared data lock management module 144 to determine whether any locking semantics are violated. If that determination is in the negative, the I/O request to the file in the file system does not violate any locks of another process, then control is passed to the metadata supplier module 162. The metadata supplier module 162 calls shared data metadata management module 152 to translate the logical I/O operation into a physical I/O block list. The request in the form of a block list is then passed by the command processing module 154 over the network to the data transfer server 106B.

FIGS. 4A–D show the software modules associated with respectively the handling of IOs by an aware client, the handling of a fail-over and fail-back by an aware client, and the passive and active management of load rebalancing by a client.

Figure 4A:
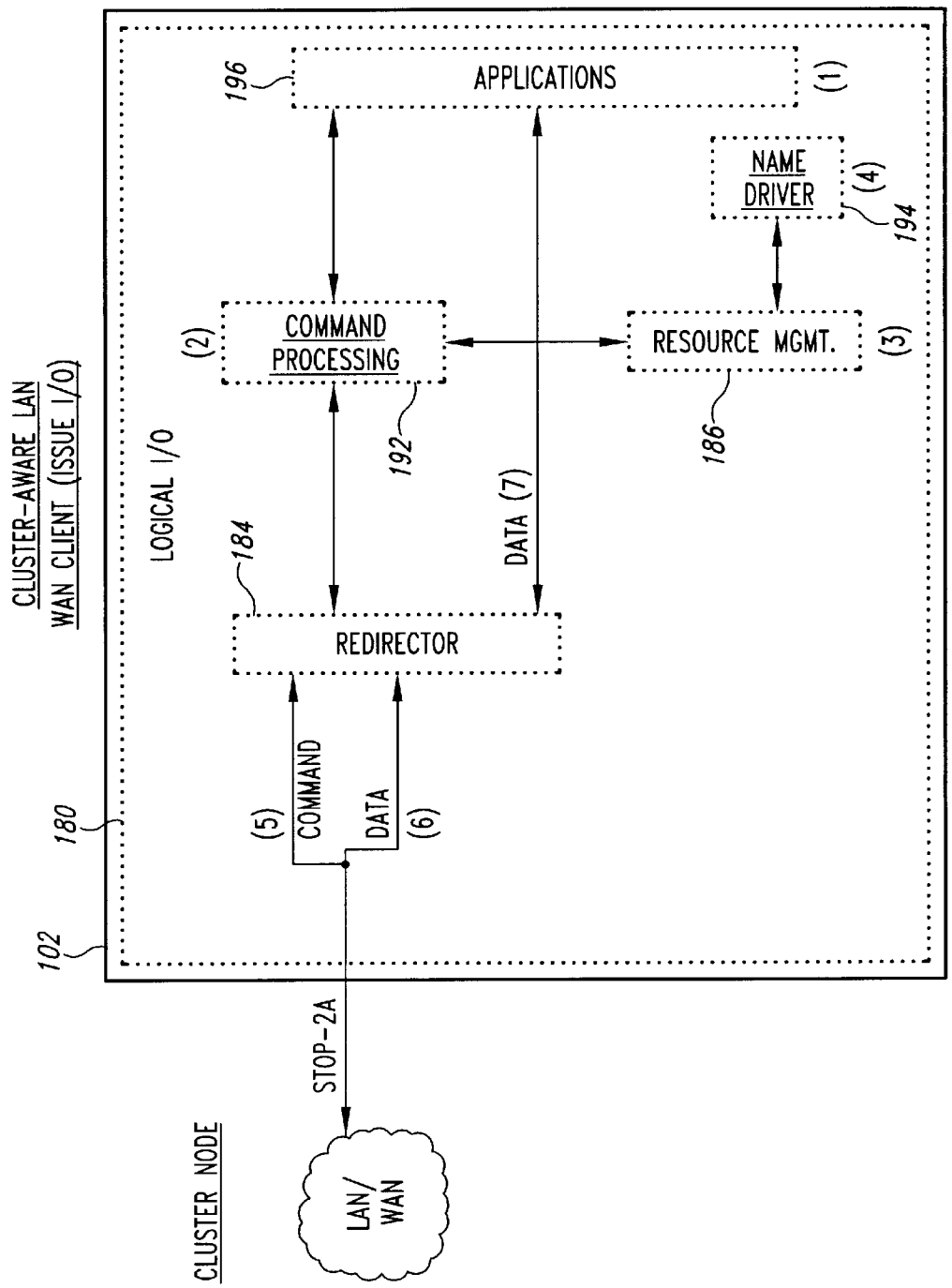

FIG. 4A shows which of the software modules described and discussed above in FIG. 2B are involved in the processing by an aware client of an I/O request. Processing begins with an I/O request generated by application modules 196. That request is passed to the command processing module 192. The command processing module determines whether the requested I/O is destined for a client controlled resource or an externally controlled resource. For externally controlled resources the command processing module 192 calls the resource management module 186. This module is responsible for managing the information about distinct resources available on the network and the connection information associated with each. This module in turn calls the name driver module 194 which presents a single system image to the system. The single system image allows for multiple paths to any specific resource and enables transparent I/O recovery. The named driver maintains an abstract mapping of network namespace resources and combines all available paths for each volume through the plurality of nodes, e.g. servers (see FIG. 6). The current path for the resource is returned to resource management 186. For external I/O requests, the I/O is sent to the appropriate destination by the redirector module 184. This module handles communications between the aware client and the network. Data passing to or from the client in response the I/O request is passed between the network and the application modules 196 via the redirector module 184.

Figure 4B:
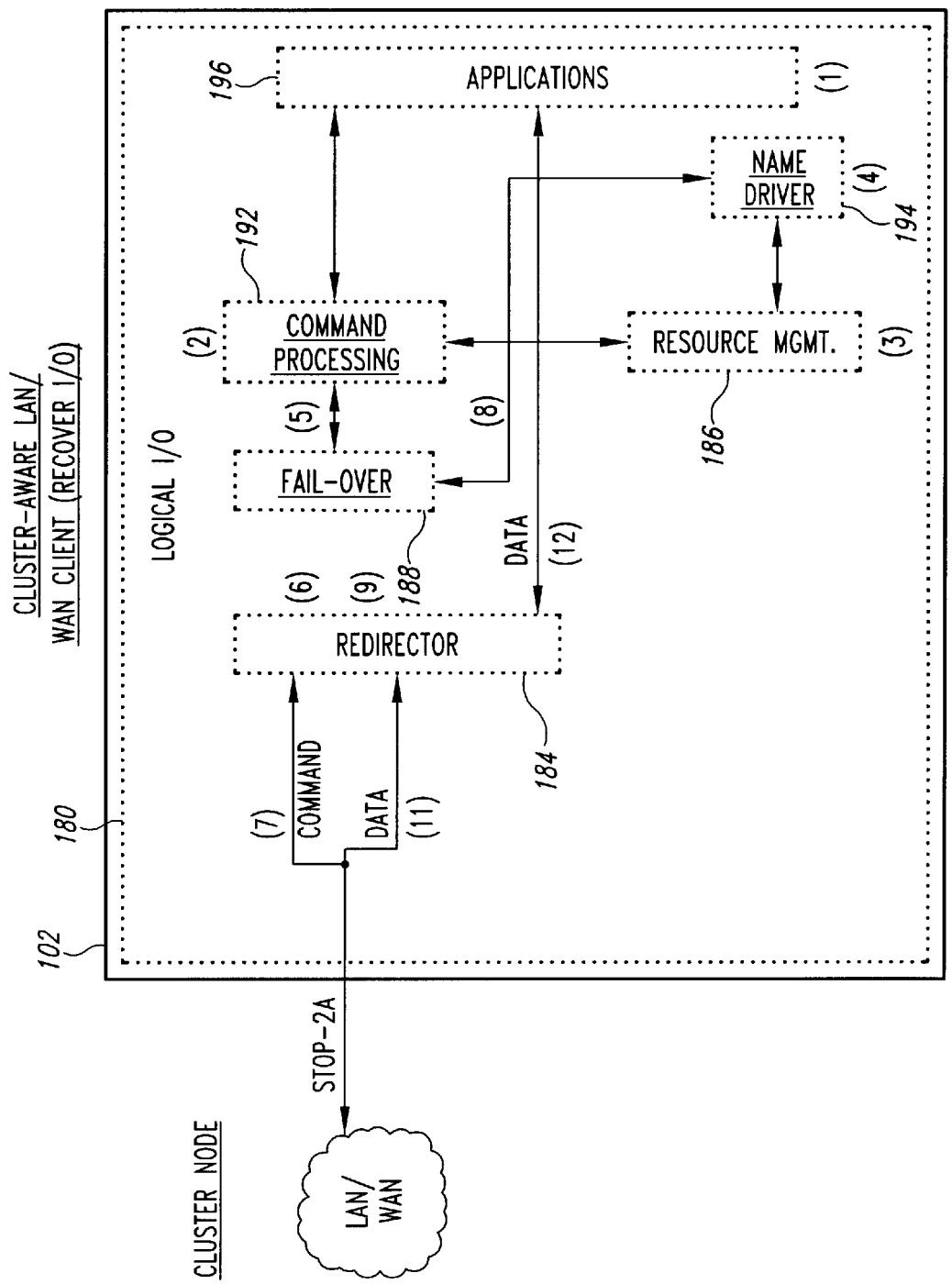

FIG. 4B shows which of the software modules described and discussed above in connection with FIG. 2B is associated with the processing by an aware client of a fail-over or fail-back on the network. Fail-over refers to the response by aware clients seeking access to a resource to the failure of a node, e.g. server, designated in the name driver module 194 for accessing that resource. Fail-back deals with the behavior of an aware client in response to a recovery of a node, e.g. server, on the network from a failed condition. The operation begins in a manner similar to that described and discussed above in connection with FIG. 4A with the issuance of an I/O request by the application module 196. That request is passed to the command processing module 192. Since the I/O request is destined for an external resources the path to the resource needs to be determined. The request is therefore passed to the resource management module 186 and to the name driver module 194 to obtain the path. The command processing module 192 passes the request with path information to fail-over module 188 for further processing. Fail-over module 188 then calls the redirector module 184 to send the I/O request via the path obtained from the name driver. If fail-over module 188 determines there is a failure it calls the name driver module to provide an alternate path for the I/O operation and the fail-over module 188 reissues the I/O command with the alternate path to the redirector module 184. Data passing between the resource and the application module 196 is passed via the redirector module 184. Upon failure detection and redirecting by fail-over module 188, name driver module 194 marks the path as failed. Periodically name driver module 194 checks the network for the valid presence of the failed paths and if good, once again marks them failed-back or valid so that they may once again be used in the future if necessary.

Figure 4C:
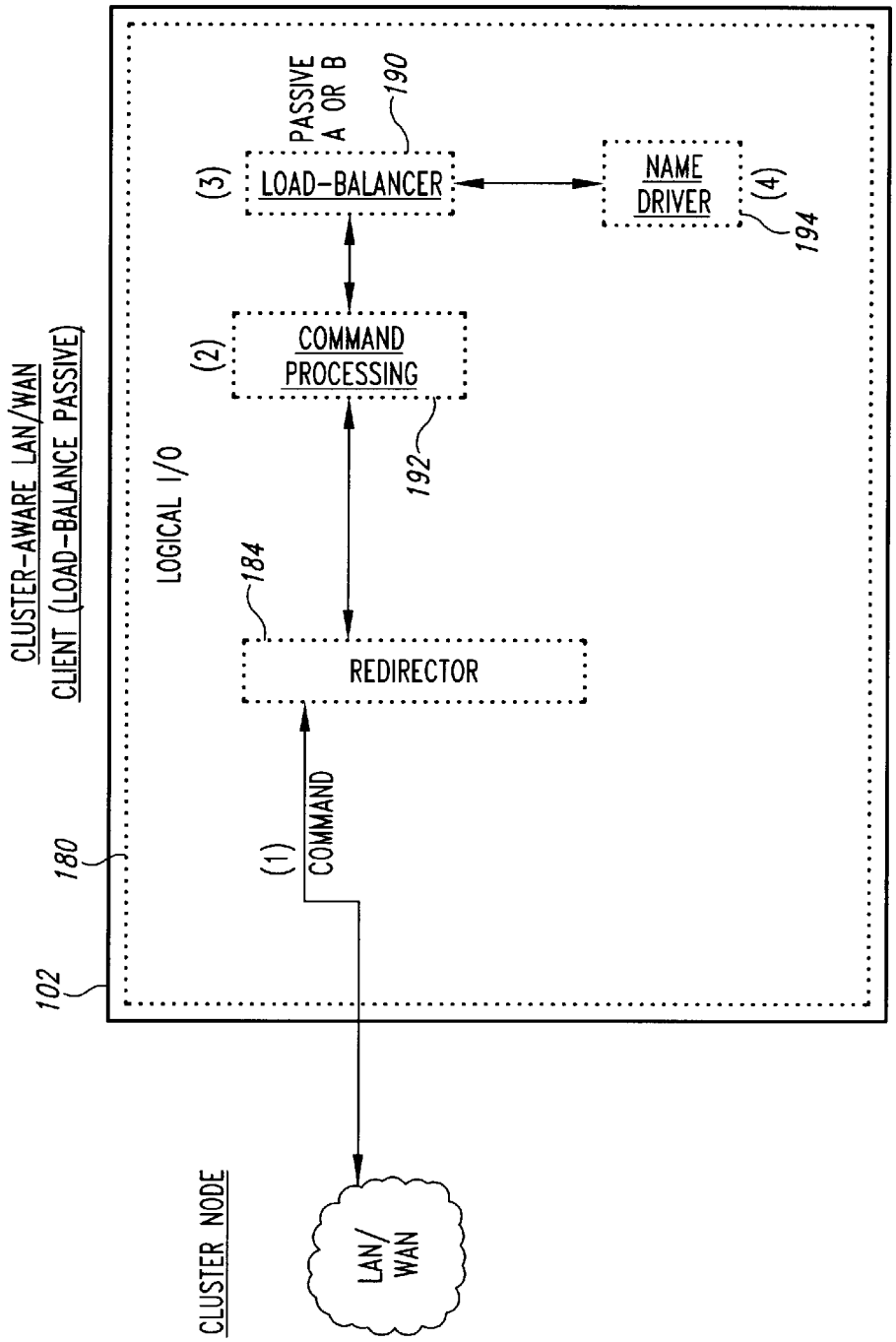

FIGS. 4C–D show the software modules on the aware client associated with what are defined as respectively passive and active embodiments of client load rebalancing introduced above in FIG 1A. FIG. 4C discloses a software module associated with passive client load balancing while FIG. 4D shows the software modules associated with active client load balancing. Passive load balancing refers to the activities on a client subsequent to the receipt from a utilization server (see FIG. 1A) of a redirect command and, potentially, an alternate path or paths for the I/O request to a file system. Active client load balancing refers to the activities on an aware client subsequent to the receipt from a utilization server of a redirect command without any accompanying information as to which path(s) to alter subsequent I/O requests for a particular file system through.

Passive client load balancing commences in FIG. 4C with their receipt by redirector module 184 of a redirect command from a utilization server (see FIG. 1A). The command is passed to the load balancer module 190 via the command processing module 192. The receipt of a redirect command accompanied by a particular path causes load balancer module 190 to call name driver module 194 and to redirect all future IO to the requested file system through an alternate server path. The name driver maintains an abstract mapping of network namespace resources which combine all available paths of each file system to each server. In response to the redirect command accompanied by the specific path to the file system which was the trigger for the redirect command issuance, the name driver updates its abstract mapping of network namespace, nodes and resources to reflect the new path (see FIG. 6). Upon receipt of a redirect command without path information, an embodiment of the invention has the aware client in passive load balancing chooses any other valid path for redirection. This is usually done by choosing that path which was least recently redirected, e.g. the oldest redirected path (see FIG. 6).

FIG. 4D shows the software modules in the aware client (see FIG. 1A) associated with active load balancing. Processing is initially similar to that described and discussed above in FIG. 4C with the following exception. The incoming redirect command from the utilization server indicates only that redirection is required but not what path should be followed for the redirection, the decision which is left to the aware client to actively make based on utilization information, not just valid path. When that command is received by the load balancer module 190 from the redirector module 184 via the command processing module 192, the load balancer module 190 engages in following activity. In an embodiment of the invention, the load balancer module 190 accesses the name driver module 194 to determine suitable alternate paths and additionally accesses the cluster configuration database in the memory resource 118 (see FIG. 1A) to determine which, among the servers on the alternate paths, is the least utilized and to choose that as the alternate path. In another embodiment of the invention the load balancer module 190 accesses the name driver module 194 in response to the redirect command to determine valid alternate paths. To optimize the choice of path the client queries each of the individual servers on the path to determine their utilization and selects that server which is the least utilized.

FIGS. 5A–D show the data structures which comprise the configuration database 120 (see FIGS. 1A–C). For client load rebalancing shown on FIG. 1A the configuration database is an optional feature the only portion of which that may be utilized is the node, e.g. server, cluster database shown in FIG. 5A.

Figure 5A:
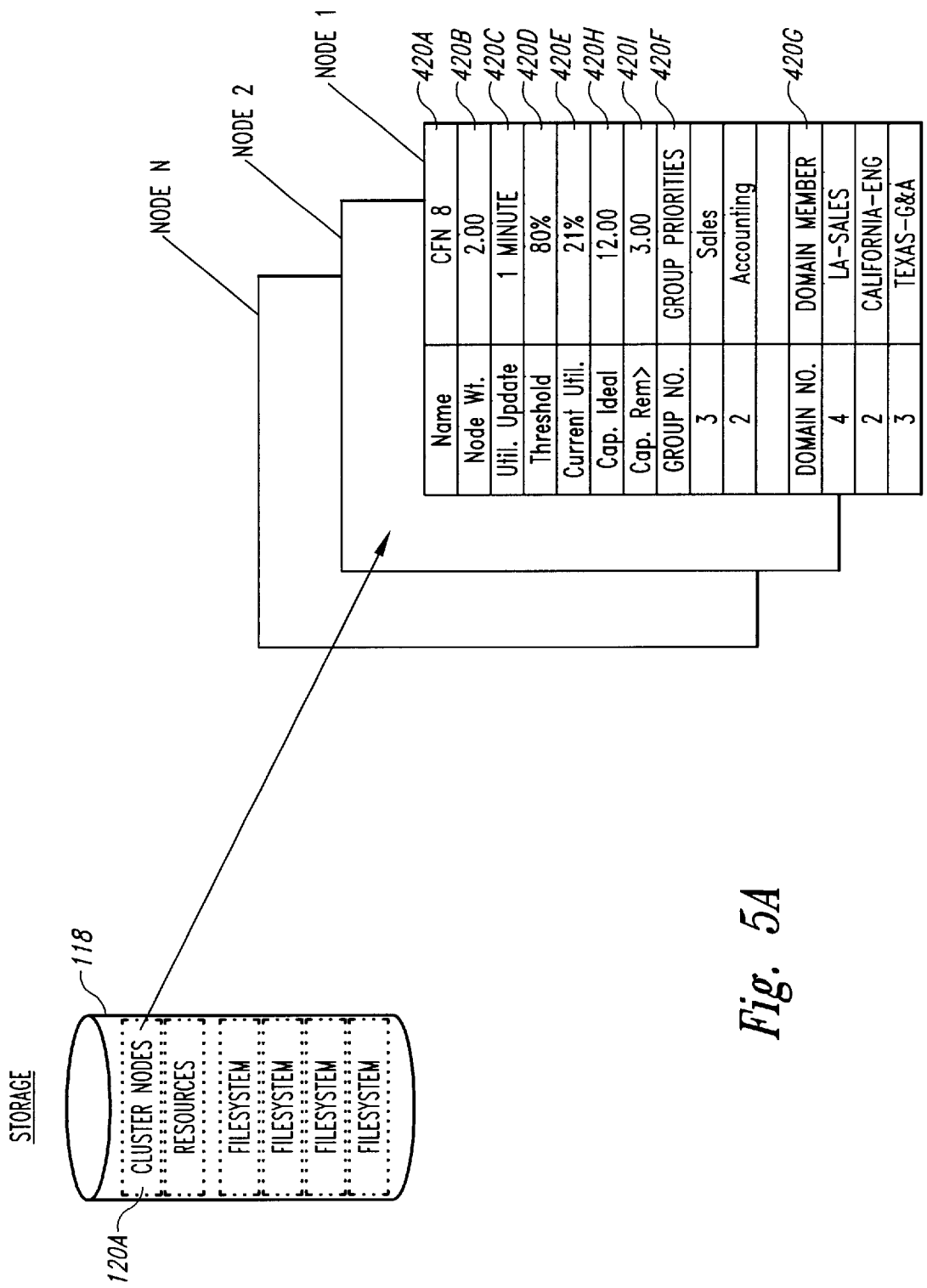
FIGS. 5A–D show the data structures which comprise the configuration database 120 (see FIGS. 1A–C).

FIG. 5A shows a record for node 1, node 2 and node N which represents the plurality of records contained in the clustered node database. Fields 420A–I within the node 1 record are shown. Name field 420A contains the node name, i.e. "CFN 8". A node in the examples shown in FIGS. 1A–C comprises a server. In alternate embodiments of the invention a node can include any network attached processor embodied in, e.g. servers, workstations, computers, routers, gateways, bridges, or storage devices, printers, cameras, etc. Field 420B is the node weight field which in the example shown is assigned a weight of "2.00". Node weight may correlate with the relative processing capability of the node. Field 420C is the utilization update interval which in the example shown is listed as one minute. This interval indicates how often the node will update the current utilization field 420E. Field 420D is an optional utilization threshold field which in the example shown is set at "80%." The following field, 420E is the current utilization which in the example shown is "21%." Utilization may refer to I/O utilization or processor utilization or any combination thereof Utilization threshold refers to that level of I/O or a processor activity which corresponds to 80% of the hardware capability on the particular node. When that level is reached, client load rebalancing may be triggered in a manner that will be described and discussed in the following FIGS. 7A–D. Fields 420H–I contain variables which indicate respectively the ideal node capacity and remaining node capacity. In the embodiments shown ideal capacity is an indicia of the portion of the clustered resources with which each specific node should be associated. In the example shown in FIG. 5B this correlates with weights (field 440H) which are assigned to resources. Field 420F contains for each specific node the preferred groups in order of precedence with which each specific node should preferentially be associated. A group, e.g. sales, accounting, engineering etc. may be defined as a combination of file systems. In other embodiments of the invention a group comprises more broadly defined resources; e.g. printers, storage devices, cameras, or computers, work stations, etc. Field 420G contains the domains with which the specific node can be associated, e.g. LA sales, California Engineering, Texas G&A. Some other examples of domains may be locations, such as CA, MI, NY, TX to indicate states, or logical associations such as Accounting, Sales and Engineering. Whereas a group defines categorizations of resources, a domain defines a physical relationship between a node and a resource. For example, if no physical link exists directly between a node and a resource then the domains listed in 420G in the node, e.g. server, record will not correlate with the domain associated with the resource (see FIG. 5B). Domains may also be used to provide logical separations. For example, if accounting functions should never be served by engineering machines, then particular machines can be made to belong to accounting or engineering domains, and resources can in turn belong to accounting or engineering domains. Thus, accounting resources will never be served by engineering equipment, and engineering resources will never be served by accounting equipment (even though they may physically be capable of such). Overlapping domains in the volume record of a volume and the server record of a node indicate a direct physical connection between the volume and the node.

Figure 5B:
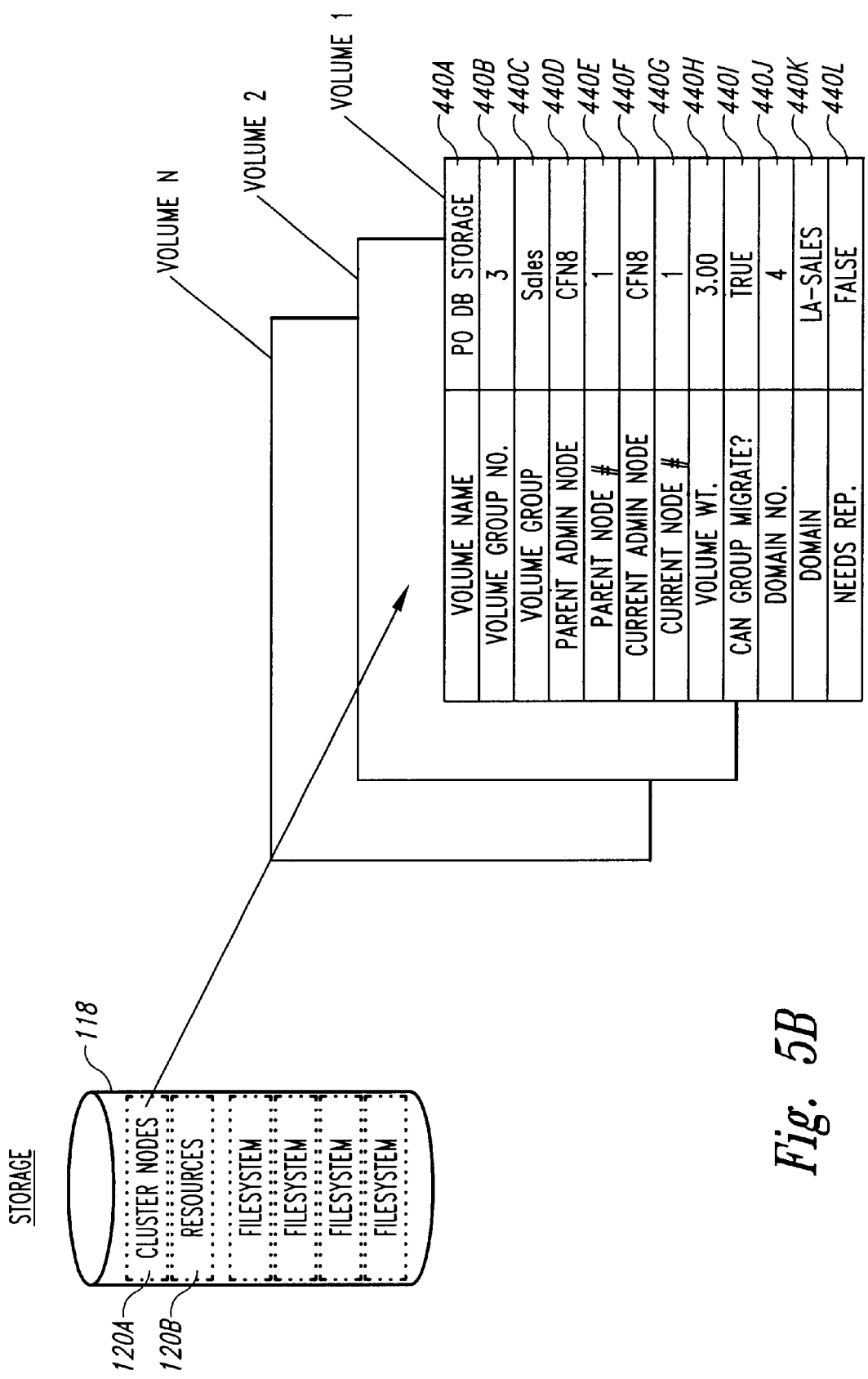

FIG. 5B shows the resource database 120B and the plurality of records for volume 1, volume 2 and volume N are shown. As has been stated before, resources may in alternate embodiments of the invention include volumes or printers or cameras, or computers, or combinations thereof. Volume 1 record is shown in detail. That record includes fields 440A–L. Field 440A is the volume name field which in the example shown is "PO DB storage." Field 440B–C contain respectively the volume group number and name which in the example shown are respectively "3" and "sales." Fields 440D–E contain respectively the parent administrative node and administrative node number which in the examples shown are "CFN8" and "1."Fields 440F–G contain the current administrative node and the current administrative node number which in the example shown are "CFN8" and "1." The current and parent administrative node fields are best understood in the context of the invention shown in FIG. 1B. The parent administrative node may correspond to the particular node which a network administrator has preferentially associated with a specific resource. In an embodiment of the invention, the administrative node of a volume is the server which handles at least the administrative portion of I/O requests for file system resources. The current administrative node is the node with which the resource is currently affiliated.

In a clustered system there are a plurality of nodes which are eligible for performing the administrative server functions for a specific volume. Determination of which among the servers can perform administrative server functions for a volume is based on a comparison of fields 440J–K of the volume record with fields 420G of the server record. These fields lists the domain and domain members for respectively a volume resource record and a server resource record. A resource/volume and a node/server must have one domain in common, i.e., overlapping in order for the node/server to be a candidate for performing the administrative server functions. Further, it must either have a group overlap between 440B–C and 420F or the field can group migrate 440I must be set to Boolean True. In the example shown, volume 1 has a domain "LA-sales" shown in fields 440J–K. An eligible node for that volume is a node which in the clustered node records (see FIG. 5A) contains in its domain fields 420G a domain corresponding to the domain in the volume record. In the example shown in FIGS. 5A–B, volume 1 may be affiliated with node 1 because node 1 has among its plurality of domain members in fields 420G the domain "LA-sales."Field 440I in each volume record in the resource database indicates whether the group with which the volume is associated can migrate, i.e. be administratively handled by another node in which 420F does not overlap 440B–C. In the example shown, the Boolean True is indicated. This indicates that volume 1 can change its administrative server affiliation outside those which match its group. Field 440H is the volume weight field. In the example shown volume 1 is assigned a weight of "3.0." The volume weight is a measure of the importance of a specific volume and may additionally correspond to the expected demand for a volume. For example, a back-up volume may have a lower weight than a primary volume as the backup is seldom accessed. The remaining field 440L contains Boolean True or False and indicates whether a volume record needs to be replicated to the memory of other nodes. In the example shown, field 440L contains the Boolean False indicating that no replication is required. Only fields 440F–G are dynamic and if needs replication 440L is set to Boolean True, only the fields 440F–G portion of the record needs replication, e.g. to be transmitted to other nodes (see FIGS. 9A–E, 10B–C).

Figure 5C:
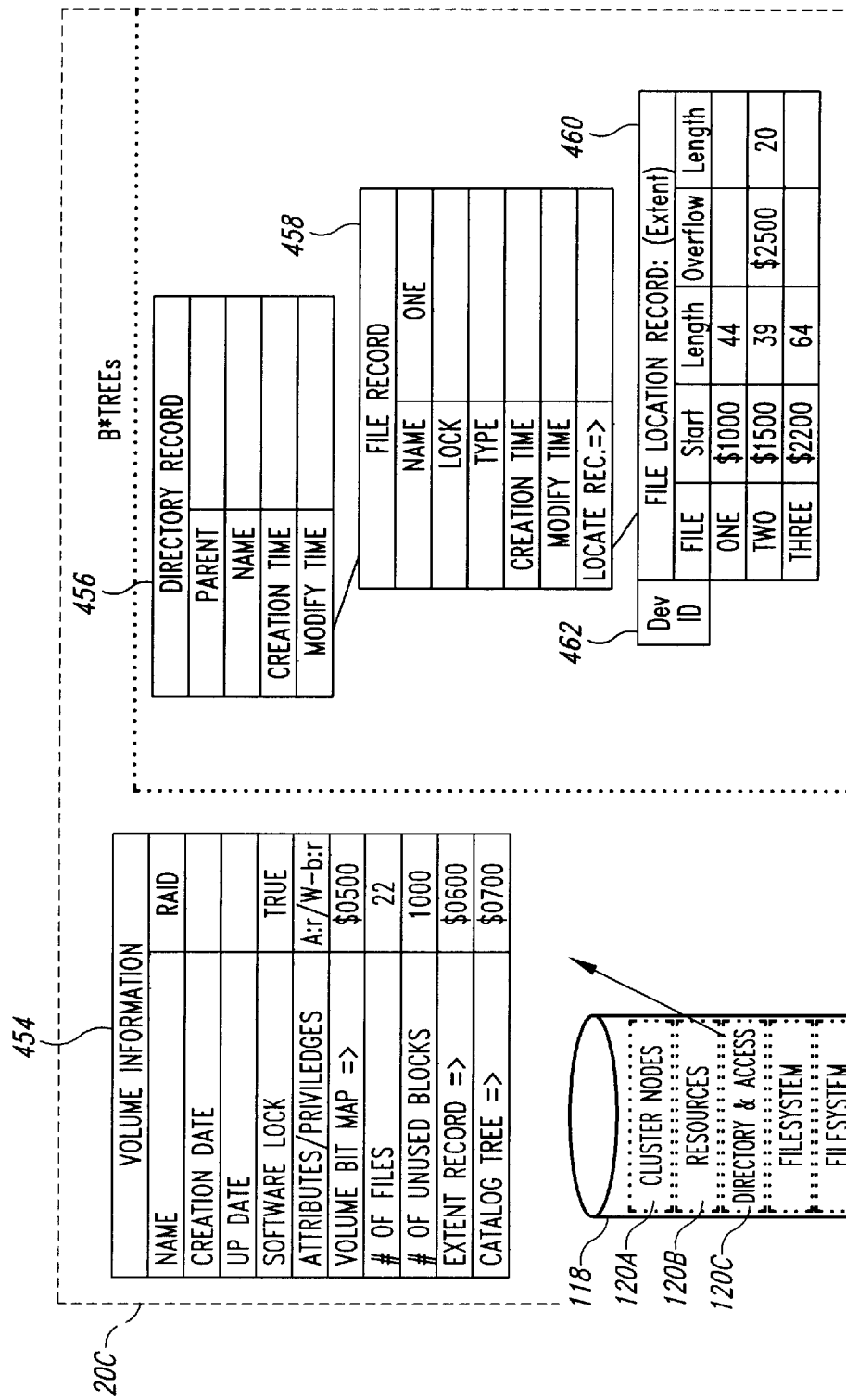

FIG. 5C is a detailed data structure diagram for a uniform file directory format which can be implemented in the directory/access database 120C of the cluster configuration database. Although not illustrated, those skilled in the art will understand that each resource/volume/file system, e.g. self-contained file system, contain a directory/access portion to maintain the physical layout of the file system. Alternate implementations of private network 112 in accordance with the current invention are set forth in the copending applications including International Application No. PCT/US97/12843 filed Aug. 1, 1997, entitled "Method and Apparatus for Allowing Distributed Control of Shared Resources" by inventors James J. Wolff and David Lathrop at pages 14–19 and FIGS. 2A–C which are incorporated herein by reference in their entirety as if fully set forth herein. Shown on FIG. 5C for the directory/access database are the volume record 454, a directory record 456, a file record 458, a file location record (Extent) also known as a block list 460. This directory structure is generally associated with the HFS file directory format associated with the System 8 operating system provided with the Macintosh® computers. The volume record 454 contains the name of the volume, its creation date, its update date, a software lock, a listing of attributes and privileges, a volume availability bit map, and a number of other parameters broadly defining the physical volume. Associated with the volume record 454 are a plurality of directory records of which record 456 is referenced. Each directory record includes a pointer to a parent directory, a name, a creation time and a modification time. Next are the plurality of file records associated with each directory of which file record 458 is referenced. Each file record contains a name, a type, a lock indicator, a creation and modification time and other file level information. Associated with each file and directory record are a plurality of file location records of which block list 460 is referenced. Each file location record includes a pointer to the physical address at which the file starts and an indication as to the length of the file. If a file is stored in noncontiguous segments, then there will be an overflow indicator indicating the physical address of the next portion of the file and the length of that portion. The file location record addresses and address lengths correspond to the actual physical address locations of the file contents. Each operating system has its own file directory structure differing in numerous aspects from the one disclosed in FIG. 5C. In an embodiment of this invention disclosed in the above mentioned earlier filed applications (see FIG. 2C protocol conversion modules 268 associated with each of client processes 214–216) enforce a uniform file directory format notwithstanding the operating system on each client. This assures that there is cross-platform compatibility (operability in a heterogeneous computing environment) between any application on either of the clients notwithstanding the OS that may be present on the client. Thus, a client running a Macintosh System 8® operating system can read or write a file created by another client operating with a Microsoft® Windows NT™, SGI® IRIX™, or SUN® Solaris™ operating system.

The use of the clustered node database in an embodiment of client load balancing shown FIG. 1A allows alternate paths between clients and resources to be determined in an intelligent manner based on the overall system architecture mapping contained in the clustered node database 120A. For distributed I/O shown in FIG. 1B all portions of the clustered configuration database with the exception of the lock 120D may be utilized. The lock is not required since distributed I/O does not require an alteration to the information stored in either the clustered node database 120A, the resource database 120B or their directory/access database 120C. What distributed I/O does require is a known repository for maintaining information as to the designated administrative server/node for each volume/resource. For resource load rebalancing shown in FIG. 1C, all portions of the configuration database 120A–D may be utilized. In this embodiment of the invention the lock 120D is required because load balancing involves changing information contained in the clustered configuration database, and insures only one node and do this at a time.

Figure 5D:
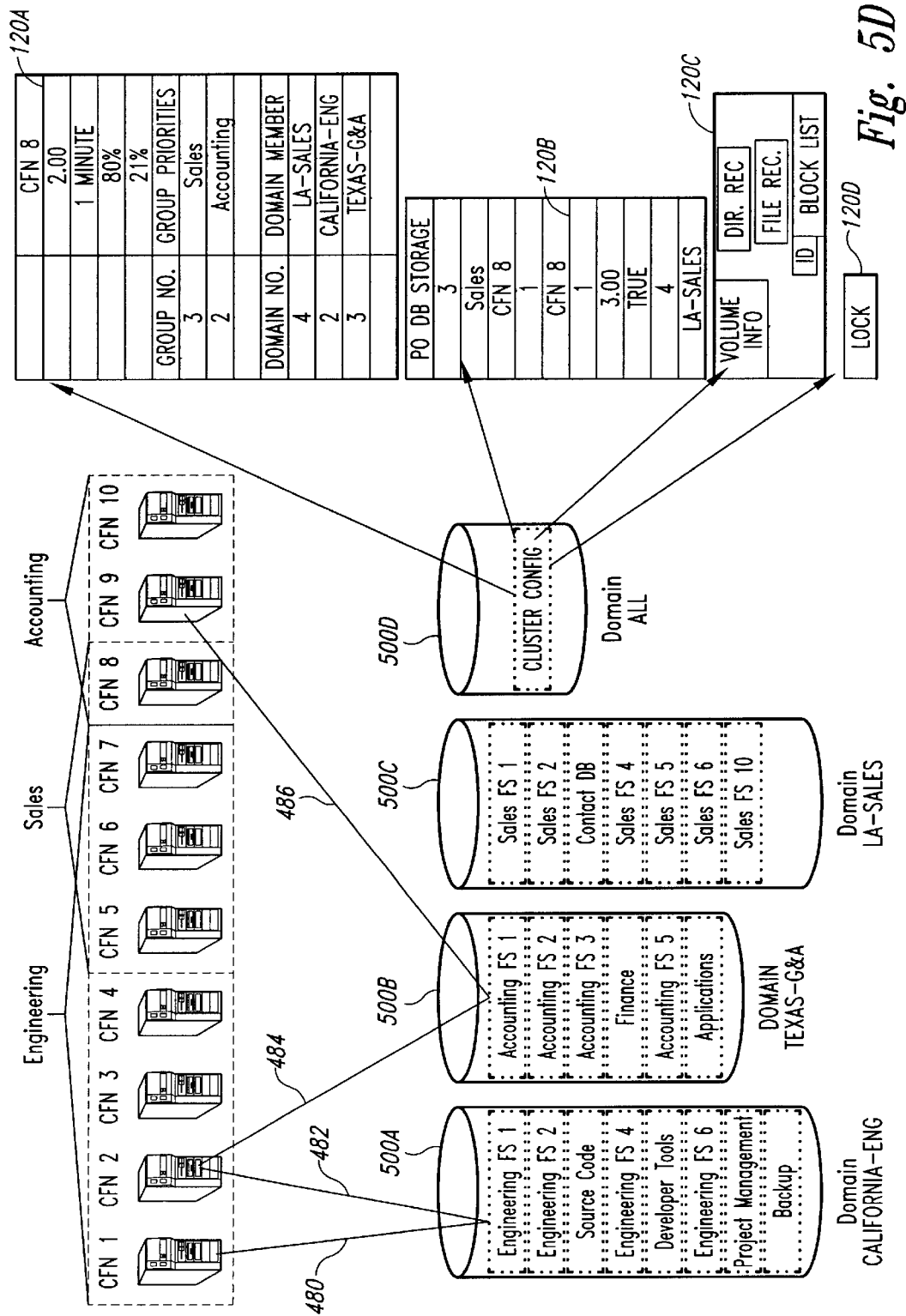

FIG. 5D shows the functional relationship of the databases illustrated in FIGS. 5A–C and the resources and nodes. Nodes CFN1–10, memory resources 500A–D, configuration databases 120A–D and file systems are shown. Servers CFN1–7 are associated with the group Engineering. Servers CFN5–8 are associated with the group Sales and CFN8–10 are associated with the group Accounting. CFN8 therefore is associated with both the Sales and Accounting groups. CFNs5–7 are associated with both the Sales and Engineering group. Thus in the node database shown in FIG. 5A Engineering would appear as the first of the group priorities in field 420F of the node record for servers CFN1–4. For CFN5–7 both Sales and Engineering would be listed in field 420F for group priorities. For CFN8 both Sales and Accounting would appear in field 420F. For CFN9–10 Accounting would appear in the group priority field 420F. In the domain field, 420G of servers CFN1 and CFN2 the domain California Engineering would appear as a domain member. This is indicated by reference lines 480–482 which indicates that server CFN1–2 have physical connections to memory resource 500A. In the domain member field, 420G for CFN2 and CFN9, Texas GNA would occur. This indicates a physical link between both CFN2, 9 and the memory resource 500B as represented by reference lines 484–486. Memory resource 500C belonging to domain LA Sales is illustrated, however no references are shown. The configuration database 120A–D resides in one location which in the example shown is memory resource 500D in a domain ALL indicating all nodes have access to it, and includes the clustered node database 120A, the resource database 120B, the directory/access database 120C and a lock 120D. The lock is utilized by whichever node is taking on the master role shown in FIG. 1C and replicating RAM copies/ rewriting the configuration database.

Figure 6:
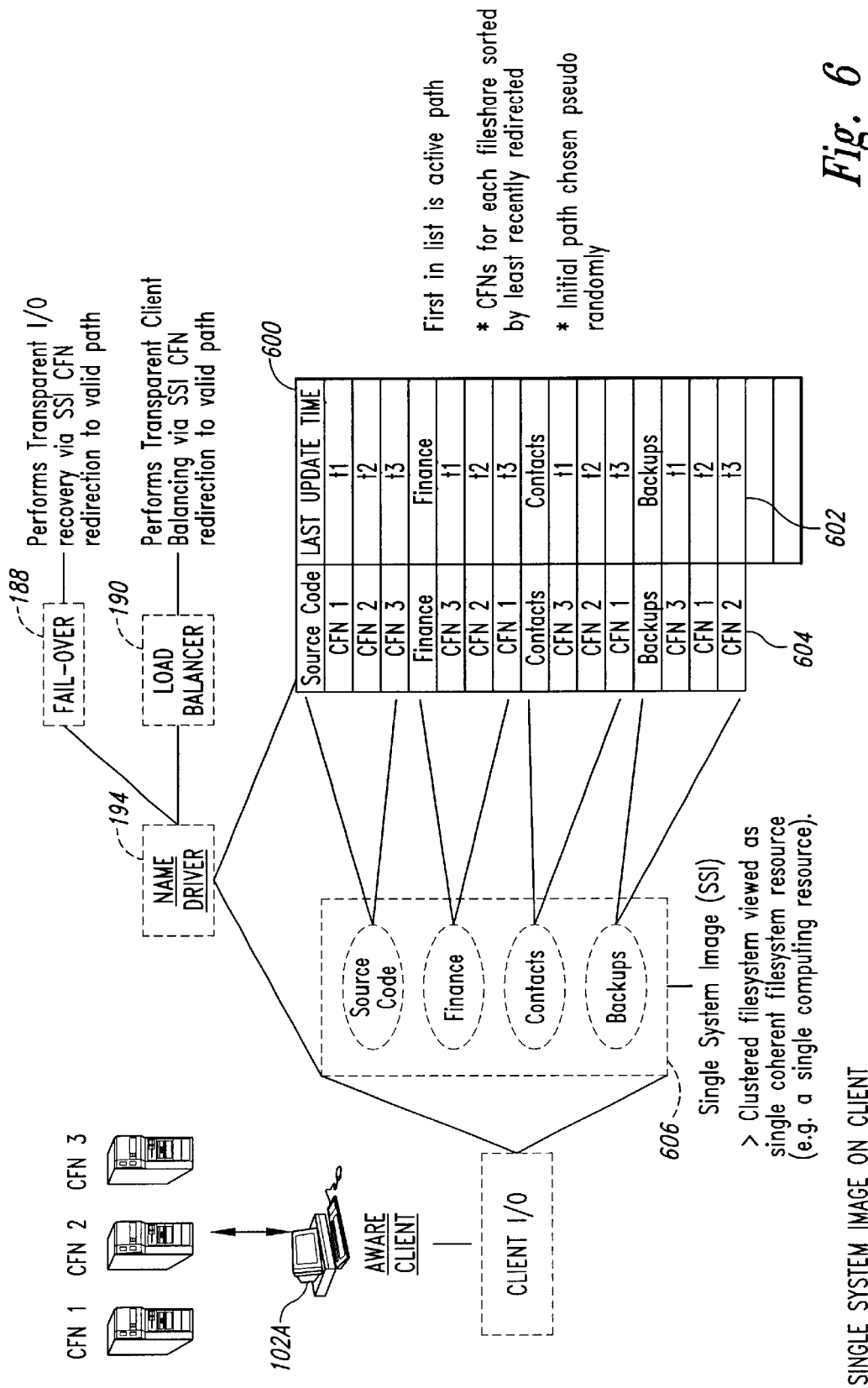
FIG. 6 shows an update table 600 maintained on an aware client 102A in accordance with an embodiment of client load balancing first introduced generally in FIG. 1A.

FIG. 6 shows an update table 600 maintained on an aware client 102A in accordance with an embodiment of client load balancing first introduced generally in FIG. 1A. The table shown in FIG. 6 may be generated by an aware client implementing an embodiment of client load balancing. An embodiment of client load balancing involves client decision making as to an alternate path to a resource subsequent to the receipt from a utilization server of a redirect command. To aid in the redirect decision a client as discussed above in connection with FIGS. 4C–D can passively redirect as told, passively pick any valid path, actively query other utilization servers or actively obtain a copy of the clustered node database 120A of the configuration database 120 (see FIG. 1A). The update table 600 is generated by the combined action of the fail-over module 188, the name driver module 194 and the load balancer module 190 first set forth and described in FIG. 2B. The name driver module 194 may maintain a list similar to update table 600 which records for each file system resource 606, the nodes 604 through which the file system can be accessed and for each of those nodes the time 602 at which the node was most recently used as an access point to the specific file system. On the basis of this list, a new path would be chosen subsequent to the receipt of a redirect command in the following manner.

Subsequent to the receipt of a redirect command with respect to an I/O request for a specific file system through a specific node the load balancer module 190 would look at the update table 600 in the name driver and would choose that node having access to the specific file system for which it has been instructed. In other embodiments the choice based on the node least recently used as an access point for that file system as the node to which to redirect the I/O request. Still other embodiments gather the utilization table in the clustered node database 120A, or query each node with valid path for utilization information, and then chooses the least utilized among valid paths. In the case of failed I/O, fail-over module 188 retires the I/O on another path based on the oldest time stamped path (least recently redirected). During fail-over module 188, the node to which a failure was detected is marked as failed. Periodically name driver module 194 sees if failed nodes have failed-back, and if so marks them as such so they may be considered for future I/O paths again.

FIGS. 7A–D show details of alternate embodiments of client load balancing introduced above in connection with FIG. 1A. FIGS. 7A–B show generally the context in which passive client load rebalancing embodiments are implemented. FIG. 7A shows the condition before a rebalance. FIG. 7B shows the condition after a rebalance. FIGS. 7A–B both show a plurality of aware clients 102A and normal clients 100A interfacing with a plurality of nodes, e.g. servers, one of which is referenced as server 104A. Each of the servers, in turn, interfaces with a clustered node database 120A which is shown on memory resource 118. Memory resource 118 may be a network attached peripheral or may itself be handled independently by a file server or load-balance monitor server or process. The cluster node database 120A may alternately be resident in the memory in each of the nodes. The cluster node database 120A is maintained by periodic updates from each of the nodes as to their current utilization. Utilization can, for example, correlate with processor activity as a percentage of total processor capability and/or I/O activity as a percent of total I/O capacity.

In FIG. 7A node 4, i.e. server 104A, has detected a utilization condition in excess of an overload threshold. Responsive to that determination server 104A reads the clustered node database 120A in whatever location it may reside, e.g. volatile or non-volatile memory on storage volume resource or in node memory. The server 104A determines which among those clients which account for its current I/O activity is an aware client. An aware client connects with a utilization server with a message indicating to the utilization server that the client is capable of running aware processes 102P1 (see FIG. 1A). In the example shown in FIG. 7, aware client 3 is sending I/O request 702 to server 104A. Server 104A additionally determines on the basis of the clustered node database 120A which among the remaining nodes 1–3 has access to the file system and aware client which is the subject of the I/O request 702 from aware client 3. The utilization server 104A then sends a redirect packet 700 including a command portion 700A and a optional path portion 700B. The command portion 700A contains a generic command and the optional path portion 700B contains the alternate path, e.g. alternate node through which the aware client may request the file system in the future.

In FIG. 7B aware client 3 responsive to the receipt of the command packet redirects I/Os for the subject file system along path 704 through node 3. Thus, the utilization level at node 4 is decreased. In the case the optional path portion 700B is not given, the client simply redirects future I/O to the least recently redirected, e.g. oldest, valid path.

FIGS. 7C–D show alternate embodiments of client node rebalancing known as active load rebalancing in which the aware client having received a redirect command performs the intelligent utilization decision making associated with choosing the actual redirect path. FIGS. 7C–D shows the plurality of aware clients 102A and normal clients 100A communicating via nodes 1–4 with file system resources on a memory resource 118. The memory resource 118 can be either a network attached peripheral accessible through a plurality of nodes or can be accessed through a fileserver.

In FIG. 7C aware client 3 and normal clients 1–2 are sending I/O requests 712 for a file system through node 4, e.g. server 104A. Server 104A determines that on the basis, for example, of a stored threshold value, that it is experiencing an overload condition. Server 4 then sends a redirect packet 710 to the aware client 3. The redirect packet 710 contains a command portion 710A but does not contain a redirect path as did the redirect packet in FIG. 7A. Thus, it is up to aware client 3 to determine an intelligent acceptable redirect path. The redirect path can be determined by aware 3 on the basis of the clustered node database 120A. Alternately the client can poll each of the nodes to determine their current utilization and put together a table similar to table shown in the following tables CLB-1 and CLB-2. Based on these tables an intelligent decision as to an alternate path can be made based on the % utilization of alternate nodes. In FIG. 7D a redirect path 714 has been established between aware 3 and Node 3.

The following Tables 1–2 show a composite view of a load balance table obtained by a node/server from the configuration database 120 in accordance with the passive embodiment of the client load balancing invention disclosed in FIGS. 7A–B. The table is a composite view that may be obtained by a node/server from the node and resource databases 120A–B of the configuration database 120. CLB1 and CLB2 show respectively the condition of the associated records in the configuration database before and after a load rebalance.

TABLE 1

| CFN | Update | LBTH | Cur Util. | Domain | Connections | Volumes |
|---|---|---|---|---|---|---|
| CFN1 | 1 Min | 95% | 45% | ALL | Aware 1 | Source Code Backups |
| CFN 2 | 1 Min | 75% | 45% | ALL | Aware 2 | Finance Contacts Backups |
| CFN 3 | 2 Min | 50% | 0% | ALL | | |
| CFN 4 | 1 Min | 80% | 95% | ALL | Aware 3 Normal 1 Normal 2 | Source Code Backups Finance Contacts |

Before load rebalance CFN 4 is at 95% utilization, while CFN 3 has 0% utilization. CFN 4 is in an overload condition in that its current utilization level exceeds its load balance threshold (LBTH) of 80%. If there is domain overlap for the volume record associated with the requested file system and the server record for CFN 3, i.e. in fields 440J–K and 420G respectively, and aware 3 is in the same domain, then the I/O requests 702 can be redirected from CFN 4 to CFN 3.

TABLE 2

| CFN | Update | LBTH | Cur Util. | Domain | Connections | Volumes |
|---|---|---|---|---|---|---|
| CFN1 | 1 Min | 95% | 45% | ALL | aware 1 | Source Code Backups |
| CFN 2 | 1 Min | 75% | 45% | ALL | aware 2 | Finance Contacts Backups |
| CFN 3 | 2 Min | 50% | 25% | ALL | aware 3 | Source Code Backups |
| CFN 4 | 1 Min | 80% | 70% | ALL | Normal 1 Normal 2 | Finance Contacts |

After load balancing, as shown in Table 2, aware 3 sends I/O requests along path 704 for the file system via CFN 3. As a result, utilization on CFN 4 has dropped to 70% and is below the load balance threshold. Thus, the clustered system of nodes and resources and clients has balanced load on nodes/servers by redirecting client I/O requests.

In an alternate embodiment of the invention, load balancing may be initiated not by the nodes sending a redirect command but rather by the clients detection of delays in the processor utilization of the nodes and or the I/O utilization of the nodes. Each client would maintain a table listing this utilization and make decisions similar to those discussed above in connection with FIGS. 7A–D to balance out the load.

In an alternate embodiment of the invention, the issuance of a redirect command would be based not on utilization above a threshold but rather on averaging the utilization level of all active nodes and redirecting I/O requests to those nodes with utilization levels below average.

Figure 8:
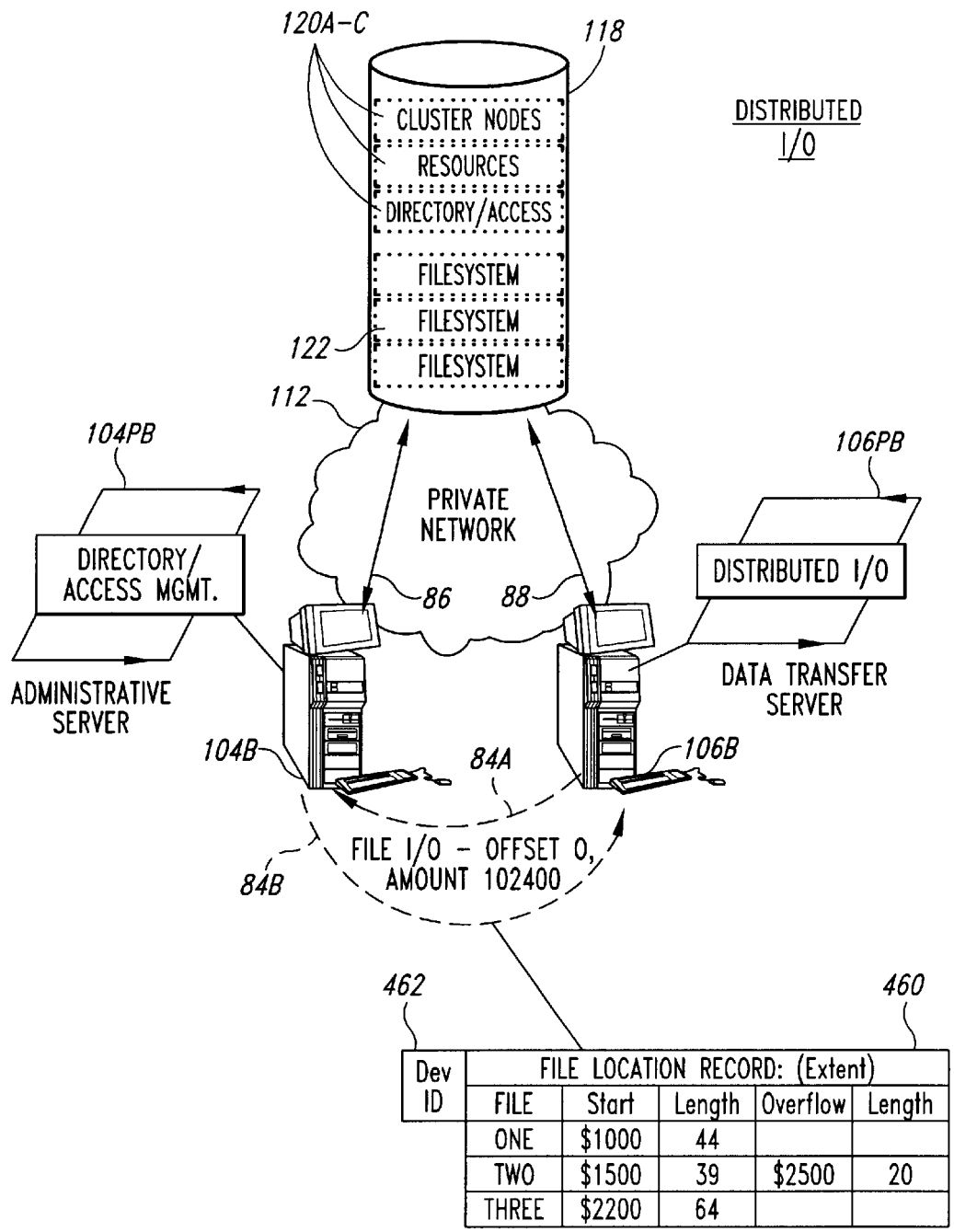
FIG. 8 shows the communication between a data transfer server and administrative server and the connection with distributed I/O processing shown and discussed above in connection with FIG. 1B.

FIG. 8 shows the communication between a data transfer server and administrative server and the connection with distributed I/O processing shown and discussed above in connection with FIG. 1B. The data transfer server 106B, the administrative server 104B and the memory resource 118A are shown interfacing over a private network 112. When the data transfer server receives an I/O request for a file system for which server 106B is not the administrative server (and the block list for the I/O in question is not already cached), server 106B transfers that request 84A in the form of a file I/O, offset and amount to the node listed in the RAM resident version of resource database 120B as the administrative server for that file system resource, e.g. server 104B. In response to receipt of that file I/O, offset and amount request the server 104B executes a processes introduced first above in connection with FIG. 1B and determines/handles any security or access issues and then determines if there are no such issues the physical location of the file sectors on memory resource 118 to which the I/O requests for file systems 122 should be directed. The administrative server returns this information 84B in the form of a block list 460 and device ID 462 such as that shown in FIG. C. Subsequent to the receipt of the block list the data transfer server 106B handles all the subsequent processing connected with the reading or writing of data to or from the memory resource 118 on which the requested file system 122 resides along path 88.

As has been discussed above in connection with FIG. 5B, there is at any point of time one and only one administrative server for any specific file system. The administrative server for each file system resource is listed in the resource database record for that file system in specifically field 440F–G (see FIG. 5B). Thus, a server can be performing concurrently processes initiated by I/O requests to different file systems for some of which it performs as a data transfer server, for others as an administrative server, and for still others as both.

FIGS. 9A–E show various details related to resource load rebalancing introduced above in connection with FIG. 1C. Resource load rebalancing can occur on demand, in response to a new node coming on line, in the event of system fail over and in the event of a fail back.

Figure 9A:
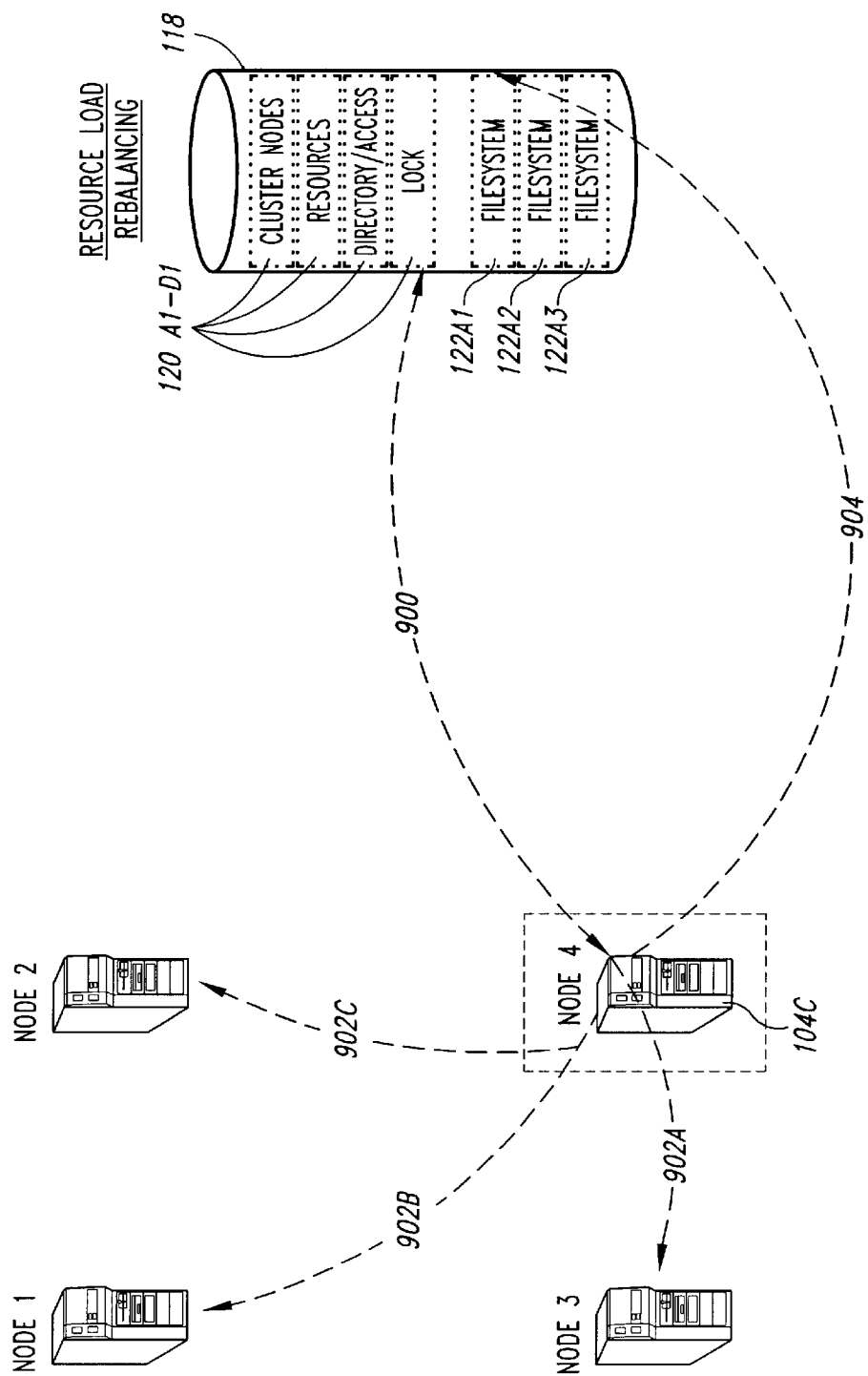
FIGS. 9A–E show various details related to resource load rebalancing introduced above in connection with FIG. 1C.

FIG. 9A shows four nodes, 1–4, one of which nodes is a server referenced as server 104C which has just come on line and therefore needs to enter the configuration database. This is accomplished by server 104C obtaining temporary master status with respect to the rebalancing to the configuration database. Master status is initiated by server 104C placing 900 a semaphore/tag/lock 120D1 on the configuration database thereby preventing temporarily any other node from seizing control of the configuration database. Server 104C obtains a copy of the configuration database 120 either from memory resource 118 if it is the first node up, or from another node that is already up, and begins the processes which will be described and discussed in greater detail in connection with FIGS. 9C–E, 10B–D for rebalancing the configuration database. When rebalancing is complete it is necessary for the changes rebalancing has caused to be replicated to the other nodes and possibly written to the configuration database 120A1–C1. Coincident with the updating of the configuration database is a replication of the RAM resident copy of the database from server 104C to nodes 1, 2 and 3 as indicated by reference lines 902A–C. Subsequently the lock is removed. In this fashion a new node enters the configuration database and rebalances system resources to reflect its additional processing capability and to claim those file system resources with which it is preferentially associated.

Figure 9B:
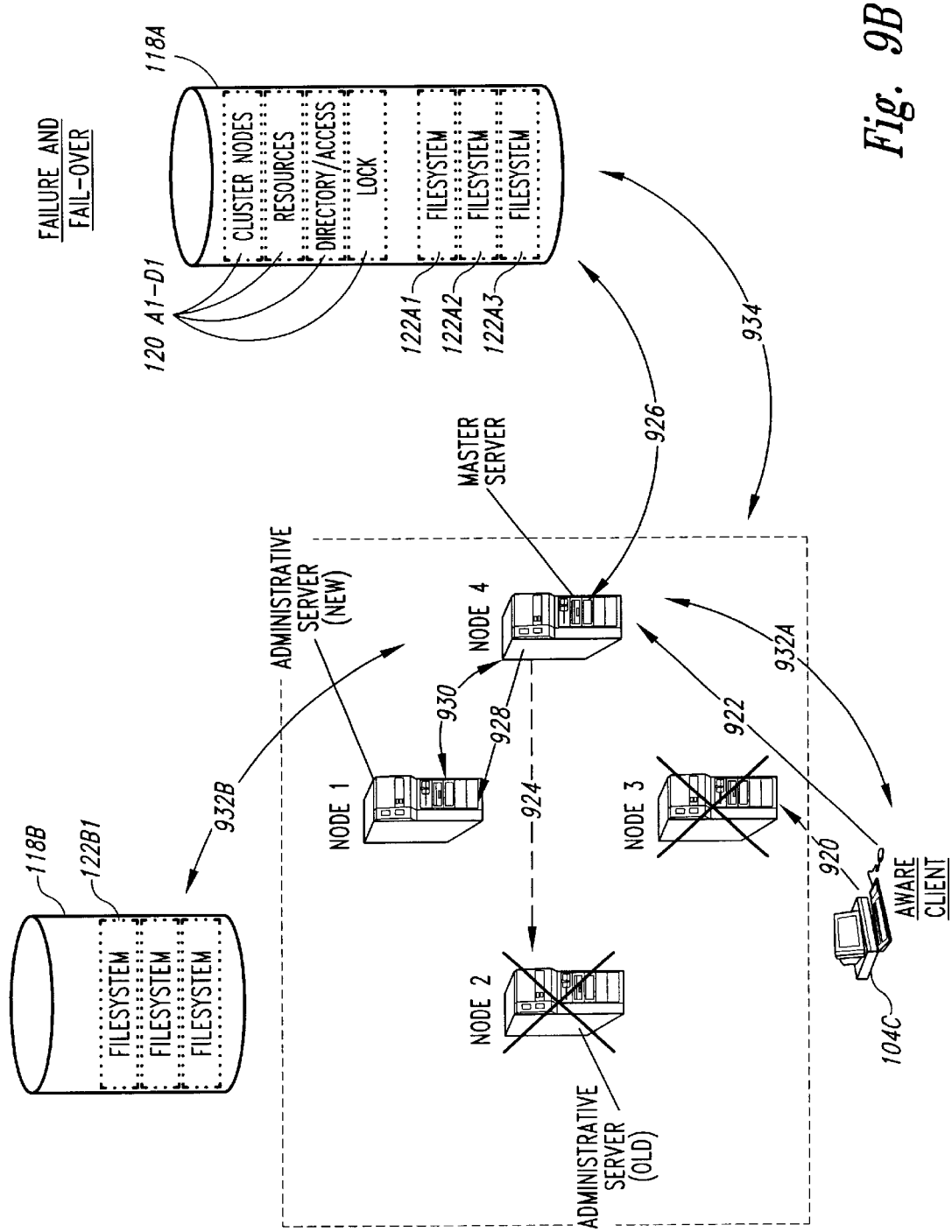

FIG. 9B shows an overall environment in which a failure of one or more nodes prompts resource load rebalancing. An aware client 102A, clustered nodes 14, and memory resources 118A–B are shown. Memory resource 118A contains a configuration database 120A1–D1 and a plurality of file systems 122A1–A3 and a directory and access table for each file system. Memory resource 118B contains a plurality of file systems of which file system 122B1 is referenced. Additionally, memory resource 118B contains for each file system a directory and access table.

At time T=0 aware client 102A sends an I/O request 920 via node 3 for a file system 122B1 on memory resource 118B. The absence of a response to that request resulting from the failure of node 3 causes the aware client to obtain from its namespace an alternate node through which the file system may be accessed. Node 4 appears in the configuration database as having a domain that overlaps with the domain of the file system. A server and a resource are said to be in the same domain space if the domain fields 440J–K (see FIG. 5B) for the resource record overlap with one of the domain members in fields 420G (see FIG. 5A) of the node/server record in the configuration database. Thus, aware client 102A sends an I/O request 922 to node 4. Node 4 looks at a copy of the configuration database in its memory and determines that there is an administrative server for file system 122B1 and that the current administrative node fields 440F–G (see FIG. 5B) indicate node 2. Thus, node 4 initiates an I/O request 924 to node 2 the designated administrative server for file system 122B1.

In the example shown no response to that I/O request is received node 4 concludes that the administrative server for the volume has failed. In response node 4 seizes the lock 120D1 for the configuration database and thereby obtains master status with respect to the onset of resource rebalancing which it has initiated. Node 4 accomplishes rebalancing, which will be discussed in greater detail in FIGS. 10B–D. During that rebalancing a new administrative server for each file system may be chosen. Different file systems may have different administrative servers. In the example shown node 1 is designated as administrative server for file system 122B1. Node 4 during the interval over which it has master status, appoints additional administrative servers for each resource as necessary to rebalance the resources according to the configuration policy dictated by the clustered configuration database.

Subsequent to rebalancing node 4 may send an updated copy 926 of the configuration database to memory resource 118B. Node 4 replicates the configuration database by sending a replicated copy 928 of changes to clustered nodes including node 1 and may update 934 the configuration database 120A1–C1 and remove the lock 120D1. Next the I/O request 930 is passed from node 4 to node 1. Finally, the transfer of data 932A–B between aware client 102A and file system 122B1 is accomplished.

Although in the embodiment shown in FIG. 9B both resource load rebalancing and distributed I/O are combined to achieve the benefits of both, it is obvious that load rebalancing may be implemented without distributed I/O by defining a single server as an access point for each file system at any point in time.

Figure 9C:
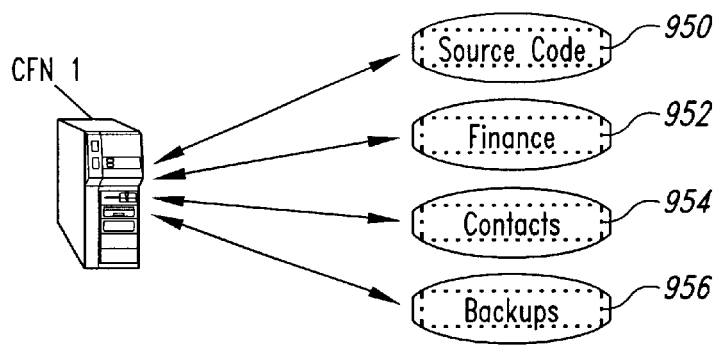
Figure 9D:
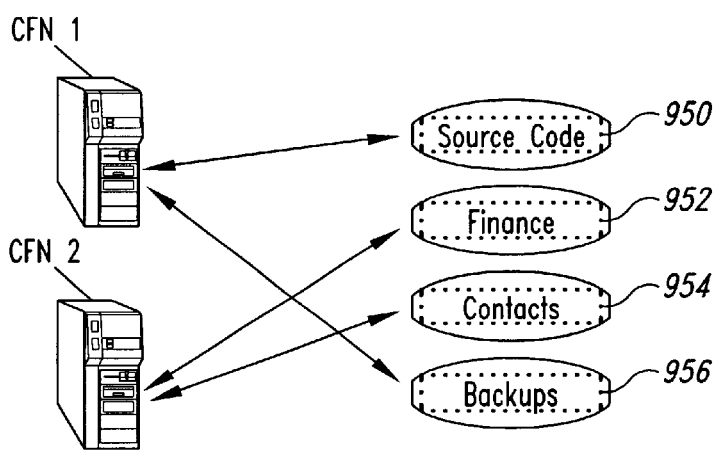
Figure 9E:
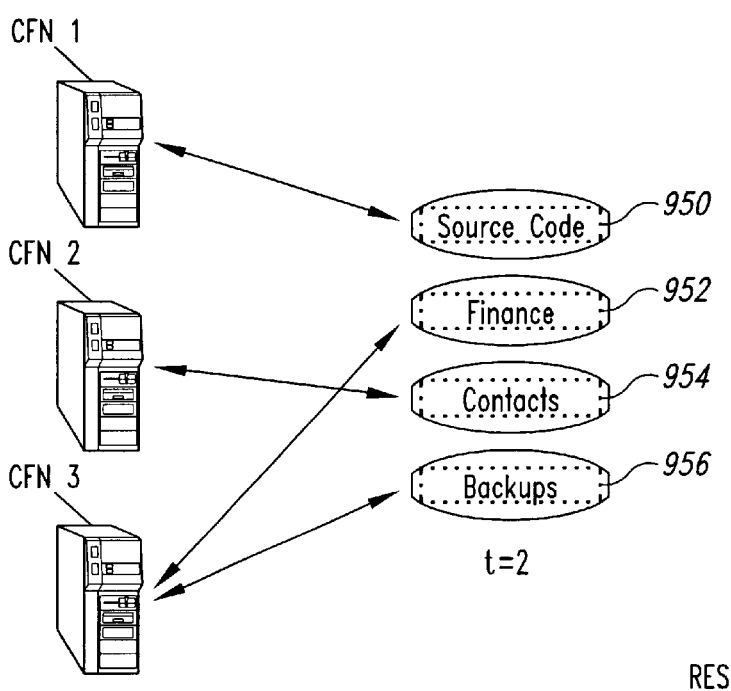

FIGS. 9C–E show redistribution of I/O requests between file system resources and node resources as more node resources become available. FIG. 9C shows four file systems 950–956 respectively labeled as source code, finance, contacts and backup. These file systems may reside on one or more nodes/storage devices. FIG. 9C shows at time period T=0 I/O requests handled by node CFN1 to all of the above-mentioned file systems. FIG. 9D shows at time T=1 that two nodes are available to handle I/O requests to the file systems 950–56, i.e. CFNs 1–2. CFN 1 is shown handling the I/O requests for file systems 950 and 956. CFN 2 is shown handling the I/O request for file systems 952–54. FIG. 9E at time T=2 shows that three nodes, i.e. CFN 1–3 are available to handle I/O requests to file systems 950–56. CFN 1 is shown handling I/O requests to file system 950. CFN 2 is shown handling I/O requests to file system 954. CFN 3 is shown handling I/O requests to file systems 952 and 956. The following tables show the alterations to the volume database records in the configuration database that occurs as each new node that comes on-line takes on master status and rebalances the configuration database. Rebalancing will be described in detail in FIGS. 10B–D.

For purposes of simplification, the following tables 3–5 taken at t=0, t=1 and t=2 show key fields and records in the resource database and the cluster node database during the rebalancing shown in FIGS. 9C–E.

At times t=0, t=1 and t=2, key features of the four records shown on the four rows of the resource database are shown. During each of these intervals the only alteration to any of the records in the volume database is an alteration in the current administrative node field which corresponds to fields 440F–G discussed above in connection with FIG. 5B. The entry in these fields indicates which among the available nodes will handle the administrative processing for a particular file system.

TABLE 3

| | t = 0 Volume Database | | | | | | Node Database | | |
|---|---|---|---|---|---|---|---|---|---|
| Volume Name | Volume Group | Admin. Preferred | Admin. Current | Vol. Wt. | Migrate ? | Domain | Node Name | Node Wt. | Grp. Priority |
| 950 Source Code | Eng. | CFN1 | CFN1 | 2 | TRUE | ALL | CFN 1 | 1 | Eng. |
| 952 Finance | Acct. | CFN3 | CFN1 | 2 | TRUE | ALL | | | |
| 954 Contacts | Sales | CFN2 | CFN1 | 2 | TRUE | ALL | | | |
| 956 Backups | Any | CFN3 | CFN1 | 1 | TRUE | ALL | | | |

As shown in Table 3, at time t=0, node 1, i.e., CFN 1 is listed as the current administrative node for each of file systems 950–56. In the example shown all file systems 950–56 have a specific name, group affiliation, administrative node/server preference. Additionally all file systems 950–56 can migrate and can be accessed by any server/node no matter what the domain affiliation of the node is. This last result is indicated by the fact that the domain field for each of the file systems 950–56 equals "ALL." The source code finance and contacts file systems 950–54 are assigned volume weights of "2" while the backups file system is assigned a volume weight of "1." In an embodiment of the invention this weighting would indicate that file systems 950–54 are expected to be the subject of more I/O requests than will file systems 956, the backups volume.

Because there are no migration or domain constraints, the only issues as new nodes come on-line at t=1 and t=2 illustrated by these tables are the issues of assignment of a node to a particular volume. Within the context of these tables, five factors dictate those decisions. Those factors are the volume weight, volume group affiliation, the volume administrative server preference, and the node weight and group priority of the server. Node weight may be an indication of server processing capability or I/O capability.

The resource rebalancing process is described in detail in the description of FIGS. 10B–D, however briefly and example of what occurs in this process is described next. The server who has master status adds up the volume weights of all existing volumes which in the current case total 7. The master then adds up the total node weight of all available nodes, e.g. servers. On the basis of these two totals, a balanced volume weight is established for each of the available servers. The volume limit for each server is based on the simple calculation which establishes the servers node weight as a percentage of the total of all available servers node weights and multiplies that times the sum of all volume weights. ((Node Weight/Total Node Weight)*Total Volume Weight.) The resultants number greater than 1 is the volume limit for that server. As each volume is assigned to a server, its volume weight is added to the total weight of all volumes assigned to this server and compared to the limit. When the limit is reached, generally no further volumes will be assigned to that server. In choosing which volume to assign to which server, several factors are considered. First, a server will be preferentially assigned to a volume which lists the server as a preferred administrative server. Second, where a match between a volume and a server listed as the volume's preferred administrative server is not possible, an attempt will be made to match a volume with a server on the basis of the volume's group affiliation and the server's group priorities.

identical node weight of 1 to that of CFN 1. Therefore, each of those servers should be the administrative server for volumes whose total volume weight is 3.5 or half of the weight of all volumes/file systems 950–56. CFN 1 is affiliated with file system 950 for which it is listed as the administratively preferred server and with file system 956 for which it is not listed as the administratively preferred server. The total weight of the volumes to which CFN 1 is assigned is 3 or 42% of the total volume weight. CFN 2 is assigned to file system 952 and to file system 954 for which it is listed as the administrative server. The total weight of the volumes to which it is assigned is 4 or 57% of the total volume weight.

TABLE 5

| | t = 2 Volume Database | | | | | | | Node Database | | |
| --- | --- | --- | --- | --- | --- | --- | --- | --- | --- | --- |
| Vol. Name | Group | Admin. Preferred | Admin. Current | Vol. Wt. | Migrate ? | Domain | | Node Name | Node Wt. | Grp. Priority |
| 950 Source Code | Eng. | CFN1 | CFN1 | 2 | TRUE | ALL | | CFN 1 | 1 | Eng. |
| 952 Finance | Acct. | CFN3 | CFN3 | 2 | TRUE | ALL | | CFN 2 | 1 | Sales |
| 954 Contacts | Sales | CFN2 | CFN2 | 2 | TRUE | ALL | | CFN 3 | 4 | Acct. |
| 956 Backups | Eng. | CFN3 | CFN3 | 1 | TRUE | ALL | | | | |

At time t=2 as indicated in Table 5, CFN 3 has come on-line and it has a node weight of 4 reflecting significantly greater I/O and/or processing bandwidth than that of either CFN 1 or 2. CFN 3 should therefore be administratively affiliated with a high percentage of the total volume weights. In the example shown, CFN 1 is the current administrative server for file system 950 for which it is designated as the preferred administrative server. The total volume weight assigned to CFN 1 is 2 or 28% of the total. CFN 2 is assigned to file system 954 for which it is the preferred administrative server. The total volume weight assigned to CFN 2 is 2 or 28% of the total. CFN 3 is assigned to both file systems 952 and 956 for each of which it is also listed as the administrative preferred server. Thus, CFN 3 is assigned volumes whose total weight is 3 or 42% of the total.

FIGS. 10A–H shows the processes implemented on each node in order to implement load balancing, distributed I/O, and resource rebalancing.

Figure 10A:
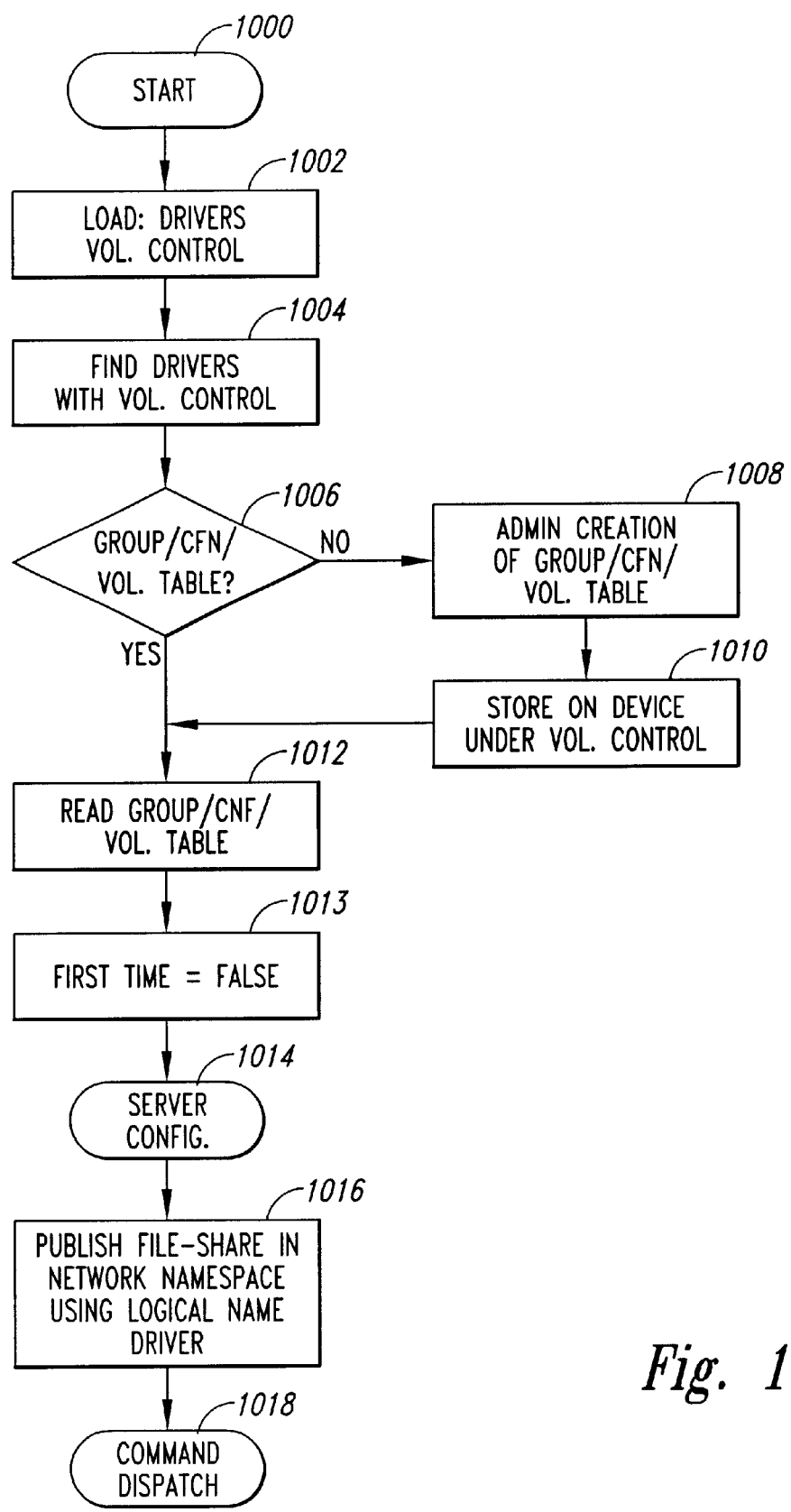
FIGS. 10A–I show the processes implemented on each node in order to implement load balancing, distributed I/O, and resource rebalancing.

In FIG. 10A, the process associated with power up of a single server in a network is illustrated (there may or may not be other servers already on the network when this happens). The server being powered up is referred to as the server of interest while the other servers which are active on the network are referred to as active servers. The computer is powered up at start 1000. Control is then passed to process 1002 where the volume control processes and the device drivers shown in FIG. 2A are loaded. Control then passes to

TABLE 4

| | t = 1 Volume Database | | | | | | | Node Database | | |
| --- | --- | --- | --- | --- | --- | --- | --- | --- | --- | --- |
| Volume Name | Group | Admin. Preferred | Admin. Current | Vol. Wt. | Migrate ? | Domain | | Node Name | Node Wt. | Grp. Priority |
| 950 Source Code | Eng. | CFN1 | CFN1 | 2 | TRUE | ALL | | CFN 1 | 1 | Eng. |
| 952 Finance | Acct. | CFN3 | CFN2 | 2 | TRUE | ALL | | CFN 2 | 1 | Sales |
| 954 Contacts | Sales | CFN2 | CFN2 | 2 | TRUE | ALL | | | | |
| 956 Backups | Any | CFN3 | CFN1 | 1 | TRUE | ALL | | | | |

At time t=1 as indicated in Table 4, node 2, e.g. CFN 2, is on-line as indicated in FIG. 9D. That server has an process 1004 where the driver connected to the physical volume is identified. Control then passes to a decision process 1006 where a determination is made whether a clustered configuration database is in existence on the active servers. When the determination is negative, control passes to process 1008 where the volume control presents to an administrator on a template on which to create a clustered configuration database table. Control is then passed to process 1010 where the new table is stored on a device under volume control. Control then passes to process 1012. Alternatively, when the determination in decision process 1006 is positive, then control is passed directly to process 1012.

In process 1012 the clustered configuration database 120A–C (see FIGS. 5A–D) is read. Control then passes to 1013 where a variable "first time" is set to Boolean False. Control then passes to the server configuration subroutine 1014 which distributes the resources/volumes/file systems among the servers and brings the server of interest on line. (see FIG. 10B) Control then passes to process 1016 where a logical name driver loaded in process 1002 builds a database of available resources and paths to the resources and publishes the information in the network namespace. Control then passes to the command dispatch subroutine 1018 where commands are distributed as illustrated in FIG. 10E.

Figure 10B:
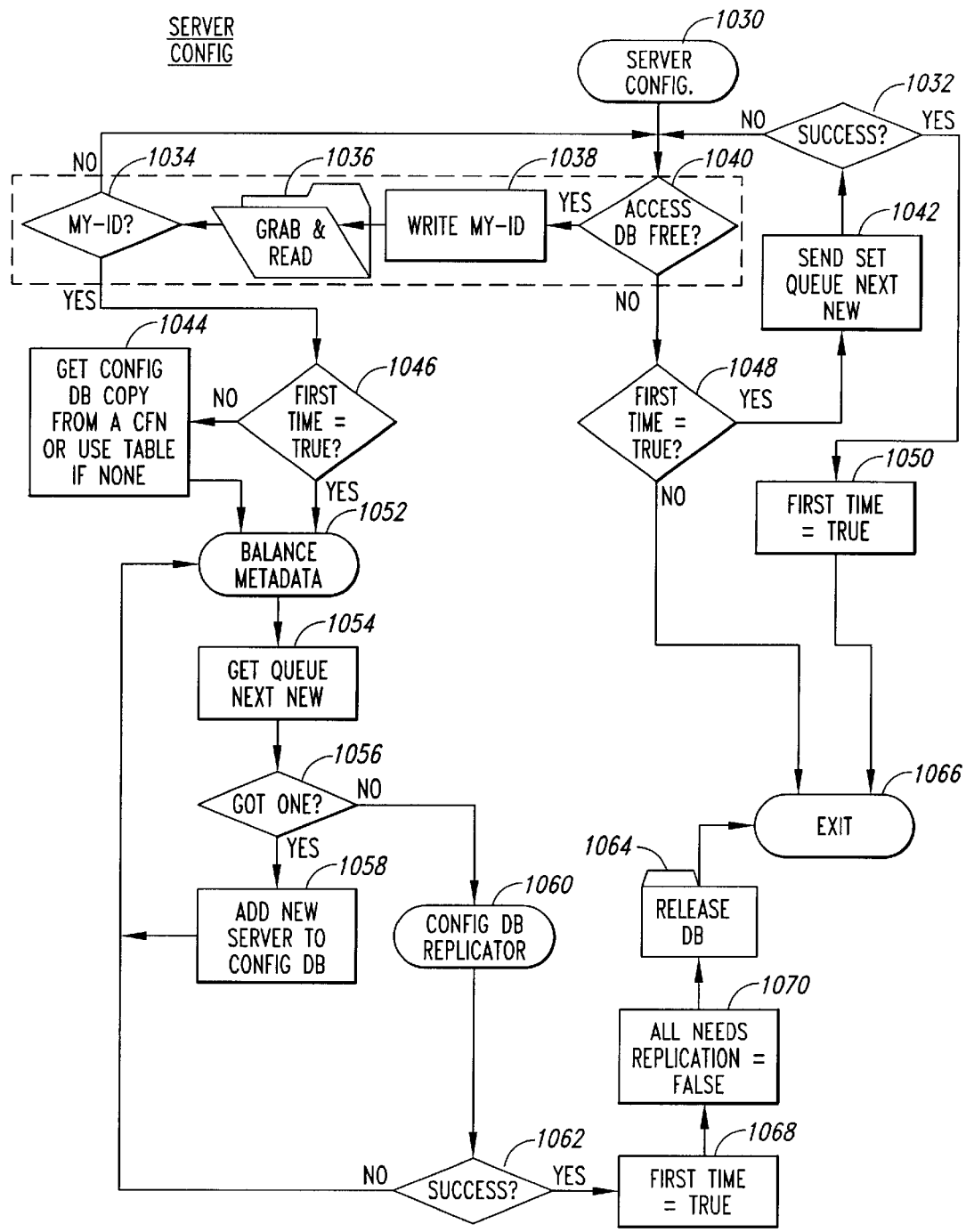

In FIG. 10B, the process associated with configuring the node and rebalancing the configuration database is shown. These processes define a load balancing function that implements these policies. The configuration is initiated at process 1030 and control is passed to decision process 1040. At decision process 1040 a determination is made whether the lock 120D field is empty (see FIG. 5D). When the determination is negative control passes to decision process 1048 where a determination is made whether the node is on the network for the first time by comparing the variable "first time" to Boolean False. When the determination is negative control passes to process 1066 where the configuration and balancing process is exited. No balancing is needed because the node is already part of the on-line, RAM resident replicated configuration database 120 among the nodes and someone is already rebalancing because the lock 120D (see FIG. 1C) is held, thus the resources will indeed rebalance accordingly accounting for this node as well. When the determination is positive the control passes to process 1042. In process 1042 the node determines which other server has the lock and sends that server a request to be queued as a new node on the network. Control then passes to decision process 1032 where a determination is made whether the queue request was successful. When the determination is negative the control is returned to decision process 1040. When the determination is positive the control is passed to process 1050 where the variable first_time is set to Boolean True. Control is then passed to process 1066 where the configuration and balance process is exited.

When the determination at decision process 1040 is positive, i.e. a lock is not present, control is passed to process 1038. At process 1038 a node identifier is written into the lock 120D field (see FIG. 5D) upon successful reservation of the sector in which the lock exists. Control then passes to process 1036 where the value for the lock field is read to confirm the placement of the lock. Control is then passed to decision process 1034 where a determination is made whether the value in the field corresponds to the server I.D. of the server being configured. When the determination is negative, i.e. when another CFN is rebalancing the servers, control is returned to decision process 1040. When the determination is positive, control is passed to decision process 1046 where a determination is made whether the CFN needs a configuration database. When the determination is negative the control is passed to the balance metadata subroutine 1052 (See FIG. 10D). When the determination is positive control is passed to process 1044 where a configuration database is obtained before control is passed to the balance metadata subroutine 1052. Subroutine 1052 allows the server, having asserted master status by placing the lock on the configuration database, to rebalance the configuration database. Control is then passed to process 1054.

In process 1054 a queue of server rebalance requests is accessed. Control is then passed to decision process 1054 where a determination whether any new requests for rebalancing have been made since configuration of the node has been initiated. If the determination is positive control is passed to process 1058 which adds the requesting server to the configuration database. Control is then returned to the balance metadata subroutine 1052. If the determination at process 1056 is negative control is passed to subroutine 1060. At subroutine 1060 the rebalanced configuration database is replicated to the other CFNs. Control is then passed to the decision process 1062 where a determination whether the replication was successful. If the determination is negative control is returned to the balance metadata subroutine 1052 because there was a node failure and the database needs to be rebalanced again to account for this fact. If the determination is positive control is passed to process 1068 where the variable "first time" is set to Boolean True. Then process 1070 sets all needs replication fields 440L of the resource database portion of the configuration database to Boolean False. Then control is passed to process 1064. At process 1064 the configuration database is released by removing the node identifier from the semaphore field and releasing the reservation of the sector in which the lock was located. Control then passes to process 1066 where the configuration and balance process is exited.

Figure 10C:
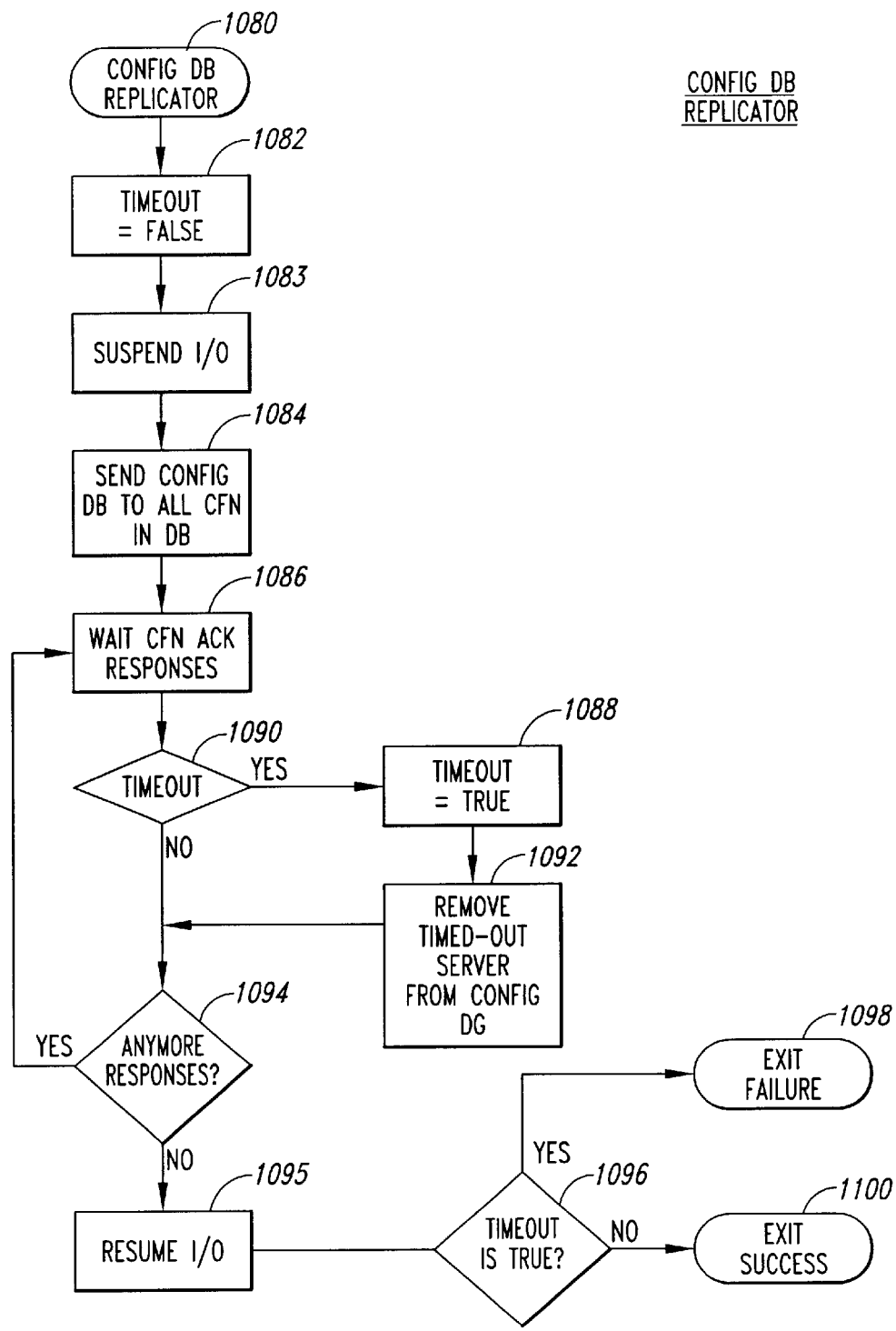

FIG. 10C illustrates the subroutine 1060 of FIG. 10B. The subroutine serves to insure that each node has the same copy of the cluster configuration database 120A–B. The subroutine is initiated at process 1080 and control is passed to process 1082, which sets a variable "timeout" to Boolean False. Control is then passed to process 1083 where the nodes are brought to a quiet state in which all I/O is suspended. This is done by sending a suspend I/O command to each node and receiving a response from each. Control is then passed to process 1084 where the node sends the changes the node made in the configuration database to all the other nodes listed in the configuration database. It determines what to send by looking at the needs replication field 440L (see FIG. 5B) for Boolean True and only sends the current admin 440F–G fields to each node, thus replicating the changes made in the database. Control is then passed to process 1086 where the node waits for confirmation that each CFN has received the changes. Control then passes to decision process 1090 where the determination is made whether a timeout has occurred while waiting for confirmation from a particular node. When the determination is positive control is passed to process 1088 where the variable "timeout" is flagged as Boolean True. Control then passes to process 1092 where the flagged node is removed from the configuration database, and is assumed failed. Control is then passed to decision process 1094. When the determination at decision process 1090 is negative the control is passed directly to decision process 1094.

At decision process 1094, the determination is made whether the node needs to check additional nodes for confirmation. When the determination is positive control is returned to process 1086. When the determination is negative, indicating that each node on the configuration database has been checked for confirmation, the control is passed to decision process 1095. In decision process 1095, the opposite of process 1083 takes place, i.e. the nodes are sent a resume I/O message and confirmations are received, then control is passed to decision process 1096. In decision process 1096 a determination is made whether the variable "timeout" is Boolean True. When the determination is positive the control is passed to process 1098 where the subroutine is flagged as failing before being exited, indicating to the calling process that there were at least one node failure during replicating and the resources need rebalancing again to account for this. When the determination is negative control is passed to process 1100 where the subroutine is flagged as successful before being exited.

Figure 10D:
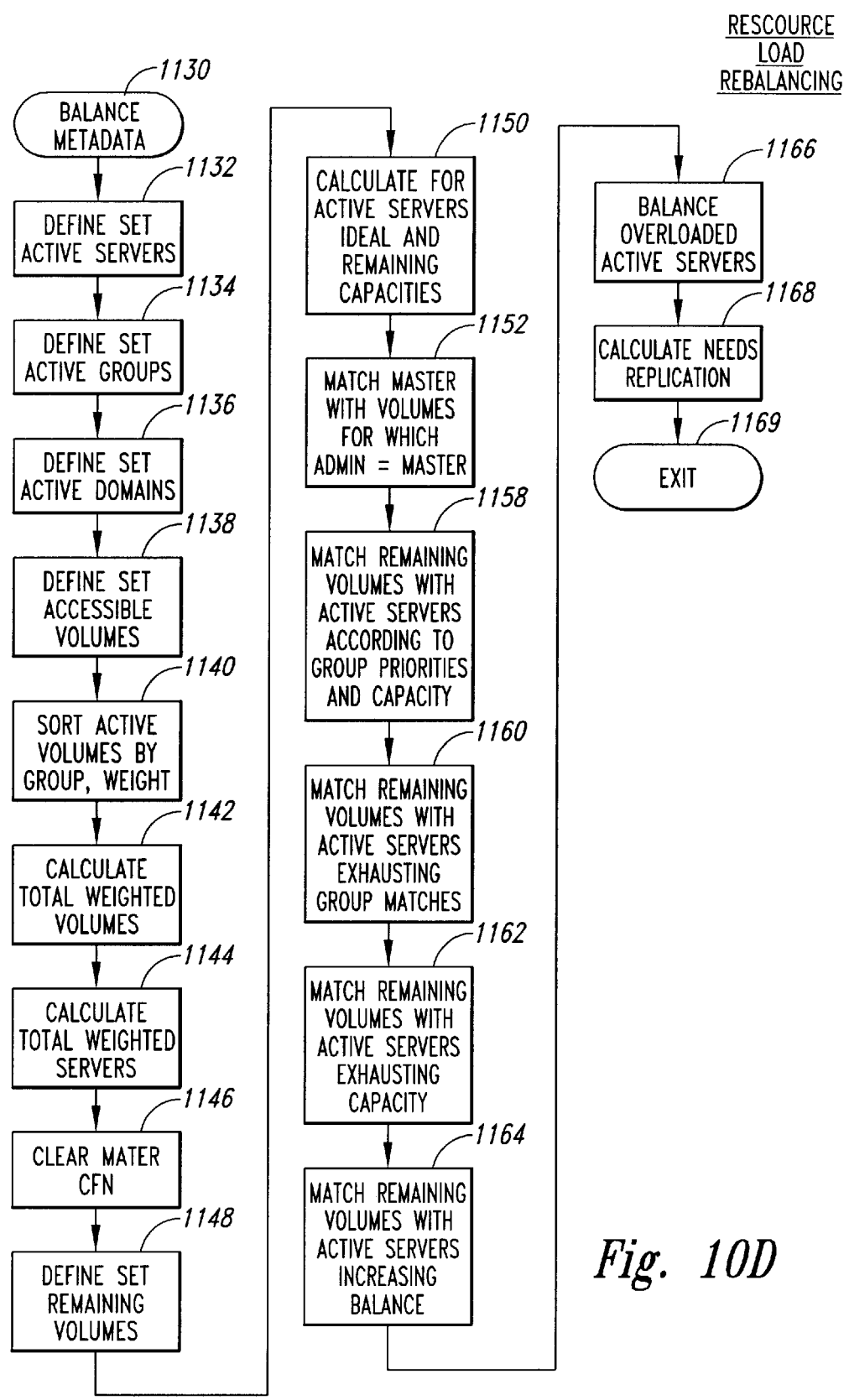
Figure 10E:
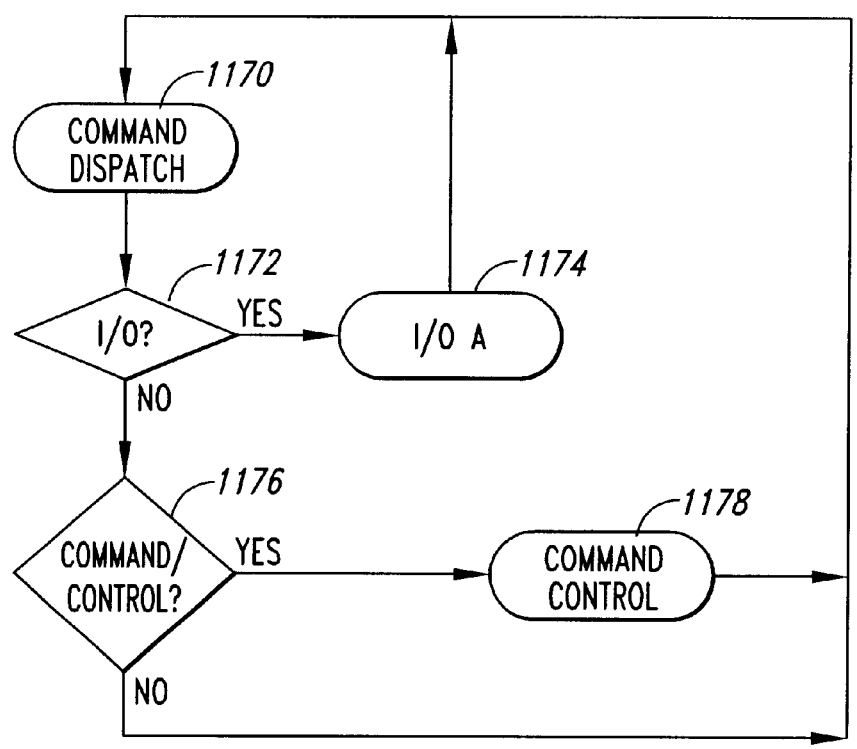

FIG. 10D illustrates the balance metadata subroutine 1052 of FIG. 10B. The subroutine is responsible for enforcing the server configuration policies of the cluster configuration database 120A–B and insures that resources are rebalanced according to those policies. These processes define a load balancing function that implements these policies. The subroutine/module for a balancing metadata 1130 is shown in FIG. 10D. Operation commences at process 1132 with the creation of a list of active servers. The active server list is produced by examining the resource database 120B (see FIG. 5B) and specifically the fields 440F–G of each record. All servers listed as current administrative nodes in fields 440F–G plus the server running the resource load rebalancing process will be part of the active server set produced in process 1132.

Control then passes to process 1134 in which a set of active groups is defined. The active group set is produced by examining each of the active servers (produced in process 1132) group priority list field 420F. As discussed above, a resource/volume record group field 440B–C corresponding to a group priority list 420F with be taken preferentially according to the list over a volume group 440B–C which does not have that overlap. Control is then passed to process 1136.

Control then passes to process 1136 in which a set of active domains is defined. The active domain set is produced by examining each of the active servers (produced in process 1132) the corresponding cluster node record and specifically fields 420G thereof to obtain the set of active domains. As discussed above, a volume record and a server record having identical domain can communicate directly with one another. Once the set of active domains is developed control is passed to process 1138.

In process 1138 a set of accessible active volumes is defined. A set of accessible active volumes is defined by obtaining for each of the domains listed in field 420G each of the volume records from the resource database 120B (see FIG. 5B) which have an identical/overlapping domain in active domains defined in process 1138. Control is then passed to process 1140.

In process 1140, active volumes are sorted by group and by volume weight respectively, fields 440B–C and field 440H (see FIG. 5B). In an embodiment of the invention, group in ascending order and within each group sorts volume records by volumes weight in descending order. Copying the set of active volumes creates a set of original active volumes. Control is then passed to process 1142.

In process 1142, the total weight, i.e. the sum of fields 440H [see FIG. 5B] for all the volumes in the set of active volumes is calculated. Control is then passed to process 1144. In process 1144, the total weight of the set of all active servers is calculated on the basis of node weight field 420B (see FIG. 5A) for each of the active server records. Control is then passed to process 1146.

In process 1146 each of the volumes within the set of actives volumes has current administrative fields 440F–G cleared from the volume record. This has the effect of detaching the resources from an node ownership. Control is then passed to process 1148.

In process 1148 a set defined as remaining volumes is set equal to the set of active volumes defined above in process 1138. Control is then passed to process 1150. In process 1150 the ideal and remaining capacities respectively fields 420H–I (see FIG. 5A) are recalculated for each of the active servers. Ideal capacity is determined by taking the server's weight divided by the total server weight determined in process 1134 and multiplying that by the total weight of accessible volumes determined in process 1142. The remaining server capacity is set equal to the ideal capacity as the resources have no owners, thus the nodes have no resources yet associated with them, hence no used capacity.

Control is then passed to process 1152. Process 1152 begins the actual rebalancing i.e. alterations to the fields 440F–G of each volume record. In process 1152 all those volumes which list a preferred administrative node in fields 440D–E are matched with the active servers name field 420A. Where a match is found, the volume resource is assigned to that node by writing its ID to the current administrator field 440F–G of the volume record. As each assignment is made, the servers remaining capacity 420I is reduced by the assigned volume weight field 440H. Each volume for which a match is found is removed from the set of remaining volumes. Control is then passed to process 1158.

At this point in the process volumes which have a match with their preferred administrative server have been assigned. All other volumes are in the set of remaining volumes. This is illustrated in the following tables 6–7. Table 6 is the original set of volumes, as defined in the resource database 120B, and shows relevant fields as related to rebalancing. Table 7 is the relevant fields from the cluster configuration database showing the node and resource relationships at the end of process 1152.

TABLE 6

Selected resource database fields 120B

| Vol | Wt | Grp | Dom | Adm | Cur | M? |
|---|---|---|---|---|---|---|
| e1 | 5 | eng | CA | CFN1 | | T |
| e2 | 5 | eng | CA | CFN11 | | T |
| e3 | 2 | eng | CA | CFN11 | | T |
| e4 | 2 | eng | CA | CFN12 | | T |
| e5 | 1 | eng | TX | CFN12 | | T |
| e6 | 1 | eng | GA | CFN13 | | T |
| e7 | 1 | eng | MI | CFN13 | | T |
| e8 | 1 | eng | CA | CFN13 | | T |
| a1 | 3 | act | CA | CFN14 | | T |
| a2 | 2 | act | CA | CFN2 | | T |
| a3 | 1 | act | CA | CFN14 | | T |
| a4 | 1 | act | TX | CFN15 | | T |
| s1 | 7 | sal | TX | CFN15 | | T |
| s2 | 7 | sal | CA | CFN3 | | T |

TABLE 6-continued

Selected resource database fields 120B

| Vol | Wt | Grp | Dom | Adm | Cur | M? |
|---|---|---|---|---|---|---|
| s3 | 6 | sal | CA | CFN16 | | T |
| s4 | 3 | sal | GA | CFN16 | | T |
| o1 | 19 | ops | GA | CFN17 | | T |
| o2 | 19 | ops | CA | CFN17 | | T |
| o3 | 19 | ops | NY | CFN18 | | T |
| o4 | 7 | ops | GA | CFN19 | | T |
| o5 | 3 | ops | GA | CFN19 | | T |
| g1 | 3 | g&a | NY | CFN19 | | T |
| g2 | 3 | g&a | NY | CFN19 | | T |
| g3 | 2 | g&a | CA | CFN4 | | T |
| g4 | 1 | g&a | MI | CFN19 | | T |
| m1 | 10 | mkt | CA | CFN19 | | T |
| m2 | 9 | mkt | TX | CFN19 | | T |
| m3 | 5 | mkt | NY | CFN19 | | T |
| m4 | 1 | mkt | MI | CFN20 | | T |
| m5 | 3 | mkt | CA | CFN20 | | F |
| m6 | 2 | mkt | CA | CFN20 | | T |

In table 6 the column Vol represents the volume name 440A, Wt represents the volume weight 440H, Grp is the volume group 440B–C, Dom is the volume domain 440J–K, Adm is the volumes parent administrator 440D–E, Cur is the volumes current administrator 440F–G, and M? is the volumes can group migrate field 440I.

TABLE 7

Selected cluster configuration database 120A-B fields

| 1152 | Node | RC | IC | WT | Domains | Groups | Tot Vol Wt | Volumes |
|---|---|---|---|---|---|---|---|---|
| master> | CFN1 | 13.88 | 18.88 | 2 | ca,ny | eng,sal,ops | 5 | e1 |
| | CFN2 | 7.44 | 9.44 | 1 | ca,tx,ga,ny | act,sal | 2 | a2 |
| | CFN3 | 2.44 | 9.44 | 1 | ca,tx,ga,ny | sal,eng,ops | 7 | s2 |
| | CFN4 | 7.44 | 9.44 | 1 | ca,tx,ga,ny | g&a,eng | 2 | g3 |
| | CFN5 | 28.31 | 28.31 | 3 | ga | act | 0 | |
| | CFN6 | 9.44 | 9.44 | 1 | ca,tx,ga,ny | act | 0 | |
| | CFN7 | 18.88 | 18.88 | 2 | ga | act | 0 | |
| | CFN8 | 18.88 | 18.88 | 2 | ca,tx,ga,ny | act,sal,ops | 0 | |
| | CFN9 | 18.88 | 18.88 | 2 | ga | act | 0 | |
| | CFN10 | 9.44 | 9.44 | 1 | ca,tx,ga,ny | act | 0 | |
| not active | CFN11 | | | 1 | ca,tx,ga,mi,ny | eng | | n/a |
| not active | CFN12 | | | 1 | ca,tx,ga,mi,ny | eng | | n/a |
| not active | CFN13 | | | 1 | ca,tx,ga,mi,ny | eng | | n/a |
| not active | CFN14 | | | 1 | ca,tx,ga,mi,ny | act | | n/a |
| not active | CFN15 | | | 1 | ca,tx,ga,mi,ny | act | | n/a |
| not active | CFN16 | | | 1 | ca,tx,ga,mi,ny | sal | | n/a |
| not active | CFN17 | | | 4 | ca,tx,ga,mi,ny | ops | | n/a |
| not active | CFN18 | | | 2 | ca,tx,ga,mi,ny | ops | | n/a |
| not active | CFN19 | | | 3 | ca,tx,ga,mi,ny | mkt,ops,g&a | | n/a |
| not active | CFN20 | | | 1 | ca,tx,ga,mi,ny | mkt | | n/a |

In the table 7 above, the first column indicates that Node cfn1 is the one in charge of rebalancing as indicated by indica master. The first column also indicates cfn11–20 are not active, meaning they are not currently online. Column node is the node name 420A. Rc is the remaining capacity 420I, Ic is the ideal capacity 420H, wt is the node weight 420B, Domains is the nodes domain list 420G, Groups is the nodes group priority list 420F, tot vol wt represent the sum of all the volume weights for which the nodes is presently assigned as administrative server and volumes is the volumes currently owned by the node.

In process 1158 remaining volumes are matched with active servers according to the group priorities of the servers and the group to which each volume belongs. This assignment of volumes takes place within two additional constraints. First, as volumes are assigned to servers the remaining capacity field 4201 of the server is decremented to reflect the attachment the decrease in remaining capacity. When this capacity is less than or equal to 0, no further volumes will be assigned to this node/server during process 1158. Secondly no volume will be assigned to a node/server if the domain space of the volume (field 440 K FIG. 5B) does not match, i.e. overlap with, one of the domain members of the node/server (see field 420G FIG. 5A). For each node/server the attachment of resources/volumes is accomplished by first assigning volumes to the highest priority group within fields 420F of each of the servers. As each volume/resource is attached to a server/node, the remaining capacity fields 420I of the server record to which the volume is being reattached is decremented by the weight 440H of the volume which is being attached. Then the node/server I.D. of the server to which the volume is administratively attached is written into fields 440F–G for the volume. Finally as discussed above, the attached volume is removed from the set of remaining volumes. After the highest priority group in each server has been repatriated with all the remaining volumes which have a matching group, then the process is repeated with the match made between the second highest priority group in field 420F for each server and the remaining volumes. The process proceeds through each of the priority layers and each server until a reduced set of volumes exists in the remaining volume set. The following table 8 shows the state of our example after process 1158.

TABLE 8

| 1158 Node | RC | IC | WT | Domains | Groups | Tot Vol Wt | Volumes (new) |
|---|---|---|---|---|---|---|---|
| CFN5 | 28.31 | 28.31 | 3 | ga | act | 0 | |
| CFN7 | 18.88 | 18.88 | 2 | ga | act | 0 | |
| CFN8 | −16.13 | 18.88 | 2 | ca,tx,ga,ny | act,sal,ops | 35 | s1,s3,s4,o1 |
| CFN9 | 18.88 | 18.88 | 2 | ga | act | 0 | |
| master> CFN1 | −15.13 | 18.88 | 2 | ca,ny | eng,sal,ops | 34 | e1,e2,e3,e4,e8,o2 |
| CFN6 | 4.44 | 9.44 | 1 | ca,tx,ga,ny | act | 5 | a1,a3,a4 |
| CFN10 | 9.44 | 9.44 | 1 | ca,tx,ga,ny | act | 0 | |
| CFN2 | 7.44 | 9.44 | 1 | ca,tx,ga,ny | act,sal | 2 | a2 |
| CFN4 | −0.56 | 9.44 | 1 | ca,tx,ga,ny | g&a,eng | 10 | g3,g1,g2,e5,e6 |
| CFN3 | −16.56 | 9.44 | 1 | ca,tx,ga,ny | sal,enp,ops | 26 | s2,o3 |

The volumes that remain are processed in process 1160. In process 1160 the remaining set of volumes will include both those volumes having groups which match group priorities of some of the available servers but which have not been attached to those servers because those servers lack capacity where 420I is less than 0 (see FIG. 5A). Additionally, the remaining set of volumes will include volumes having group identifiers (see field 440B–C in FIG. 5A) which do not match any of the group priorities listed in the group priority fields 420F (see FIG. 5A) of the set of active servers. From this remaining set all those volumes having groups which match a priority group on one of the set of active servers are assigned to a corresponding server. Additionally, the server's remaining capacity 420I is reduced and the server's I.D. is written into the current administrative node field 440F–G of the volume record. The volume is then removed from the set of remaining volumes. The matching of process 1160 also involves the requirement that there be overlapping domain space between the volume domain 440K and the domain members of the node/server 420G. The effect of process 1160 is that volumes with remaining groups will tend to migrate to servers that are members of that group at a higher priority. This is done by going through each group priority level, with the active servers sorted by groups and assigning higher weighted volumes in that group at that level, round robin fashion to servers in the group at that level, until the group type is exhausted. Control is then passed to process 1162. The following table 9 shows the state of our example after process 1160.

TABLE 9

| 1160 |v|1-3 Node | RC | IC | WT | Domains | Groups | Tot Vol Wt | Volumes (new) |
|---|---|---|---|---|---|---|---|
| CFN5 | 28.31 | 28.31 | 3 | ga | act | 0 | |
| CFN7 | 18.88 | 18.88 | 2 | ga | act | 0 | |
| CFN9 | 18.88 | 18.88 | 2 | ga | act | 0 | |
| CFN10 | 9.44 | 9.44 | 1 | ca,tx,ga,ny | act | 0 | |
| CFN2 | 7.44 | 9.44 | 1 | ca,tx,ga,ny | act,sal | 2 | a2 |
| CFN6 | 4.44 | 9.44 | 1 | ca,tx,ga,ny | act | 5 | a1,a3,a4 |
| CFN4 | −0.56 | 9.44 | 1 | ca,tx,ga,ny | g&a,eng | 10 | g3,g1,g2,e5,e6 |
| master> CFN1 | −15.13 | 18.88 | 2 | ca,ny | eng,sal,ops | 34 | e1,e2,e3,e4,e8,o2 |
| CFN8 | −23.13 | 18.88 | 2 | ca,tx,ga,ny | act,sal,ops | 42 | s1,s3,s4,o1,o4 |
| CFN3 | −19.56 | 9.44 | 1 | ca,tx,ga,ny | sal,eng,ops | 29 | s2,o3,o5 |

In process 1162 the remaining volumes which include volumes which have no group affiliation or a group affiliation not matching one of the groups in the group priority fields 420F of the active servers are sorted by descending remaining capacity and the remaining volumes are assigned to those servers up to capacity. First any remaining volumes for which can group migrate field 4401 is set to Boolean False is removed from the set because they have no group representation and are not allowed to migrate outside their own group. No volume is reattached unless it has a domain which overlaps with one of the domains in the domain member field 420G of the node/server record. Each server with remaining capacity is assigned volumes, until its capacity is full, in similar fashion as in process 1158. Control is then passed to process 1164. The following table 10 shows the state of our example after process 1162.

TABLE 10

| 1162 | Node | RC | IC | WT | Domains | Groups | Tot Vol Wt | Volumes (new) |
|---|---|---|---|---|---|---|---|---|
| master> | CFN5 | 28.31 | 28.31 | 3 | ga | act | 0 | |
| | CFN7 | 18.88 | 18.88 | 2 | ga | act | 0 | |
| | CFN9 | 18.88 | 18.88 | 2 | ga | act | 0 | |
| | CFN10 | −0.56 | 9.44 | 1 | ca,tx,ga,ny | act | 10 | m1 |
| | CFN2 | −1.56 | 9.44 | 1 | ca,tx,ga,ny | act,sal | 11 | a2,m2 |
| | CFN6 | −0.56 | 9.44 | 1 | ca,tx,ga,ny | act | 10 | a1,a3,a4,m3 |
| | CFN4 | −0.56 | 9.44 | 1 | ca,tx,ga,ny | g&a,eng | 10 | g3,g1,g2,e5,e6 |
| | CFN1 | −15.13 | 18.88 | 2 | ca,ny | eng,sal,ops | 34 | e1,e2,e3,e4,e8,c2 |
| | CFN3 | −19.56 | 9.44 | 1 | ca,tx,ga,ny | sal,eng,ops | 29 | s2,o3,o5 |
| | CFN8 | −23.13 | 18.88 | 2 | ca,tx,ga,ny | act,sal,ops | 42 | s1,s3,s4,o1,o4 |

In process 1164 the remaining volumes are assigned to active servers and a check as to domain compatibility is performed prior to attachment. At this point, remaining volumes contains only volumes where there were no group matches and no server remaining capacity for them to migrate. In this step, the servers are again sorted by descending remaining capacity and remaining volumes attached thus tending to increase overall balance. Reattachment once again involves the three step process of decreasing the remaining capacity field for the record to which the volume is being attached, adding the I.D. of the server to which the volume is attached to the current administrative node field 440F–G of the volume record and removing the volume record from the set of remaining volumes. Control is then passed to process 1166. The following table 11 shows the state of our example after process 1164.

by summation of the absolute values of all remaining capacities of all active servers. Next we reach the top of the cycle which will be engaged repeatedly until the state of active servers does not increase in overall balance. A copy of active servers/volumes is made into the set previous active servers/volumes. A loop defined as the outer loop is engaged with the active severs, and a loop defined as the inner loop is engaged with the active servers. In this way, each server evaluates itself against all the other servers and migrates resources between them when it is decided that overall balance between them increases, in an exhaustive outer then inner loop for all active servers. In the inner loop, if the outer loop server remaining capacity is equal to the inner loop server remaining capacity, then the two servers are either one in the same, or in perfect balance. In either case nothing more can be done, so the next inner loop moves

TABLE 11

| 1164 | Node | RC | IC | WT | Domains | Groups | Tot Vol Wt | Volumes (new) |
|---|---|---|---|---|---|---|---|---|
| master> | CFN5 | 28.31 | 28.31 | 3 | ga | act | 0 | |
| | CFN7 | 18.88 | 18.88 | 2 | ga | act | 0 | |
| | CFN9 | 18.88 | 18.88 | 2 | ga | act | 0 | |
| | CFN10 | −2.56 | 9.44 | 1 | ca,tx,ga,ny | act | 12 | m1,m6 |
| | CFN2 | −1.56 | 9.44 | 1 | ca,tx,ga,ny | act,sal | 11 | a2,m2 |
| | CFN6 | −0.56 | 9.44 | 1 | ca,tx,ga,ny | act | 10 | a1,a3,a4,m3 |
| | CFN4 | −0.56 | 9.44 | 1 | ca,tx,ga,ny | g&a,eng | 10 | g3,g1,g2,e5,e6 |
| | CFN1 | −15.13 | 18.88 | 2 | ca,ny | eng,sal,ops | 34 | e1,e2,e3,e4,e8,c2 |
| | CFN3 | −19.56 | 9.44 | 1 | ca,tx,ga,ny | sal,eng,ops | 29 | s2,o3,o5 |
| | CFN8 | −23.13 | 18.88 | 2 | ca,tx,ga,ny | act,sal,ops | 42 | s1,s3,s4,o1,o4 |

Process 1166 is where resources are balanced among active servers. This process tends to bring active servers towards nominal capacity. The entire state of active servers as a whole is balanced such that each node is as close to 0 remaining capacity as possible while still obeying the rules of volume administrative server preference and volume group migration ability. This approach uses the comparison of ideal capacity compared to remaining capacity (which can be a negative number) to decide how resources should migrate for balance. An alternate embodiment could be based on the comparison of ideal capacity verses used capacity (always a positive number or 0), and would effect the normalization calculations used for migration determination. First a calculation of previous optimum state is made on to the next server for evaluation. When two suitable servers are obtained, i.e. the outer server is different than the inner server and their remaining capacities are not equal, then a volume subset is built from the set of active volumes where the volume is not matched with its parent administrative server, the volume belongs to the inner server currently, and the volume has a domain match with the outer server. From this subset, volumes are removed where there are not group matches with the outer server and the can group migrate field of the volume is set to Boolean False, e.g. the volume is not allowed to migrate outside its group. Next the preferred embodiment sorts the volume subset by lowest group priorities to higher ones, starting with volumes that belong to no group for the current owner, then from lower to higher members. Then within each group, it is sorted by ascending volume weight. The volume subset is then evaluated in that order. In an alternate embodiment, the volume subset is simply sorted by ascending volume weight. Now the volumes in the volume subset are evaluated as possible candidates for migration to the outer server. Each volume in the volume subset is evaluated according to the following calculations. First the optimum state before a reassignment is calculated as the sum of the absolute values of the remaining capacities of the outer and inner servers. Next the optimum state after a reassignment is calculated as the sum of the absolutes values of the remaining capacities as if the volumes was assigned by adding the volume weight to the inner remaining capacity and subtracting the volume weight from the outer remaining capacity as would happen if the volume were assigned from the inner to outer server. Now the variable "move volume" is assigned Boolean False. If the optimum state after is less than the optimum state before then the variable "move volume" is assigned Boolean True, otherwise the next comparison is made. If the optimum state after is equal to the optimum state before then the following additional calculations are performed. A numerator before is assigned equal to whichever of the optimum state before inner server or optimum state before outer servers calculated earlier is a smaller value. Remember that both of these earlier calculations were absolute values. A denominator before is then assigned equal to larger or equal of the above values determined in the numerator before calculation. A zero balance before value is calculated as the absolute value of (1−(numerator before/denominator before)). Similarly a numerator after, denominator after, and zero balance after values are calculated. If the zero balance after is less than the zero balance before then the variable "move volume" is set to Boolean True. Now a check is made to see if the variable "move volume" has been set to Boolean True by any step above. If it has, then migrating the volume from the inner server to the outer server will increase balance, and it is migrated in the following fashion. The remaining capacity of the outer server is decreased by the volumes weight while the remaining capacity of the inner server is increased by the same amount. The current administrator field 440F–G is written with the outer server's I.D. Next a comparison of the inner and outer remaining capacities is done to see if they are equal. If they are equal, then the inner loop is incremented to the next server by going to the top of the inner loop. Otherwise, the next volume in the volume subset is evaluated, until there are no more volumes in the volume subset to evaluated. At that time, the next inner loop is taken, if any. If there are no more inner loops, then the next outer loop is taken. If there are no more outer loops then the following state comparison is made. The active optimum state is calculated as the summation of the absolute value of all the active servers remaining capacities. If the previous optimum state (as calculated earlier) is less than or equal to the active optimum state just calculated then the prior outer/inner loops iteration did not increase the state of balance so that active servers/volumes are assigned the value of the prior active servers/volumes and process 1166 is exited. Otherwise, the previous optimum state is assigned the active optimum state and the process once again commences at the cycle top of process 1166 discussed earlier. The following table 12 shows the state of our example after the first iteration round of process 1166. These iterations continue until the balance of the nodes cannot be increased. It can be seen that even after one iteration the nodes are just about as balanced as they can get. For large sets of nodes and resources, the multiple iterations has a more pronounced effect on balancing the system better.

TABLE 12

| 1166 | Node | RC | IC | WT | Domains | Groups | Tot Vol Wt | Volumes (new) |
|---|---|---|---|---|---|---|---|---|
| master> | CFN5 | 9.31 | 28.31 | 3 | ga | act | 19 | o1 |
| | CFN7 | 11.88 | 18.88 | 2 | ga | act | 7 | o4,s4 |
| | CFN9 | 11.88 | 18.88 | 2 | ga | act | 7 | e6,o5,s4 |
| | CFN6 | −2.56 | 9.44 | 1 | ca,tx,ga,ny | act | 12 | a3,a4,m3,e2 |
| | CFN4 | −3.56 | 9.44 | 1 | ca,tx,ga,ny | g&a,eng | 13 | g3,g1,g2,a1,e4 |
| | CFN2 | −4.56 | 9.44 | 1 | ca,tx,ga,ny | act,sal | 14 | a2,m2,e3,e8 |
| | CFN10 | −3.56 | 9.44 | 1 | ca,tx,ga,ny | act | 13 | m1,m6,e5 |
| | CFN1 | −5.13 | 18.88 | 2 | ca,ny | eng,sal,ops | 24 | e1,o2 |
| | CFN3 | −16.56 | 9.44 | 1 | ca,tx,ga,ny | sal,eng,ops | 26 | s2,o3 |
| | CFN8 | −5.88 | 18.88 | 2 | ca,tx,ga,ny | act,sal,ops | 13 | s1,s3 |

In process 1168 the original active volume set created in process 1140 is compared with the rebalanced volume set and for those volumes in which the current administrated node field 440F–G (see FIG. 5B) does not match, the replication field 440L as marked Boolean True. For those records that do match, no replication is needed since the rebalancing did not alter the current administrative node of the volume record. Then for those records in which field 440L has been marked with a Boolean True, they are replicated by the master before exiting the rebalancing process to all nodes on the network so that they may update their configuration tables. Finally the master removes the lock from the configuration database indicating that rebalancing is complete. This process is illustrated in FIG. 10B, which calls FIG. 10C to perform the actual replication of the database. In an alternate embodiment of the invention the load rebalancing processes could be trigger not only by a change in availability, e.g. failure, failback, but at administratively defined times which could then take into account changes in network flows such as daytime and nighttime activity patterns. The following pseudo-code shows more details of the implementation of resource load balancing as described in FIG 10D.

```
********************************************************************************
*STEP 1130 - BALANCE METADATA
*STEP 1132 - DEFINE SET ACTIVE SERVERS
********************************************************************************
Empty_Set active_servers
Empty_Set active_groups
Empty_Set active_domains
Empty_Set active_volumes
Empty_Set remaining_volumes
Empty_Set original_active_volumes
*DEFINE SET OF ACTIVE SERVERS
Add_To_Set active_servers For_Each_New volume.current_cfn (440F)
If master Not_In active_servers Then Add_To_Set active_servers master
********************************************************************************
*STEP 1134 - DEFINE SET ACTIVE GROUPS
********************************************************************************
Add_To_Set active_groups For_Each_New active_servers[].groups[] (440C)
********************************************************************************
*STEP 1136 - DEFINE SET ACTIVE DOMAINS
********************************************************************************
Add_To_Set active_domains For_Each_New active_servers[].domains[] (420G)
********************************************************************************
*STEP 1138 - DEFINE SET ACTIVE VOLUMES
********************************************************************************
Add_To_Set active_volumes For_Each
        (volume.domain (440K) In active_domains)
********************************************************************************
*STEP 1140 - SORT ACTIVE VOLUMES BY GROUP, WEIGHT
********************************************************************************
Sort active_volumes By volume.group (440C) Ascending, volume.weight (440H) Descending
Assign_Set original_active_volumes To active_volumes
********************************************************************************
*STEP 1142 - CALCULATE TOTAL WEIGHTED VOLUMES
********************************************************************************
For_Set active_volumes Calculate_Sum volume.weight (440H) Into total_weighted_volumes
********************************************************************************
*STEP 1144 - CALCULATE TOTAL WEIGHTED SERVERS
********************************************************************************
For_Set active_servers Calculate_Sum server.weight (420B) Into total_weighted_servers
********************************************************************************
*STEP 1146 - CLEAR CURRENT CFN
********************************************************************************
For_Set active_volumes Clear_Field volume.current_cfn
********************************************************************************
*STEP 1148 - DEFINE REMAINING VOLUMES
********************************************************************************
Assign_Set remaining_volumes to active_volumes
********************************************************************************
*STEP 1150 - CALCULATE FOR ACTIVE SERVERS IDEAL
*                AND REMAINING CAPACITIES
********************************************************************************
For_Set active_servers (420H)
        Calculate server.ideal_capacity as
                server.weight (420B)/total_weighted_servers * total_weighted_volumes
        server.remaining_capacity (420I) = server.ideal_capacity (420H
********************************************************************************
*STEP 1152 - MATCH REMAINING VOLUMES WITH PARENTS
********************************************************************************
For_Set active_servers
        For_Set active_Volume Where
                        volume.parent_cfn != volume.current_cfn AND volume.parent_cfn =
                server.cfn
                server.remaining_capacity -= volume.weight
                volume.current_cfn = server.cfn
                Remove_From_Set remaining___volumes volume
********************************************************************************
*STEP 1158 - MATCH REMAINING VOLUMES WITH ACTIVE
*                SERVERS ACCORDING TO GROUP PRIORITIES AND CAPACITY
********************************************************************************
Sort active_servers By server.remaining_capacity Descending
NEXT_SERVER:
        For_Set active_servers Where_Each server.groups (420H) Using_Position_Counter i
                For_Set remaining_volumes where volume.group == server.groups[i]
*Alternate could be server.remaining/volume.weight < 0.10
                        If server.remaining_capacity <= 0
                                Goto NEXT_SERVER;
                        If volume.domain In server.domains[]
                                server.remaining_capacity -= volume.weight
                                volume.current_cfn = server.cfn
```

-continued

```
                    Remove_From_Set remaining_volumes volume
********************************************************************************
*STEP 1160 - MATCH REMAINING VOLUMES WITH ACTIVE
*              SERVERS EXHAUSTING GROUP MATCHES
********************************************************************************
*potentially left at this point with any volumes that belong
*       to groups where no capacity left (capacity overflow)
*       to other non-represented groups (no cfn.group memberships)
*
*Will tend for remaining groups to migrate to servers that are members of that group
*       at a higher priority
*
Create_New_Set remaining_volumes_group_matches From remaining_volumes By
        Set_AND(remaining_volumes.group, active_groups)
*
*Go through each group priority level, servers sorted by groups
*Assign higher weighted volumes in that group at that level, Round Robin to servers in group
*       at level, until volume.group type exhausted
*Move on to next group priority level, and try again, until max levels done
*
Calculate total_group _levels As_Max_Array_Deep_Record_Index active_servers.groups[]
*Implied check here that server.groups[i] for server.group is a valid group level
Do for total_group_levels in active_servers, Sort active_servers By server.groups[i],
server.remaining_capacity
        Find_Next remaining_volumes_group_matches Where
                volume.group == server.groups[i] AND
                volume.domain In server.domains[]
                        server.remaining_capacity -= volume.weight
                        volume.current_cfn = server.cfn
                        Remove_From_Set remaining_volumes volume.
********************************************************************************
*STEP 1162 - MATCH REMAINING VOLUMES WITH ACTIVE
*              SERVERS EXHAUSTING CAPACITY
********************************************************************************
Sort active_servers By server.remaining_capacity Descending
Remove_From_Set remaining_volumes Where volume.can_migrate == False
        For_Set active_servers
                For_Set remaining_volumes
                        If server.remaining_capacity <= 0
                                Goto NEXT_SERVER;
                        If volume.domain In server.domains[]
                                server.remaining_capacity -= volume.weight
                                volume.current_cfn = server.cfn
                                Remove_From_Set remaining_volumes volume
********************************************************************************
*STEP 1164 - MATCH REMAINING VOLUMES WITH ACTIVE
*              SERVERS INCREASING BALANCE
********************************************************************************
Sort active_servers By server.remaining_capacity Descending
        For_Set remaining_volumes
*This means cyclical loop
                Cycle_Next active_servers
                If volume.domain In server.domains[]
                        server.remaining_capacity -= volume.weight
                        volume.current_cfn = server.cfn
                        Remove_From_Set remaining_volumes volume
********************************************************************************
*STEP 1166 - BALANCE OVERLOADED ACTIVE SERVERS
********************************************************************************
*Brings active servers towards nominal capacity. The entire state of active servers as a whole
*is balanced such that each node is as close to 0 remaining capacity as possible while still
*obeying the rules of volume administrative server preference and volume group migration
*ability. An alternate embodiment could be to based the volume migration decision on
*Ideal vs. Used capacity (rather than remaining, which goes negative). The would effect
*the normalize process and other calculations for migration
*
Calculate previous_optimum_state As Sum(ABS(active_servers.reemaining_capacity))
CYCLE_TOP:
previous_active_servers = active_servers
Sort active_servers By server.remaining_capacity Descending
For_Set active_servers With outer_loop
        For_Set active_servers With inner_loop
*Skip ourself (and others that are the same)
        If (active_servers[inner_loop].remaining_capacity ==
active_servers[outer_loop].remaining_capacity)
                Next inner_loop;
        Build volume_subset from active_volumes Where
                volume.parent_cfn != volume.current_cfn AND
                volume.current_cfn == active_servers[inner_loop].cfn AND
```

-continued

```
                    volume.domain In active_servers[outer_loop].domains[]
*Remove those volumes where there are not group matches with the underutilized server
*in question, and the volume is not allowed to migrate outside its group
         For volume_subset
                    If volume.group Not_In active_servers[outer_loop].groups[] And
                                   volume.can_migrate == False Then
                              Remove_From_Subset volume_subset volume
*Preferred embodiment sorts by lowest group priorities to higher ones, starting with volumes
*that belong to no group for the current owner, then from lower-to-higher members. Then within
*each group it is sorted by ascending volume weight. They are then evaluated in that order.
*Alternate embodiment, just sorts by ascending volume weight as:
*Sort volume_subset By volume.weight Ascending
         Empty_Set new_volume_subset
*Add lowest priority volumes. Those which are not part of the group list
         Empty_Set hold_volumes
         Add_To_Set hold_volumes From volume_subset Where volume.group Not_In
                    active_servers[inner_loop].groups
         Sort hold_volumes By volume.weight Ascending
         Add_To_Set new_volume_subset hold_volumes
*Add remaining volumes according to lower to higher priorities
         sorted_priorities = active_servers[inner_loop].groups
         Reverse_Order sorted_priorities
         For sorted_priorities With i
                    Empty_Set hold_volumes
                    For volume_subset, Where volume.group == sorted_priorities[i]
                              Add_To_Set hold_volumes volume
                    Sort hold_volumes By volume.weight Ascending
                    Add_To_Set new_volume_subset hold_volumes
         volume_subset = new_volume_subset
*Is this volume a candidate?
*(ABS = Absolute Value |x| function)
*(MIN = Minimum Value x,y function)
*(MAX = Maximum Value x,y function)
         For volume_subset
                    os_before_rc = ABS(active_servers[inner_loop].remaining_capacity)
                    us_before_rc = ABS(active_servers[outter_loop].remaining_capacity)
                    optimum_before = os_before_rc + us_before_rc
                    os_after_rc = ABS(active_servers[inner_loop].remaining_capacity + volume.weight)
                    us_after_rc = ABS(active_servers[outter_loop].remaining_capacity - volume.weight)
                    optimum_after = os_after_rc + us_after_rc
                    move_volume = False
                    If (optimum_after < optimum_before) Then
                              move_volume = True
                    else If (optimum_after == optimum_before) Then
                              numerator_before = MIN(os_before_rc, us_before_rc)
                              denominator_before = MAX(os_before_rc, us_before_rc)
                              zero_balance_before = ABS(1 - (numerator_before/denominator_before))
                              numerator_after = MIN(os_after_rc, us_after_rc)
                              denominator_after = MAX(os_after_rc, us_after_rc)
                              zero_balance_after = ABS(1 - (numerator_after/denominator_after))
                              If (zero_balance_after < zero_balance_before) Then
                                        move_volume = True
                    If (move_volume == True) Then {
*Move volume to increase balance!
                              active_servers[outter_loop].remaining_capacity -= volume.weight
                              active_servers[inner_loop].remaining_capacity += volume.weight
                              volume.current_cfn = active_servers[outter_loop].cfn
                              If (active_servers[inner_loop].remaining_capacity ==
                                             active_servers[outter_loop].remaining_capacity)
                                        Next inner_loop;
                              Next volume_subset
                    }
                    else {
                              Next inner_loop
                    }
         Next inner_loop
Next outter_loop
Calculate active_optimum_state As Sum(ABS(active_servers.remaining_capacity))
if previous_optimum_state <= active_optimum_state) Then {
         active_servers = previous_active_servers
         Goto EXIT
}
else {
         previous_optimum_state = active_optimum_state
         Goto CYCLE_TOP
}
EXIT:
***************************************************************************************
```

-continued

```
*STEP 1168 - CALCULATE NEED REPLICATION
****************************************************************************************
*Now find records that have been altered so that we can replicate only current_cfn changes!!
For_Set original_active_volumes With i
        If volume.current_cfn != active_volumes[i].current_cfn
                volume.needs_replication = True
****************************************************************************************
*STEP 1169 - EXIT
****************************************************************************************
```

FIG. 10E illustrates the command dispatch subroutine 1018 of FIG. 10A. The subroutine serves to distribute commands in the system. The subroutine is initiated at process 1170 and control is passed to decision process 1172 where a determination is made whether the command is a read/write I/O operation. When the determination at decision process 1172 is positive control is passed to subroutine 1174 which is responsible for processing I/O operations and is described in FIGS. 10F–G. Control is then returned to process 1170. When the determination is negative control is passed to decision process 1176. At decision process 1176 a determination is made whether the command is a control command, e.g. a non-I/O operation. If the determination is positive command is passed to subroutine 1178 which serves to process non I/O commands. Control is then returned to process 1170. When the determination at decision process 1176 is negative control is returned to process 1170.

Figure 10F:
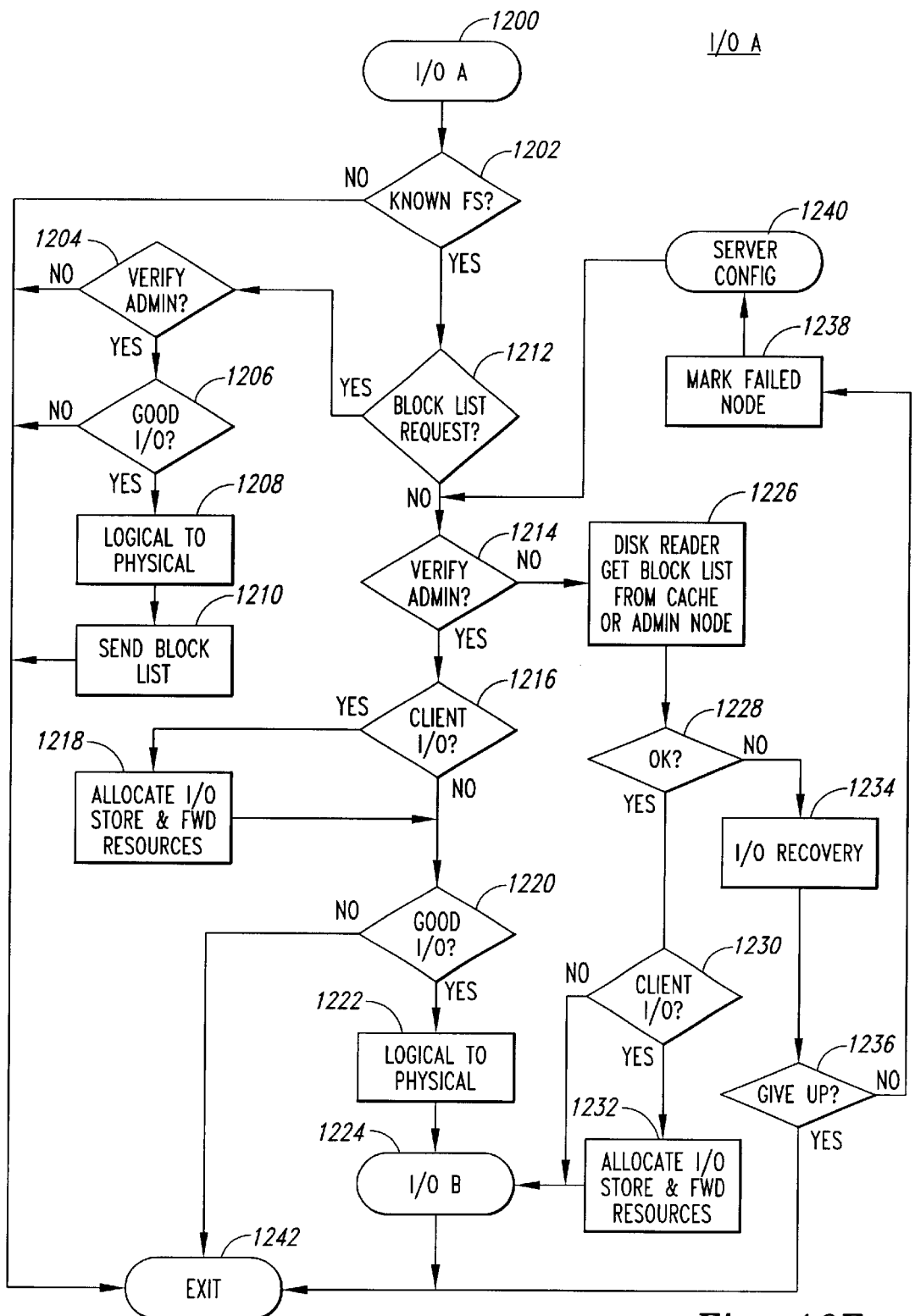

FIG. 10F shows the processes for the subroutine associated with distributed I/O. (See the subroutine 1174 of FIG. 1E). This subroutine is responsible for distributing the responsibility for carrying out an I/O request. The responsibility for carrying out a single I/O request can be divided between an administrative server and a data transfer server. The administrative server is responsible for managing the physical layout (on disk) structure of the file system (its metadata) and physical block lists for a volume on which a file necessary to carry out the I/O resides. The data transfer server is responsible for obtaining the physical block list necessary to carry out the I/O request and for carrying out the I/O request.

An I/O request received by a data transfer server is split into access portion and a data transfer portion. The access portion, e.g. an access request, is sent to the administrative server for the resource which is the subject of the I/O request. The administrative server processes the request by determining if any security considerations prevent the grant of the access request, e.g. the data set is locked. If no security violations exist, e.g. the data set is unlocked, then an access grant, e.g. a block list, is sent to the data transfer server. Subsequent to the receipt of the access grant the data transfer server compltes the data transfer between the resource and the originator of the I/O request.

In one embodiment, the data transfer server can obtain the physical block list necessary to carry out the I/O request directly from the administrative server. As a result, the server of interest can serve as the administrative server or the data transfer server depending on the I/O request. The source of the I/O transaction is important to the proper processing of the I/O. I/O can be generated internally or externally on an administrative server or data transfer server. Aware and normal clients can also generate I/O. These sources of I/O transaction operations are tagged as such so that they may be treated accordingly.

The subroutine is initiated at subroutine 1200 and control is passed to decision process 1202 where the I/O request is received and processed by determining if the I/O in question is directed to a file system that is known to the node. A looking at the table maintained by the logical name driver module 160 (see FIG. 2A), and seeing if the file system in question is in that table makes this determination. When the determination is in the negative, i.e. the file system is not known, control is passed to process 1242. When the determination is positive, control is passed to decision process 1212.

Decision process 1212 determines if the I/O request is for a physical block list translation from the disk reader module 150 (see FIG. 2A) of a data transfer server. If that determination is positive, the control passes to decision process 1204. Decision process 1204 makes a determination as to whether it is the administrative server for the I/O in question. A looking at the table maintained by the server configuration driver 156 (see FIG. 2A), and seeing if the node is indicated as the administrative server for the file system in question in that table makes this determination. If the determination is in the negative, then control passes to process 1242. If the determination is positive, then control passes to decision process 1206. Decision process 1206 checks the I/O operation in question and determines if it is in violation of any valid parameters, locking semantics, security violations etc. (see shared data lock management module 144 in FIG. 2A). If the determination is in the negative, e.g. that the I/O is bad, then control passes to process 1242. If the determination is positive, e.g. that the I/O is good, then control passes to process 1208. Process 1208 translates the logical I/O operation into a physical block list (see metadata supplier module 162 in FIG. 2A), and control is passed to process 1210. Process 1210 sends the physical block list translation to the requesting data transfer server (see FIGS. 3B–C, 8). Control is then passed to process 1242 which exits the subroutine/module.

If the determination in decision process 1212 is negative, e.g. the I/O request is not for a physical block list, then control passes to decision process 1214. Decision process 1214 makes a determination as to whether it is the administrative server for the I/O in question. A looking at the table maintained by the server configuration driver 156 (see FIG. 2A), and seeing if the node is indicated as the administrative server for the file system in question in that table makes this determination. If the determination is in the negative, then control passes to process 1226. If the determination is positive, then control passes to decision process 1216.

Decision process 1216 determines whether the I/O in question originated from a client. If the determination is positive then control passes to process 1218. Process 1218 allocates resources required to store and forward the I/O requests to/from the client over the network. Control then passes to decision process 1220. If decision process 1216 is negative, e.g. the I/O is not from a client, then control passes to decision process 1220. Decision process 1220 checks the I/O operation in question and determines if it is in violation of any valid parameters, locking semantics, security violations etc. (see shared data lock management module 144 in FIG. 2A). If the determination is in the negative, e.g. that the I/O is bad, then control passes to process 1242. If the determination is positive, e.g. that the I/O is good, then control passes to process 1222. Process 1222 translates the logical I/O operation into a physical block list (see shared data metadata management module 152 in FIG. 2A), and control is passed to process 1224. Process 1224 (see FIG. 10G) sends the physical block list translation for execution to the I/O subsystem (see scheduling module 164 in FIG. 3A). Control is then passed to process 1242 which exits the subroutine/module.

If the determination in decision process 1214 is negative, e.g. the node is the data transfer server, then control passes to process 1226. Process 1226 sends the logical I/O request for physical block list translation to the administrative server for the file system, which was determined in decision process 1214 (see disk reader module 150 and metadata supplier module 162 in FIGS. 2A, 3B–C, 8), and control passes to decision process 1228. Decision process 1228 determines if it has successfully received the physical block list translation. If the list includes free space that was allocated the data transfer server initializes the free space to a known security pattern. This assures that an unauthorized user will not be able to read a previous users file contents that were left as free space after for example a file deletion. If the determination in decision process 1228 is positive, i.e. the physical block list has been retrieved successfully, then control passes to decision process 1230. Decision process 1230 determines whether the I/O in question originated from a client. If the determination is positive then control passes to process 1232. Process 1232 allocates resources required to store and forward the I/O requests to/from the client over the network. Control then passes to decision process 1224. If decision process 1230 is negative, e.g. the I/O is not from a client, then control passes to decision process 1224. Process 1224 (see FIG. 10G) sends the physical block list translation for execution to the I/O subsystem (see scheduling module 164 in FIG. 3B). Control is then passed to process 1242 which exits the subroutine/module.

If the determination at decision process 1228 is in the negative, i.e. there was an unusual failure in obtaining the physical block list translation of the I/O, then control passes to process 1234. Process 1234 engages in I/O recovery by retrying the I/O operation possibly several times and then control is passed to decision process 1236. Decision process 1236 determines if the recovery process has been exhausted. If the determination is positive, e.g. that there are no further recovery options, then an error is return and control is passed to process 1242 the subroutine/module exit. If the determination in decision process 1236 is in the negative, e.g. there are further recovery options, then control is passed to process 1238. Process 1238 marks the node to which the I/O was issued as failed in the configuration database 120 (see FIGS. 5A–B) and control is passed to process 1240. Process 1240 rebalances the resources and replicates the resulting changes to the configuration database to all the active nodes, accounting for the node failure.(see FIG. 10B). Control is then passed to decision process 1214 to reprocess the I/O.

Figure 10G:
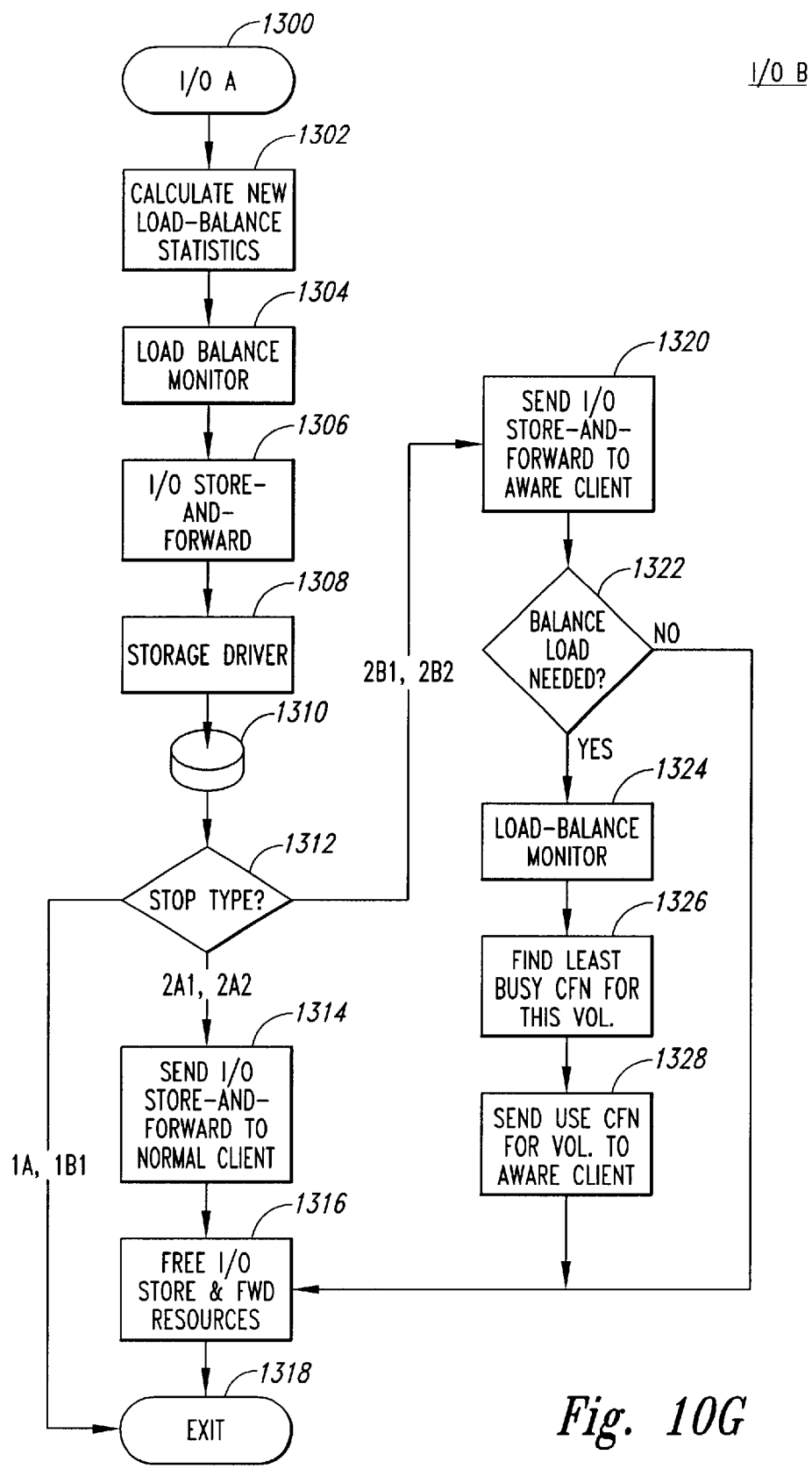
Figure 10H:
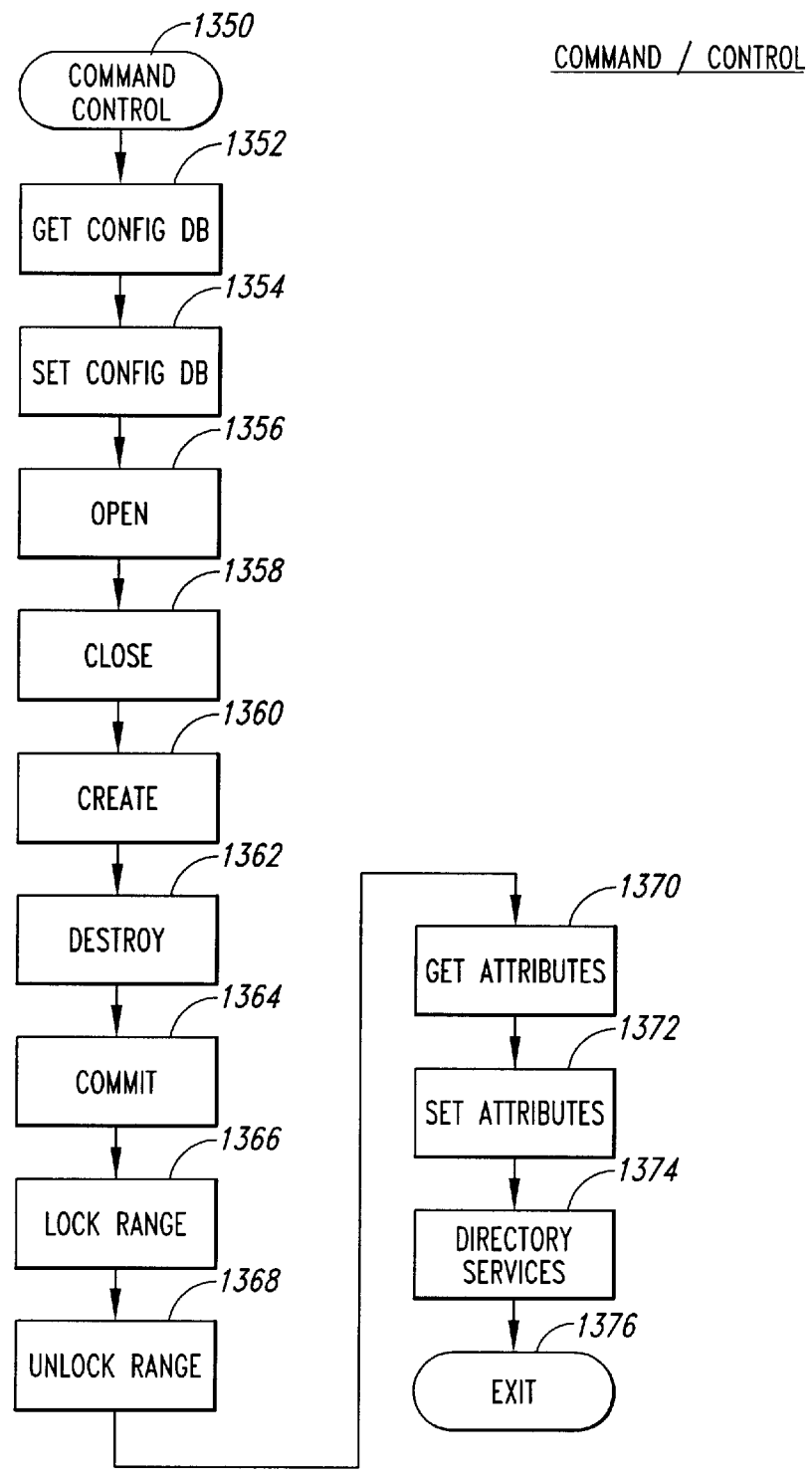

FIG. 10G shows the processes of the subroutine (See FIG. 10F) associated with the data transfer portion of an I/O and detection of a utilization condition for purposes of client load balancing. A utilization condition may exist when, for example, the current bandwidth of a server exceeds a predefined limit. (See FIG. 5A). The subroutine is initiated at process 1300 and control is passed to process 1302 where the I/O load statistics are calculated. Control is then passed to process 1304, which monitors, accumulates and processes the load statistics 420E of FIG. 5A. The load statistics are periodically forwarded according to utilization update field 420C of FIG. 5A. Control is passed to process 1306, which prepares the I/O for execution. If the I/O is from a client and is a write operation, then data is read from the network from the client and stored inside the I/O store and forward resources allocated in process 1218/1232 of FIG. 10F. This will be the data which is written out to the resource. Control is passed to process 1308, which executes the I/O with the hardware of process 1310. Control is passed to decision process 1312 which determines what source type of I/O operation (STOP) request it is. When a metadata server or data transfer server internally generates the I/O request control is passed to process 1318 where the subroutine is exited. When the I/O request originates from a normal (unaware) client control is passed to process 1314. At process 1314 the I/O store and forward buffers are sent back over the network to the client in the case of a read I/O. Control is then forwarded to process 1316 where the resources which were previously frozen in processes 1218 and 1232 of FIG. 10F are freed. Control is then passed to process 1318 where the subroutine is exited.

When the decision process 1312 determines that the I/O request originates from an aware client control is passed to process 1320. At process 1320 the I/O store and forward buffers are sent back over the network to the client in the case of a read I/O. Control is then passed to decision process 1322 where a determination is made whether the server needs to be load balanced based on the stored CFN records 420D–E illustrated in FIG. 5A. Comparing a load threshold 420D with the current load 420E that is calculated in process 1320 makes the determination. If a determination is made that the current load exceeds the threshold control two embodiments are possible. Control can be forwarded to process 1328, which sends a generic request to the client to redirect its I/O. Alternatively, control can be passed to process 1324 where the load balance monitor controls the load balance. Control is then forwarded to process 1326 where the least busy CFN, which can handle the I/O is determined. Control is then forwarded to process 1328 where a request that the client redirect I/O to the selected CFN is communicated to the aware client. Control is then passed to process 1316 where the resources, which were previously frozen in processes 1218 and 1232 of FIG. 10F, are freed. Control is then passed to process 1318 where the subroutine is exited.

If the decision process 1322 determines that the current load does not exceed the threshold control then control is passed to process 1316 where the resources, which were previously frozen in processes 1218 and 1232 of FIG. 10F, are freed. Control is then passed to process 1318 where the subroutine is exited.

FIG. 10H illustrates the command control subroutine 1178 of FIG. 10E. This is where non read/write I/O operations are handled. Some are handled in the standard client/server fashion. Some are special or new, such as get/set configuration database process 1352/1354 and come into play during process 1044 of FIG. 10B. Process 1350 decides which request to perform and calls that one directly, and then exits. The subroutine is initiated at process 1350 and control is passed to get configuration database process 1352 where the configuration database is obtained. Control is then passed to set configuration database process 1354 where the configuration database is set. Control is then passed to process 1356 where commands to open are managed by the metadata server. Control is then passed to process 1358 where commands to close a file are managed by the metadata server. Control is then passed to process 1360 where commands to create a file are managed by the metadata server. Control is then passed to process 1362 where commands to delete a file are managed by the metadata server. Control is then passed to process 1364 where commands to flush any cache data of a file to commit it to stable storage or flush it to a disk file are managed by the metadata server. Control is then passed to process 1366 where commands to lock a file are managed by the metadata server. Control is then passed to process 1368 where commands to unlock a file are managed by the metadata server. Control is then passed to process 1370 where commands to get attributes of a file are managed by the metadata server. Control is then passed to process 1372 where commands to set the attributes of a file are managed by the metadata server. Control is then passed to process 1374 where directory services are managed by the metadata server. Control is then passed to process 1376 where the subroutine is exited.

Figure 10I:
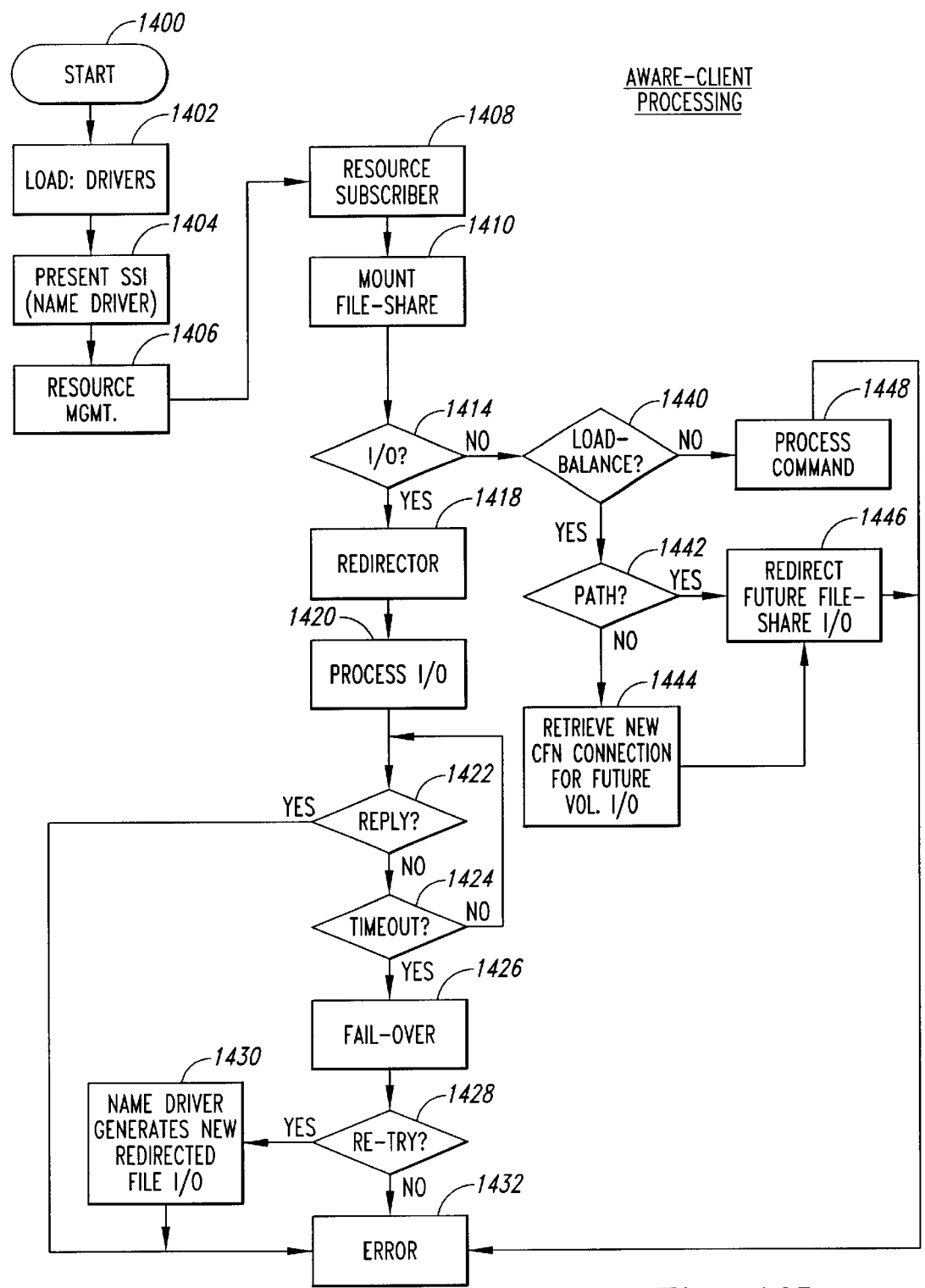

FIG. 10I describes the process flow of an aware client 102A–B (see FIGS. 1A, 2B), commencing at start block 1400. Control is passed to process 1402 in which the aware client is booted and the modules shown in FIG. 2B are loaded. Control is then passed to process 1404 in which the name driver module 194 is activated. The name driver will contain a single system image (SSI) of all network resources and all available paths to those resources through available nodes. To create the SSI control is passed to process 1406 in which the name driver calls the resource manager module 186 (See FIG. 2B). The resource manager module is responsible for managing the information about distinct resources available on the network and connection information associated with each. Control is then passed to process 1408 in which the resource subscriber module 182 (See FIG. 2B) is activated. The resource subscriber gathers resource information from the network and presents it to the resource manager. The name driver thus builds a table of all available resources and available paths to the resources. Control is then passed to process 1410 in which the available resources are made available for use by the aware client (see FIG. 6). Control is then passed to decision process 1414. In decision process 1414 the command processing module 192 (see FIG. 2B) determines whether the client is handling an I/O request. If the command being processed is an I/O request then control is passed to process 1418. In process 1418 the redirector module 184 (see FIG. 2B) is responsible for converting the I/O request for a file system into a path specific request to a node/server. The redirector module 184 accesses the resource management module 186 (see FIG. 2B) which in turn accesses the name driver module 194 to determine the actual path. The redirector receives a direction from the name driver module 194 as to where it actually should direct the I/O in question. Control is then passed to process 1420 in which the I/O request is sent out over the network to be executed. Control is then passed to decision process 1422 in which a determination is made as to whether a response to the request has been processed. If the response has been processed control returns to decision process 1414 for the processing of the next I/O request. Alternately, if the response has not yet been processed then control passes to decision process 1424 in which a determination is made as to whether a timeout interval for the receipt of a response has expired. If a determination in the negative is reached, i.e. that the time-out interval has not expired then control is returned to process 1422. Alternately, if the time-out interval has expired control is passed to process 1426. In another embodiment of the invention process 1424 could initiate client load rebalancing when a client detects a delay differential from its normal response time from the server.

In process 1426 further attempts at processing the I/O request along alternate paths are initiated. In process 1426 the fail-over module 188 (see FIG. 2B) is activated to get a new path for the I/O request from the name driver module 194 (see FIG. 2B). The name driver updates the SSI by tagging the old path as invalid and selecting an alternate path to the resource that is the subject of the I/O request, i.e. the oldest redirected path becomes the current new path. Control is then passed to decision process 1428. In decision process 1428 a determination is made as to whether a retry is appropriate. This decision can for example, be based on the availability of an alternate path or the number of retry attempts, or the time interval for processing the I/O request. If a retry is appropriate control is passed to process 1430. In process 1430 the new path is provided in the form of an I/O request for the same file system via an alternate path. Additionally, the failed node is recorded as such and periodically the connection is check to see if it has been reestablished by failing-back. If at a future time a failed node is determined to have failed-back it is marked as such so that it may be considered as a valid path in the future (see FIGS. 4A–B). Control is then returned to decision process 1414 for processing of the redirected I/O request with the new, redirected, path information. If alternately, in decision process 1428 a determination is reached that a retry is not appropriate then control passes to process 1432. In process 1432 an error indication is given. Control then returns to decision process 1414 for processing of the next command.

If, alternately in decision process 1414 a determination is made that the command being processed is not an I/O request, then control is passed to decision process 1440. In decision process 1440 a determination is made as to whether the request is a load balance request. If that determination is in the negative then control is passed to process 1448. In process 1448 the command is subject to traditional client server processing subsequent to which processing control returns to decision process 1414. If, alternately, it is determined in decision process 1440, that load balancing is requested then control is passed to decision process 1442. In decision process 1442 a determination is made as to whether the redirect command is accompanied by a redirect path (see FIGS. 7A–D). If the redirect packet contains a redirect path control passes to process 1446.

If, alternatively, the redirect packet does not contain a redirect path then control passes to process 1444. In process 1444 the new path is determined on the basis of the abstract mapping maintained by the name driver module 194 (see FIGS. 2B, 4C–D). Process 1444 can implement alternate embodiments of which the decision to redirect 110 is determined by any valid path or getting utilization information (via table read or individual node queries) and using said utilization information to intelligently choose a new path. Control is then passed to process 1446.

In process 1446 the abstract mapping of system resources and paths to those resources is updated to reflect the new preferred path from the client to the resource(s). Control then returns to decision process 1414 for the processing of the next command.

Figure 11A:
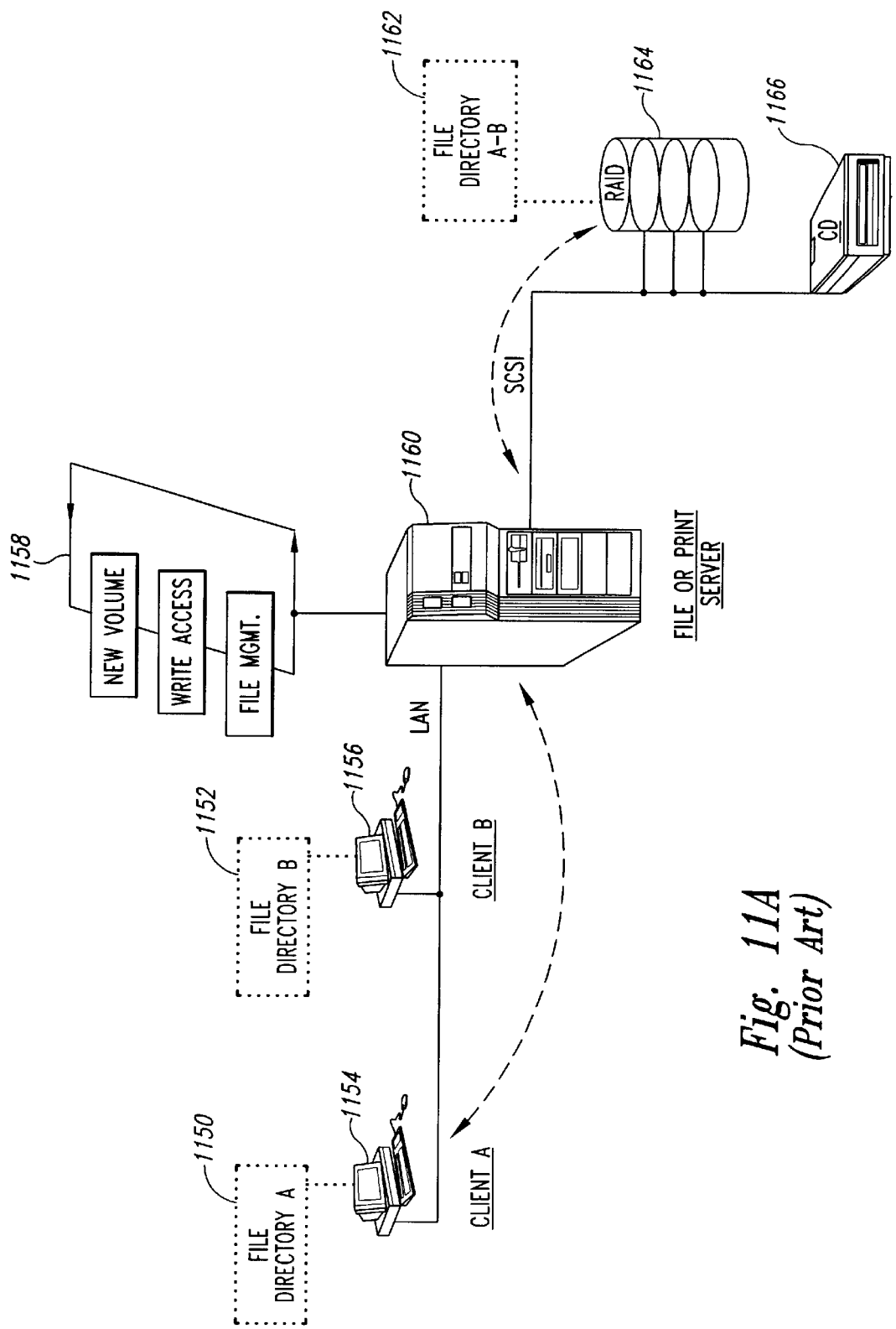
FIG. 11A is a hardware block diagram of a prior art client server network.

A Private Network Embodiment:

FIG. 11A is a hardware block diagram of a prior art client server network. The network comprises clients 1154–1156 [labeled respectively as clients A–B], server 1160 and storage volumes 1164 and 1166. Storage volume 1166 is a compact disk. Storage volume 1164 is a redundant array of disks (RAID). Each storage volume has a file directory associated with it. Storage volume 1164 contains a file directory 1162. Each of clients 1154–1156 contains respectively cache copies 1150–1152 of file directory 1162.

Computers 1154–1156 are connected via a local area network (LAN) to server 1160. Server 1160 is connected to storage volumes 1164 and 1166 by a small computer system interface (SCSI) connection. In order for clients A–B to connect to either of volumes 1164–1166 they must first log an access request with server 1160. In response, server 1160 conducts processes 1158 corresponding to volume management write access and file management in order to maintain the coherency of the storage volumes.

Figure 11B:
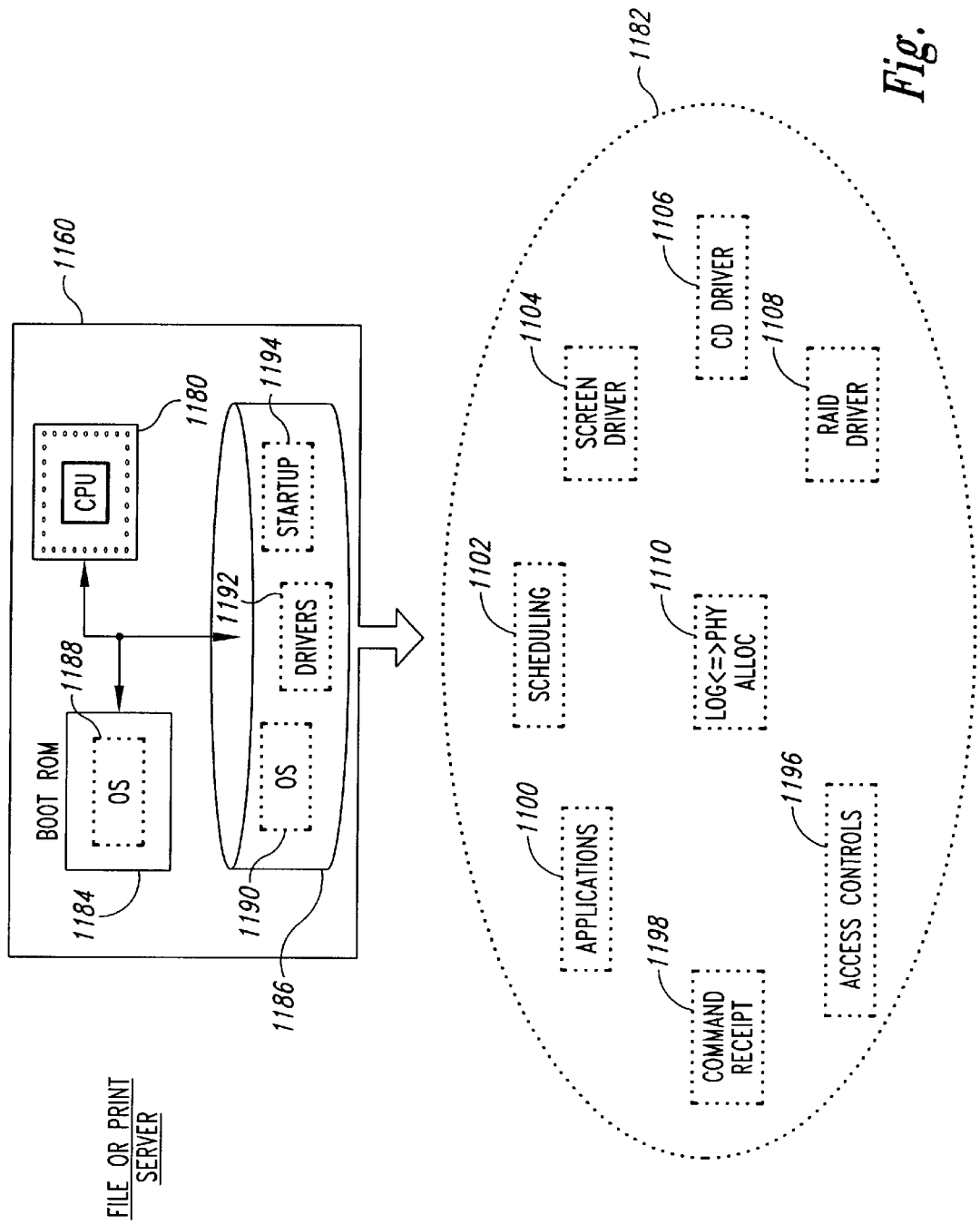
FIG. 11B shows the software modules present on each of the clients shown in FIG. 11A.

FIG. 11B shows the hardware and software modules on server 1160 during power on. Server 1160 comprises a non-volatile memory 1184, a CPU 1180 and a local storage device 1186. Within non-volatile storage device 1184 is a software module identified as the operating system (OS) kernel. Storage device 1186 contains the full OS 1190, associated drivers 1192, and start-up configuration 1194. In operation, at power on, the CPU 1180 initiates the code sequence of the operating system kernel 1188. The CPU then accesses the main operating system 1190 on storage device 1186. In the course of operating system initialization, various drivers 1192 are initialized. These drivers connect the CPU to peripheral devices such as keyboard, monitor, printer, and storage devices. After the operating system is initialized, a start-up file 1194 is implemented which results in one or more applications being enabled.

Shown in software module block 1182, are the software modules which are enabled during power on. The module associated with the OS are the access control module 1196, the command receipt module 1198, the scheduling module 1102 and the logical to physical translation and space allocation module 1110. The modules are the screen driver 1104, the CD driver 1106 and the RAID storage driver 1108. Finally, application module 1100 is enabled by the start-up file 1194.

Figure 11C:
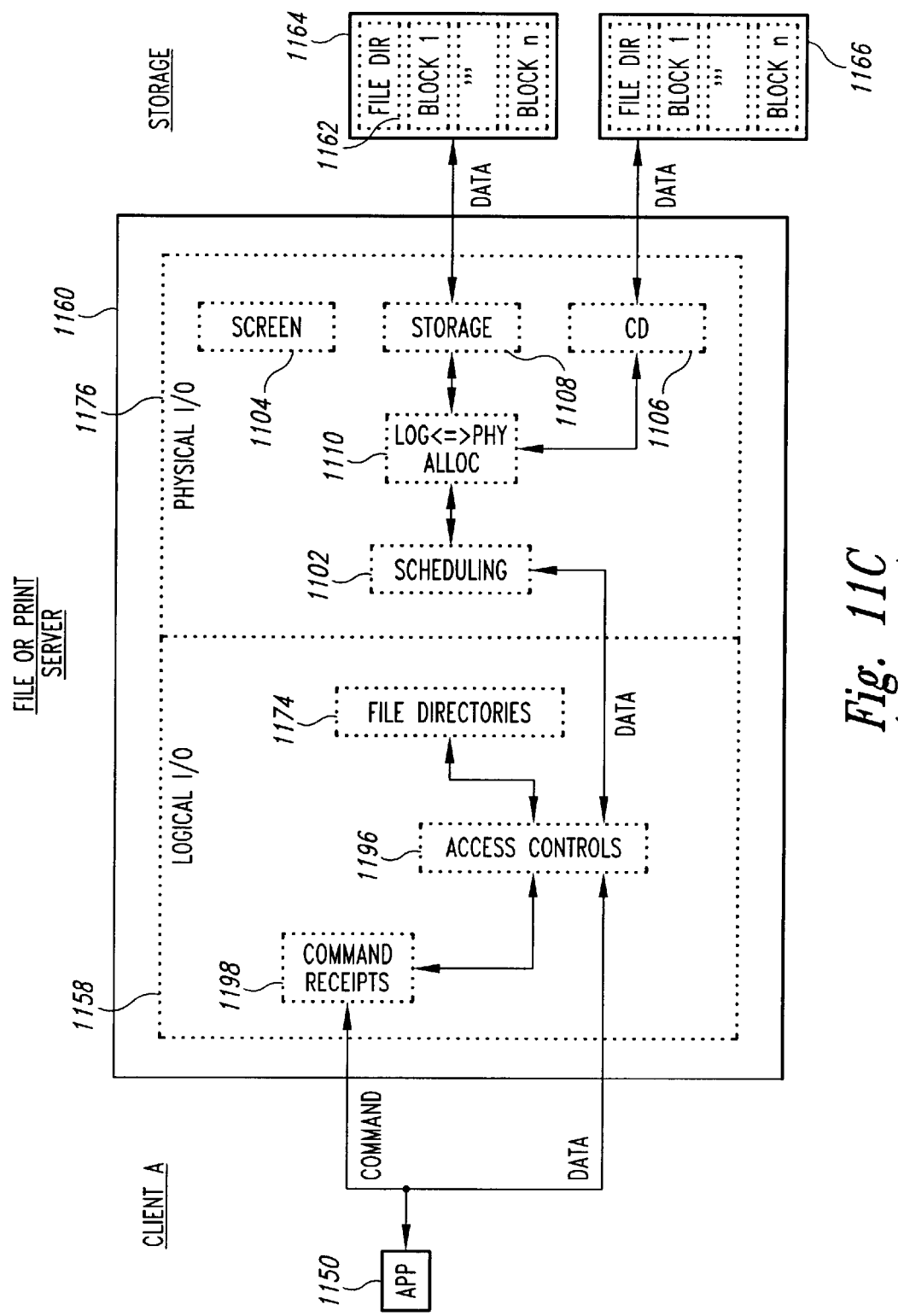
FIG. 11C shows the functional relationship of the modules shown in FIG. 11B.

FIG. 11C is a block diagram showing the functional input output I/O relationship between the software modules shown in FIGS. 11B–C includes a client application 1172 communicating with server 1160, which in turn communicates with either of storage devices 1164 or 1166, as shown initially in FIG. 11A. The file server 1160 comprises a logical I/O block 1178 and physical I/O block 1176. Logical I/O block 1178 comprises command receipt module 1198, access control modules 1196 and file directories 1174. Physical I/O block 1176 comprises scheduling module 1102, logical to physical translation and space allocation module 1110 and drivers 1104–1108 associated with respectively the monitor, the CD and the RAID storage device. RAID storage device 1164 includes a file directory 1162 which contains the directory tree and access rights for all data located on storage device 1164.

In operation, a client application 1172 communicates via server 1160 with either of storage devices 1164 and 1166. Commands received from client application 1172 includes: create, delete, open, close, read, and write. Each of these commands is accompanied by a logical file name. A command is passed from the command receipt module 1198 to the access control module 1196. The access control modules 1196 each interface with a corresponding one of file directories 1174. There is generally one file directory for each physical volume. Additionally a volume could exist accross multiple physical storage devices as in software striping. A physical volume can be a single storage device or a partition on a storage device. A file directory will be discussed in greater detail in connection with FIG. 14, and generally includes a directory tree of logical file names, and access privileges associated with each file name. The access control module 1196 determines on the basis of access privileges contained in file directories 1174 whether or not a specific command should be implemented. For example, if an application command comprises a write request to a file or volume, which is listed as read only, then that request will not be implemented by the access control module. Alternately, when a command is received that the access control module will implement then the data associated with that command is passed directly to the scheduling module 1102. The physical I/O block is the primary interface with the environment outside the computer system. The physical I/O deals with blocks of data that are exchanged with disk or tape systems. Thus, it is concerned with the placement of those blocks on the secondary storage device and with the buffering of those blocks in main memory, the scheduling module is concerned with scheduling disk or tape accesses to optimize performance. I/O buffers are assigned and secondary memory is allocated at this level. From the scheduling module 1102, a command to, e.g., read data from a specific logical location is passed to logical to physical translation and space allocation module 1110. This module is responsible for translating a logical location into a actual physical location on a specific storage device. A file for example, may not be stored on a contiguous portion of a storage device. Instead, it may be stored on fragmented segments. This module then performs the translation of a logical file name to a series of physical segments. This module is also responsible for space allocation. Space allocation in the sense that when a write commands is received the actual physical locations to which the data is written, is determined by module 1110. The final software interface between the server 1160 and the storage device is via an appropriate device driver. Each device driver handles one device type. The device driver is the only part of the operating system that knows how many registers the disk controller has and what they are used for. It alone knows about sectors, tracks, cylinders, head-arm motion, interleave factors, motor drives, head settling times and all other mechanics of making the storage device work properly. In general terms, the job of a device driver is to accept abstract requests from the device-independent software above it and see to it that the request is executed.

Figure 12A:
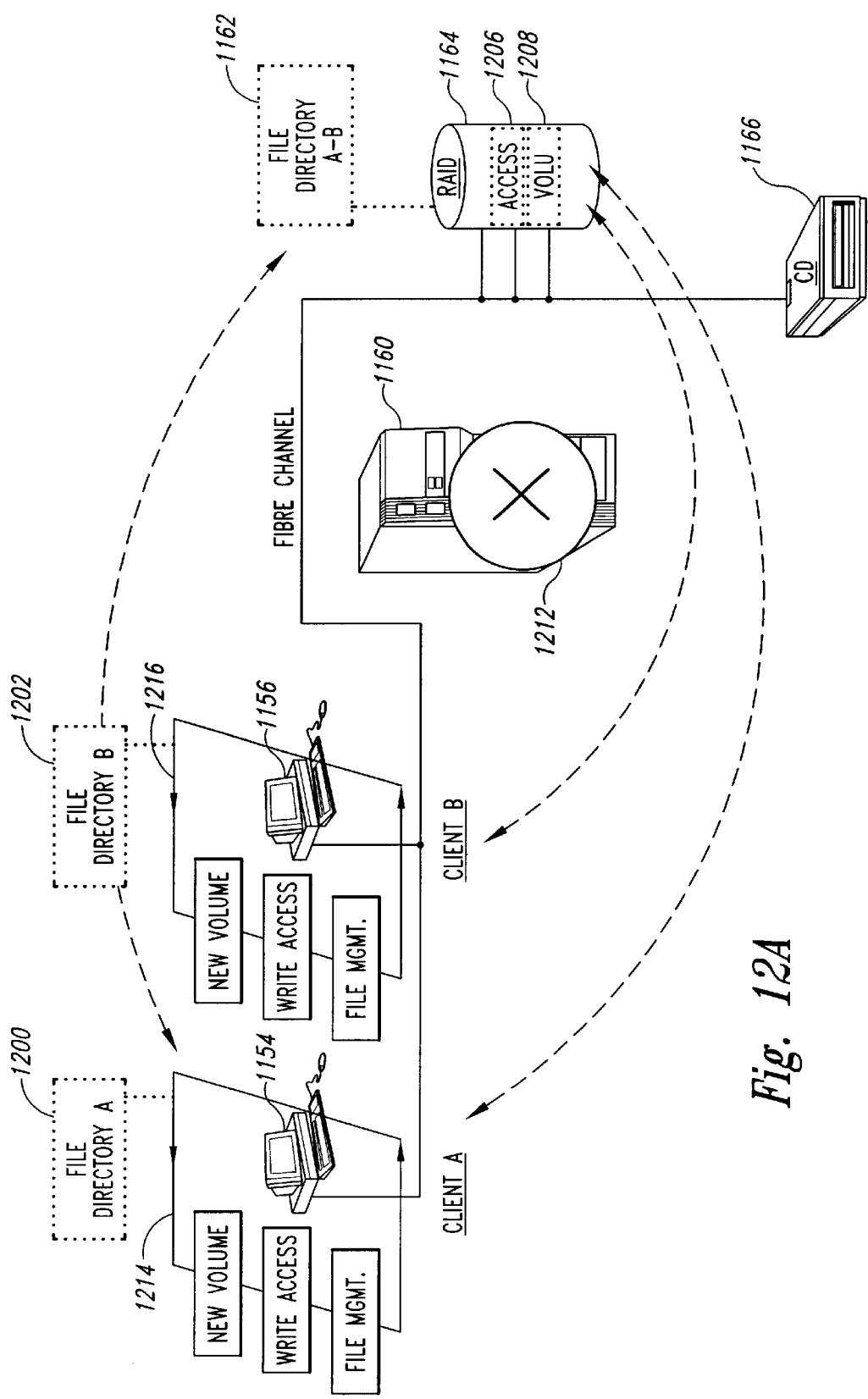
FIG. 12A is a hardware block diagram showing a serverless network connection between multiple clients and shared storage volumes.

FIG. 12A is a hardware block diagram of a preferred embodiment of the current invention in which clients may be directly attached to one or more shared storage volumes, without loss of coherency of the data contained on those volumes. Clients 1154–1156 storage devices 1164–1166 and server 1160 are shown. RAID storage device 1164 includes a file directory 204, an access control table 1206 and a volume control table 1208. Clients 1154–1156 each implement processes for distributed management of storage volumes 1164–1166. Client 1154 implements process 1214 and client 1156 implements process 1216. Clients 1154–1156 include resident copies 1200–1202 of file directory 1162.

Server 1160 as indicated by x marker 1212 is no longer needed in order to service a request from either client 1154 or 1156 to the storage volumes 1164–1166. Instead, clients 1154–1156 are directly connected to storage volumes 1164–1166. In a preferred embodiment the connection is based on either the Fibre Channel ANSI Standard X3.230 and/or the SCSI-3 ANSI Standard X3.270, although other media connection systems may be supported. Other embodiments of the present inention may be adapted to support other methods of connecting the storage 802 and hosts 804, such as embodiments utilizing Fast-40 (Ultra-SCSI), Srial Storage Architecture (SSA), "FireWire" IEEE Standard P1394, Asynchronous Transfer Mode (ATM), or Scalable Coherent Interface (SCI) IEEE Standard 1596–1992, or, some combination of the above, among other possibilities. The fibre channel architecture provides high speed interface links to both serial communications and storage I/O. These links can transmit data using industry standard interfaces at 10 to 1100 times the speed of currently-existing architectures. Fibre channel is part of a very recent revolution in data communications caused by incorporating the serial transmission line, design techniques and technologies into applications and computer architecture that have traditionally used parallel bus-base types of data transport. Transmission lines have superior characteristics for data transport and bus-based designs, allowing signals to be transmitted error-free over greater distances and/or at higher data rates. Fibre channel supports a flexible topology including point-to-point links, packet-switching, and shared-media loop topologies. In a preferred embodiment, a fibre channel network links clients 1154–1156 to both of storage volumes 1164–1166. Storage volume 1164 is equipped with striping software which reads and writes data concurrently across multiple disks. This striping capability allows the bandwidth of the network medium, i.e., fibre channel to be equaled by the bandwidth of the storage device. This is in spite of the fact that individual disks on the storage device can only provide data at a fraction of the bandwidth of the network connection. By striping a file across multiple disks the bandwidth constraints imposed by the physical limits on the head-arm are overcome by allowing multiple disks to operate in parallel to provide data drives.

In order to maintain coherency of the data written by either of clients A or B to storage device 1164, processes 1214–1216 are implemented on respectively clients 1154–1156. Each process controls the mounting of new volumes, write access and file management. In order to write data to the storage device 1164, a client must first have determined that a write condition exists within both the access control table 1206 and the volume control table 1208 on the shared storage volume. When that condition is determined to exist, the client may write to the storage volume. When that condition does not exist a write request is denied. In a preferred embodiment, the access control table and volume control table reside on a separate volume on a physical storage device which has both a read and write capability. Thus, the access and volume control tables need not and, in fact, normally would not, reside on the same physical device to which they are controlling access. Instead, each of processes 1214 and 1216 utilizes the shared access and volume control tables to determine when and under what conditions they may write to any one of a number of volumes to which they may be attached.

Figure 12B:
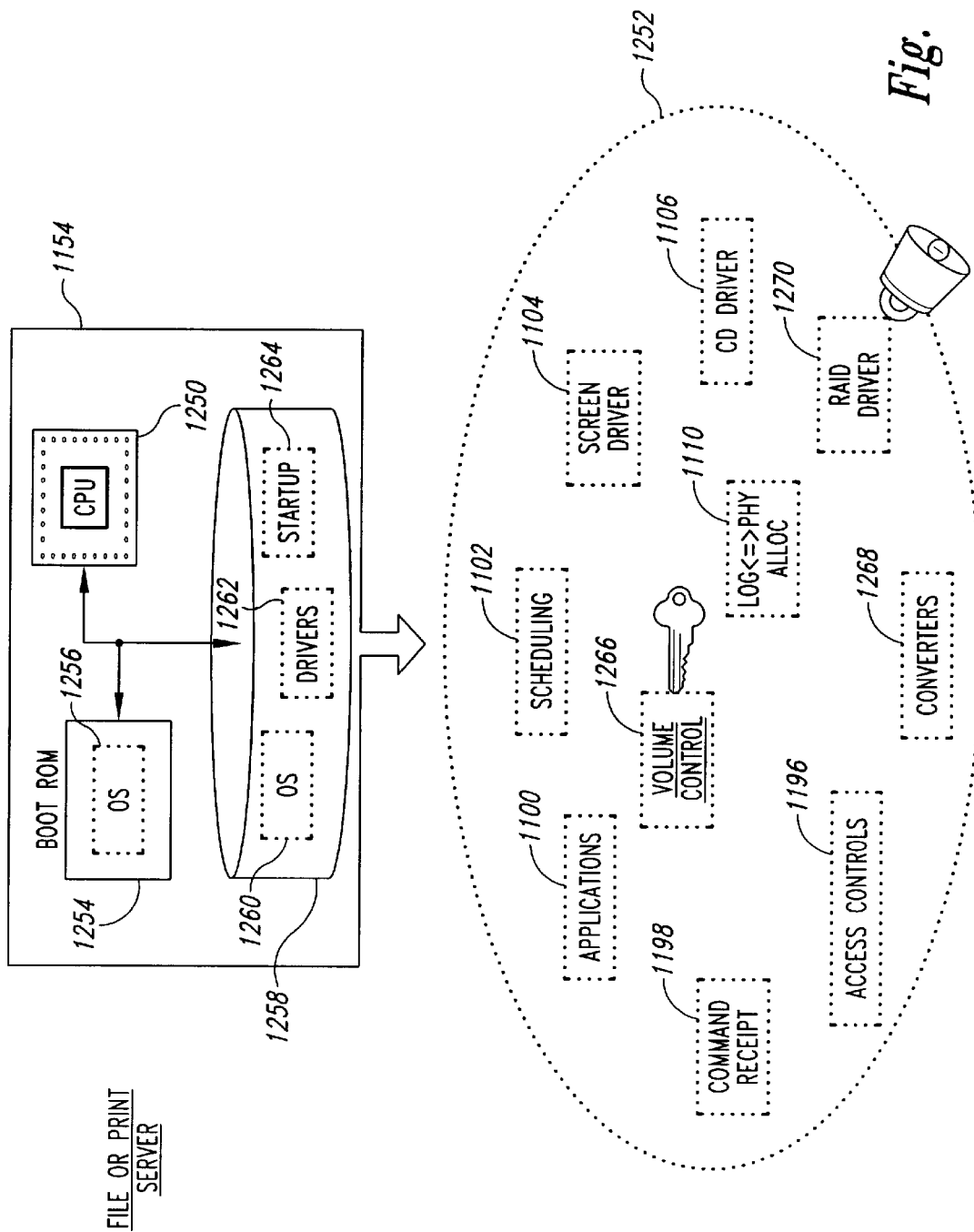
FIG. 12B shows the software modules present on each client of FIG. 12A.

FIG. 12B is a hardware software block diagram of client 1154. Client 1154 comprises CPU 1250 non-volatile memory 1254 and local storage device 1258. Non-volatile 1254 comprises an ISO 1256. Nonvolatile memory 1258 comprises the main OS 1260 device drivers 1262 and start-up files 1264.

At power on CPU 1250 uploads the OS kernel from boot ROM 1254 and reads the remaining portion of the operating system 1260 from the local storage device 1258, e.g., a disk drive. During the latter stages of the operating system enablement, device drivers 1262 and start-up file 1264 are enabled. Software module block 1252 shows the software modules that are enabled during the power on. During the enablement of the operating system 1260, the command receipt module 1198, the access control modules 1196, the scheduling module 1102, the logical to physical translation and space allocation module 1110, and the converter modules 1268 are enabled. During the enablement of the device drivers 1262, the screen driver 1104, the CD driver 1106 and the RAID driver 1270 are enabled. During the initiation of the start-up file, the volume control application 1266 and a resident application 1100 are enabled.

Figure 12C:
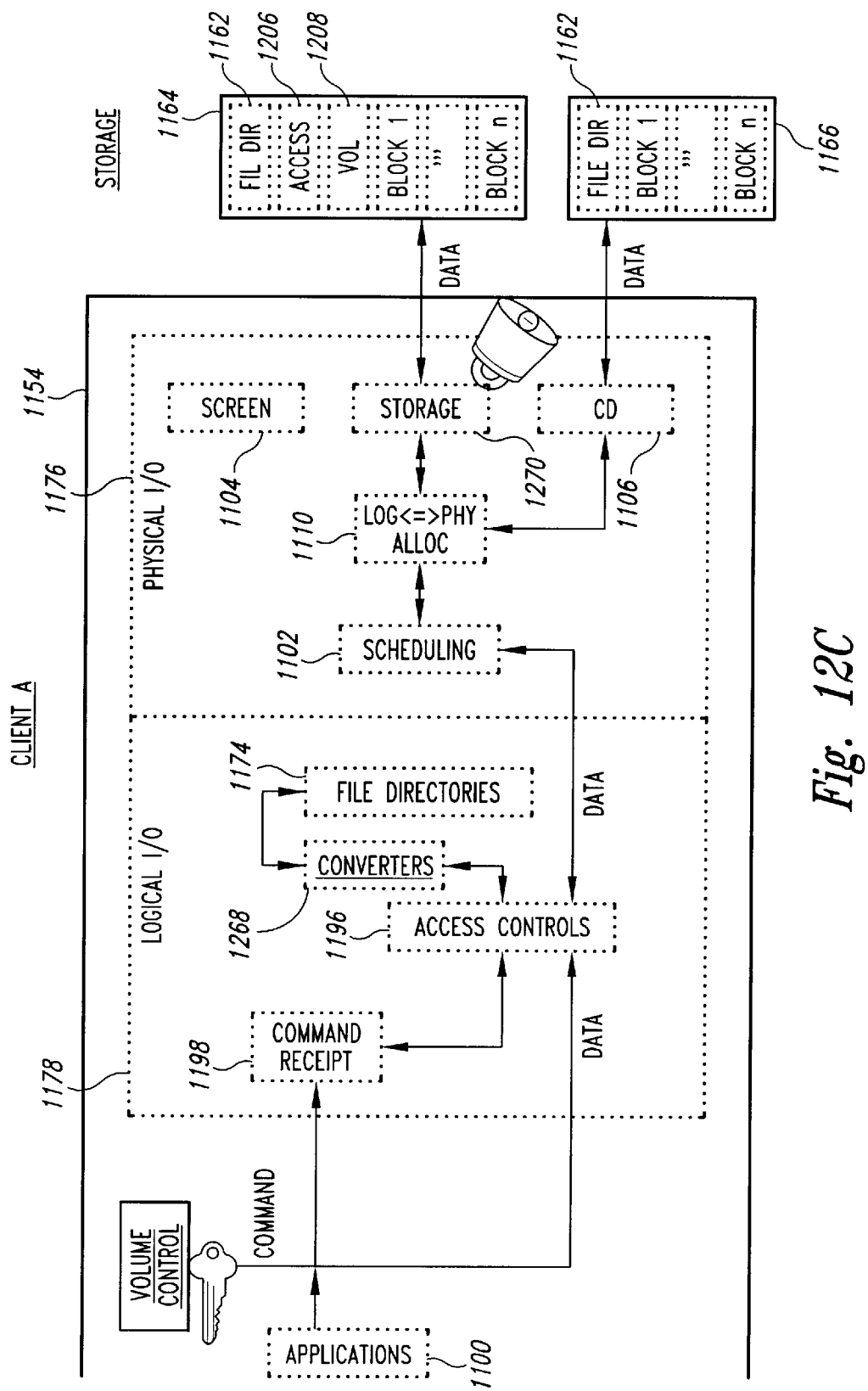
FIG. 12C shows the functional relationship between the software modules shown in FIG. 12A.

FIG. 12C shows the functional relationship between the software modules enabled during power on and shown in FIG. 12B. Client 1154 and physical storage devices 1164 and 1166 are shown. Physical storage device 1164 includes a file directory 1162, access control table 1206, volume control table 1208 and blocks 1 through N. Physical storage device 1162 includes its own file directory and data blocks 1 through N. Client 1154 includes volume control application 1266, logical I/O block 1178 and physical I/O block 1176. Logical I/O block 1178 includes command receipt module 1198, access control modules 1196, file conversion module 1268 and file directory 1174. Physical block 1176 includes scheduling module 1102, logical to physical translation and space allocation module 1110 and device drivers 1104–1106 and 1270.

In operation, device driver 1270 is not fully enabled during the initialization of the operating system. Thus, the physical device 1164 does not appear to client 1154 to be available, i.e., connected. When volume control 1266 is enabled it sends a series of commands to command receipt module 1198. These commands result in the discovery of the lock storage driver 1270 by the volume control module 1266. In the course of this discovery process, the volume control module also discovers the access and volume control tables 1206 and 1208 on the physical device 1164. During this discovery process any other applications other than the volume control application will not have access to the physical storage device 1164. When the volume control module 1266 has read the access and volume privileges from respectively the access control 1206 and volume control 1208 tables, it then engages in a series of commands designed to write those access privileges to the file directories 1174. For example, if it is determined that the volume control table indicates that client 1154 is to have read/write access to physical device 1164, then the volume control module will issue a mount R/W command, which when received by the command receipt module will cause the file directory 1174 to be updated and to include these privileges. Subsequently, when the file directory 1174 is written back to physical device 1164 then the file directory 1162 resident on the actual physical device 1164 will also be updated. Thus, the access and volume privileges are read from the access and volume control tables and written by the volume control module 1266 to the cached 1174 and physical 1162 file directories. This process can be carried out across multiple physical devices on the basis of an access and volume control table which resides in only one of those devices in the preferred embodiment, however, other locations for these tables are possible.

The remaining module which has not yet been discussed in functional terms, is protocol conversion module 1268. Protocol conversion module 1268 interfaces the access control module 1196 to the file directories 1174, and maintains a uniform file directory structure across heterogenous operating systems, such as may be present on clients 1154 and 1156. Client 1154 for example, may be running a MacIntosh System 7®, operating system while client 1156 may be running Windows NT. The protocol conversion modules 1268 on each of these clients enforce a homogenous file directory structure thus enabling cross platform operation of the current invention. The protocol conversion module 1268 provide a communication rule conversion and command format conversion to the communication rules and command format of the common API. Thus, directories and files can be stored in a data format across multiple operating systems. The format has specific ASCII characters, conventions for file names and specific conventions which will be discussed in greater detail in connection with FIG. 14 for file directory and access control. When the protocol conversion unit receives a command it calls a processing routine within itself which corresponds to the type of command and this processing routine handles the command.

Figure 13A:
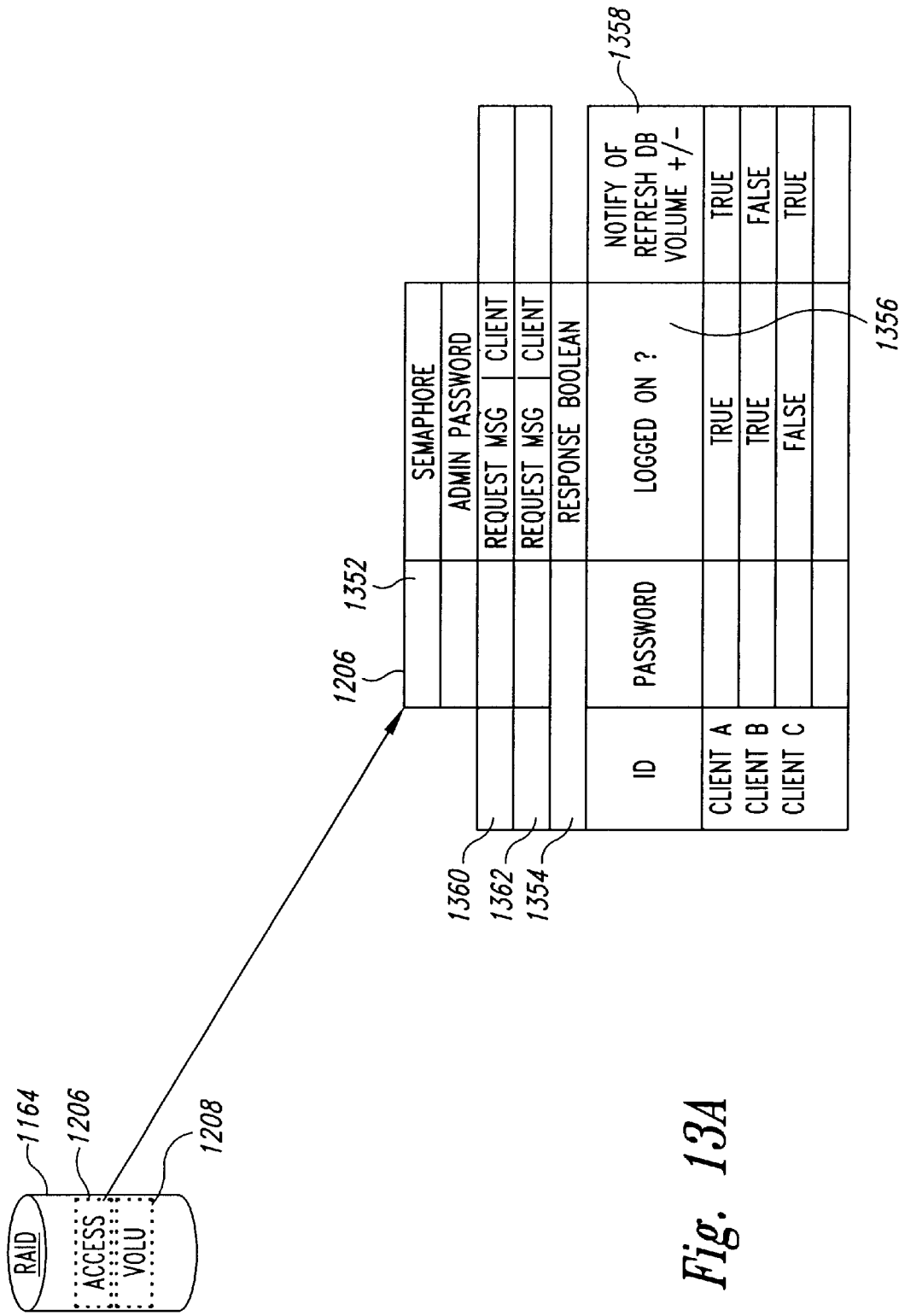
FIG. 13A shows the access control table on the shared storage volume shown in FIG. 12A.

FIG. 13A shows a detailed data structure for the access control table 1206 discussed above in connection with FIGS. 12A–C. Logged on fields 1356 of the access control table indicate which user processes 1214–1216 [see FIG. 12A] are logged onto the access control and volume control tables. Until a user is logged onto the access control table any applications on that client will not be able to access any of the physical devices whose device drivers have a lock control similar to device driver 1270 [See FIG. 12C]. The access and control table also has refresh notification field 1358 associated with each client. A boolean true condition in a field associated with a specific client assures that client will be notified by its resident volume control process, when changes in the access privileges of other users on the system take place. A boolean false has the opposite effect, i.e., no notification will be provided by the volume control process on a client having a boolean false in the refresh notification field of the access control table. The access control table also provide a message passing capability between clients. Field 1360 contains a request message. Field 1362 and 1354 contain respectively, a text based and boolean based response message. Finally, the access control table includes a semaphore field 1352. The presence of a semaphore in the semaphore field indicates that one of clients 1154 or 1156 has seized control of the access and volume control tables 1206–1208 respectively. A client process which has written a identifier in the semaphore field 1352 can alter the privileges associated with each volume and can initiate a change in the write status.

Figure 13B:
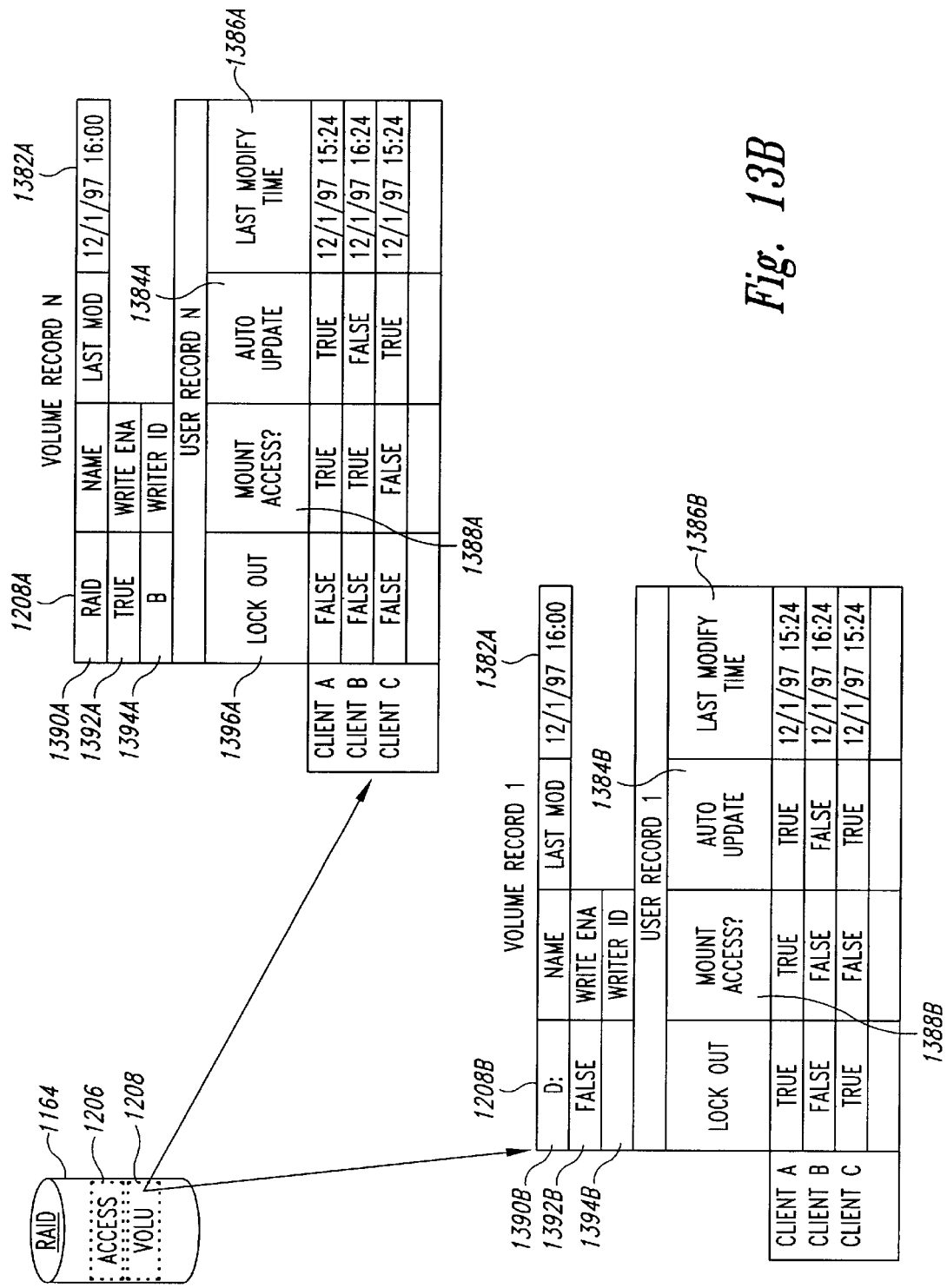
FIG. 13B shows the volume control tables in the shared storage volume shown in FIG. 12A.

FIG. 13B shows the data structures associated with the volume control tables 1208. Specifically, tables 1208A and 1208B are shown. There is one volume control table for each volume, which supports distributed control by multiple writers. The fields within volume control record 1208A are all identified with the suffix "A." The fields identified with volume control table 1208B all contain a "B" suffix. Field 1390 identifies the logical volume associated with a specific volume control table. Field 1390A indicates that RAID storage device 1164 [see FIG. 12A] is associated with volume control table 1208A. Field 1390B indicates that the CD-ROM 1166 [see FIG. 12A] is associated with volume control table 1208B. Field 1392 contains a boolean TRUE/FALSE indicating whether or not a specific volume is write enabled. Field 1392A indicates that the RAID device 1164 [see FIG. 12A] is write enabled. Field 1392B indicates that CD-ROM 1166 [see FIG. 12A] is not write enabled. Field 1394 indicates which client currently has write access to a specific volume. Field 1394–A indicates that client 1154 [see FIG. 12A] currently has write access to RAID storage device 1164. Field 1394B indicates that no client has write access to CD-ROM 1166 [see FIG. 12A]. Field 1388 indicate which clients have mount access privileges for each specific volume. A boolean true indicates that the client can mount the volume. A boolean false indicates the opposite. Field 1396 indicates for each client as to the ability to request a change to its current volume settings. A boolean false indicates a client is not locked out from making change requests such as read-only to read-write (or vise versa). A boolean true indicates a client is locked out from making change requests. Field 1384 is a boolean true/false indicating wether or not a client with read only privileges will be updated when changes are made to the volume by other clients with respect to a specific volume. Fields 1386 are time stamps indicating the last time at which a client received an updated copy of a file directory 1162 [See FIG. 12A]. Field 1382 is a time stamp indicating the last modification time for a specific volume by any client. By comparing the last modification time field 1386 to the volume modification time field 1382 the processes 1214–1216 [see FIG. 12A] can determine when a client with auto update privileges is in need of a file directory refresh.

The following is a listing illustrating the data structures and function calls in another embodiment of the volume and access control tables. The listings depict some of the data structure elements for these tables. The access table comprises a StudioBOSS_DB_Header 14xx and an array of Partition_Volume_Record's 14xx.

Volume DB Header 14xx

The Volume_DB_Header 14xx is stored at the beginning of the Volume Table in a first embodiment of the present invention, although the actual position could vary. A description of each of its fields follows:

Table_Version_Number 14xx

The version number of the table format. Current set to SB_DB_VERSION 14xx. Intended for future compatibility.

Table_Open_Counter 14xx

Keeps track of the number of times the table has ever been opened. Currently used with DEMO copies to determine one of the criteria for expiration of the DEMO version (see SB_DB_OPENS_UNTIL_EXPIRE 14xx).

Table_Write_Lockout_Semaphore 14xx

Set to MAXIMUM_USERS 14xx if table is safe to access. Otherwise, set to the user number who has grabbed the semaphore. If grabbed, the table is not reliable and no changes should be made.

Number_Of_Users 14xx

Total number of users created in the table.

Number Of Volumes 14xx

Total number of volumes in the table.

User_Names[MAXIMUM_USERS 14xx] 14xx

Names of the users in the table in Pascal string format (length byte+characters). NOTE: To find the next name in the list, search the array for the next non-zero length string.

User_Has$_{13}$ Owner[MAXIMUM_USERS 14xx] 14xx

Set TRUE if user valid, FALSE otherwise.

User_Logged_On[MAXIMUM_USERS 14xx] 14xx

Set TRUE if the user is currently logged onto the table, FALSE otherwise.

User_Refresh_DB[MAXIMUM-USERS 14xx] 14xx

Set TRUE if that user needs to be notified of changes made in the table requiring a complete shutdown/restarting of the table file (As when volumes are added or removed with users logged on etc.)

User_Receiving_Request 14xx

User number of the receiving party, otherwise set to MAXIMUM USERS 14xx.

User-Sending-Request 14xx

User number of the sending party, otherwise set to MAXIMUM_USERS 14xx.

Volume_With_Request_Position 14xx
   Index from start of file of the volume record involving the request, 0 otherwise.
Request_Response 14xx
   Set TRUE of the response was positive and the response_Message is valid.
Sender_Message 14xx
   Pascal style string of a message to be sent from the sender to the receiver as part of a request.
Response_Message 14xx
   Pascal style string of the message to be sent from the receiver to the sender as part of a request.
DB_Header_Filler
   Reserved. Should be set to 0.
Partition Volume Record[MAXIMUM VOLUMES 14xx] 14xx
   The Volume_DB_Header 14xx is followed by MAXIMUM_VOLUMES 14xx Partition_Volume_Record's 14xx. A description of each of its fields follows:
Volume_Info 14xx
   The field is a Partition_Volume_Header 14xx record and contains information regarding the next volume in the table. See below for a complete description of its fields.
Users [MAXIMUM_USERS 14xx] 14xx
   This field is an array of Partition_User$_{13}$ Record 14xx records and contains information regarding the up to MAXIMUM_USERS 14xx users of the volume. See below for a complete description of its fields.
Partition Volume Header 14xx
   A description of the Partition_Volume_Header 14xx record fields follows:
Volume_Name 14xx
   Pascal string of the volume's name.
Writer_User_Number 14xx
   User number who has Write access to the volume. If none, then set to MAXIMUM_USERS 14xx.
Volume_Last_Modified_Time 14xx
   Contains the last time the software noticed the volume was changed.
Vol_Header_Filler 14xx
   Reserved. Should be set to 0.
Partition User Record 14xx
   A description of the Partition_User_Record 14xx record fields follows:
User_Number 14xx
   This is the user number in the table. It must be equal to its index into the users[MAXIMUM_USERS 14xx] array.:
Write_Access 14xx
   Set TRUE if the user has read/write access, FALSE otherwise.
Mount_Access 14xx
   Set TRUE if the user wants the volume mounted for access.
Auto_Update 14xx
   Set TRUE if the user wishes to volume to be automatically checked for changes and updated. When FALSE the auto_Update_Check_Seconds 14xx field below is invalid.
Auto_Update_Check_Seconds 14xx
   When auto_Update 14xx is TRUE, this represents the number of seconds that must elapse before the volume will be checked for changes again.
Last_Modified_Time 14xx
   Contains the last time that the user noticed that the volume was changed.
Reserved
   Reserved. Should be set to 0. Located on each host computer is a preference file that consists of a Preference_Record 14xx. The purpose of this information is to allow each host a unique user number inside the Volume table so that each host can log into to the Volume table and have its own set of parameters configured for each file system.
File_Signature 14xx
   This is set to a unique value that indicates the following information is most likely a valid set of data that can be relied upon as a Preference_Record 14xx.
Admin_Expired 14xx
   This is a value, set either to TRUE or FALSE, that indicates if this is an expired DEMO copy of the software.
Total_tables 14xx
   This value indicates the total number of Volume tables that have been configured and found at a previous search. This is the number that will automatically be expected to be found upon net startup.
SB_Process_Ticks 14xx
   This is a time value between times when the Volume File Control software component is invoked to check user events or table changes.
Monitor_DB_Ticks 14xx
   This is the time value that must pass before that Volume File Control software component will check for table changes, such as a request for write access from another user.
User_Name 14xx
   This is a character string, indicating the name of the user that will be searched for upon Volume table logon from which a user number shall be generated and used for later access.
Admin_Password 14xx
   This is a character string, indicating the current password required for access to the administrator functions of the Volume File Control software component for this host.
Volume_Volume_Names[MAXIMUM_Volume] 14xx
   This is an array of character strings, indicating the names of the file system where the Volume File Control software component should search for Volume tables.
Pref_Filler 14xx
   This is a array of bytes that are a place holder for future expansion.
Ignore_Bad_Mounts 14xx
   This is a variable that can be set to TRUE or FALSE that indicates if the user should be informed of errors during mount attempts of file systems that fail.
Lockout_Access_Changes 14xx
   This is a variable that can be set to TRUE or FALSE that indicates if the user is allowed to make changes to the Volume table, such as requests to change read/write privileges. This can be set by the administrator if it is determined that a user should not be able to change any settings.
Keep_DB_Volume_Locked 14xx
   This is a variable that can be set to TRUE or FALSE and indicates if the Volume File Control software component keeps the file system where the Volume table file is located locked or not. It is preferable that this is set to TRUE, but it is not a requirement.
Keep_DB_Volume_Unmounted 14xx
   This is a variable that can be set to TRUE or FALSE and indicates whether the Volume File Control software component should keep the file systems where Volume tables are located unmounted. It is preferable that this is set to TRUE, but it is not a requirement.
   A Volume_Node_Record 14xx is a data structure used by the Volume File Control software component in the form of a linked list, one for each file system to be monitored.

Next_Volume_Node 14xx
This is a variable that is a pointer to the next Volume_Node_Record 14xx in the linked list.
Volume_Reference 14xx
This is a data structure that is a reference to the file system and its internal operating system dependent structures. It is used to reference the file system in order to lock/unlock, mount/unmount and find other information such as free space, last modified time etc.
Volume_Check_Timer 14xx
This variable is a timer that, when expired, indicates it is time to check the volume to see if it needs to be refreshed.
Free_Megabytes 14xx
This variable indicates the amount of free space on the file system.
Volume_Record_Position 14xx
This variable is an indication of the position in the Volume table that describes this file system for this host.
User_Record_Position 14xx
This variable is an indication of the position in the Volume table that indicates this user information for this host.
SN_DB_File Reference 14xx
This variable is a reference data structure used to access the Volume table itself.
Volume_Enabled 14xx
This is a variable, either TRUE or FALSE, that indicates if this file system is enable or disabled. Disabled file systems do not have any of the normal monitoring functions associated with them. This means that diables volumes will not be updated and refreshed if necessary. Normally, volumes are enabled, thus enabling the file system to participate in the system as a normal entity.
Some data structures that are globally useful to the Volume File Control software component are:
SB_Admin_Preferences 14xx
The Preference_File_Record 14xx for this host.
Head_Volume_Node 14xx
A pointer to the beginning of the linked list of Volume_Node_Records 14xx used for searching the list from the start.
Tail_Volume_Node 14xx
A pointer to the end of the linked list of Volume_Node_Records 14xx used for insertion of new records.
Current_Volume_Node 14xx
A pointer to the current Volume_Node_Record 14xx being monitored.
Current_DB_Header_Ptr 14xx
A pointer to the current Volume_DB_Header of the table that is mainlining the current file system being monitored, as indicated by current_Volume_Node 14xx
Current_DB_Volume_Header_Ptr 14xx
A pointer to the current Partition_Volume_Header 14xx beloning to the current file system being monitored.
Current_DB_User_Record_Ptr 14xx
A pointer to the current Partition_User_Record 14xx belonging to the current file system being monitored.
SB_Process_Timer 14xx
A timer, that when expired, indicates that is is time to check the next file system.
Monitor_DB_Timer 14xx
A timer, that when expired, indicates that is sis time to check for any pending table requests.
Administration$_{13}$ Mode 14xx
A variable, either TRUE or FALSE that indicates when the Volume File Control software component is operating with administrator functions available to the user.
Restart_Volume 14xx
A variable, either TRUE or FALSE, that indicates if is time to shutdown and restart the system by logging out of all tables, and relogging back in.
Suspend_Operations 14xx
A variable, either TRUE or FALSE, that indicates if all file system and table monitoring should be suspended.

Figure 14:
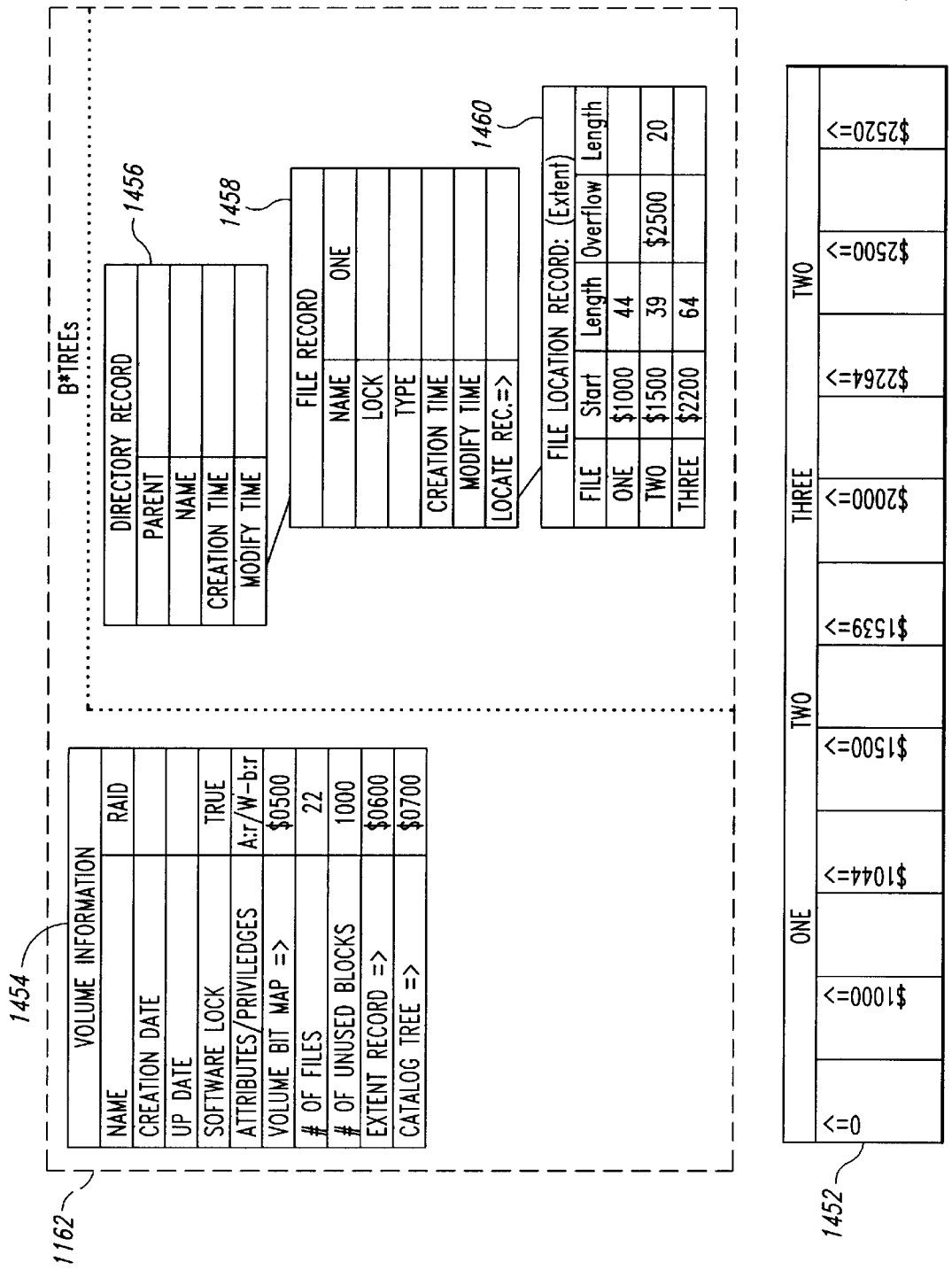
FIG. 14 shows an example of a file directory structure for the shared storage volume shown in FIG. 12A.

FIG. 14 is a detailed data structure diagram for a uniform file directory format which can be implemented on both clients A–B utilizing the current invention. This directory structure can be maintained, not withstanding the operating system on each client by the protocol conversion modules 1268 discussed above in FIG. 12C. Shown on FIG. 14 are the file directory 1162 and a physical address map 1452 for the storage device 1164. File directory 1162 comprises a volume header 1454, a directory record 1456, a file record 1458 and a file location record (Extent) 1460. This directory structure is generally associated with the HFS file directory format associated with the System 8 operating system provided with the MacIntosh® computers. The volume header 1454 contains the name of the volume, its creation date, its update date, a software lock, a listing of attributes and privileges, a volume availability bit map, and a number of other parameters broadly defining the physical volume. Associated with the volume record 1454 are a plurality of directory records of which record 1456 is referenced. Each directory record includes a pointer to a parent directory, a name, a creation time and a modification time. Next are the plurality of file records associated with each directory of which file record 1458 is referenced. Each file record contains a name, a type, a lock indicator, a creation and modification time and other file level information. Associated with each file and directory record are a plurality of file location records of which record 1460 is referenced. Each file location record includes a pointer to the physical address at which the file starts and an indication as to the length of the file. If a file is stored in noncontiguous segments, then there will be an overflow indicator indicating the physical address of the next portion of the file and the length of that portion. As indicated in the physical address record 1452, the file location record addresses and address lengths correspond to the actual physical address locations of the file contents. For example in file location record, 1460 file ONE is listed as starting at physical address 1000, having a length of 44 sectors. In the physical address record 1452, file ONE begins at a physical memory address 1,000 and extending up to physical address 1044, for a total length of 44 sectors. Each operating system has its own file directory structure differing in numerous aspects from the one disclosed in FIG. 14. In a preferred embodiment of this invention discussed above in FIG. 12C protocol conversion modules 1268 associated with each of client processes 1214–1216 enforce a uniform file directory format notwithstanding the operating system on each client. This assures that there is cross-platform compatibility between any application on either of the clients notwithstanding the OS that may be present on the client. Thus, a client running a MacIntosh System 8® operating system can read or write a file created by another client operating with a Windows NT™ operating system.

FIGS. 15A–E show the processes 1214–1216 associated with respectively clients A and B as shown in FIG. 12A Each client implements all the capabilities shown in FIGS. 15A–E.

Figure 15A:
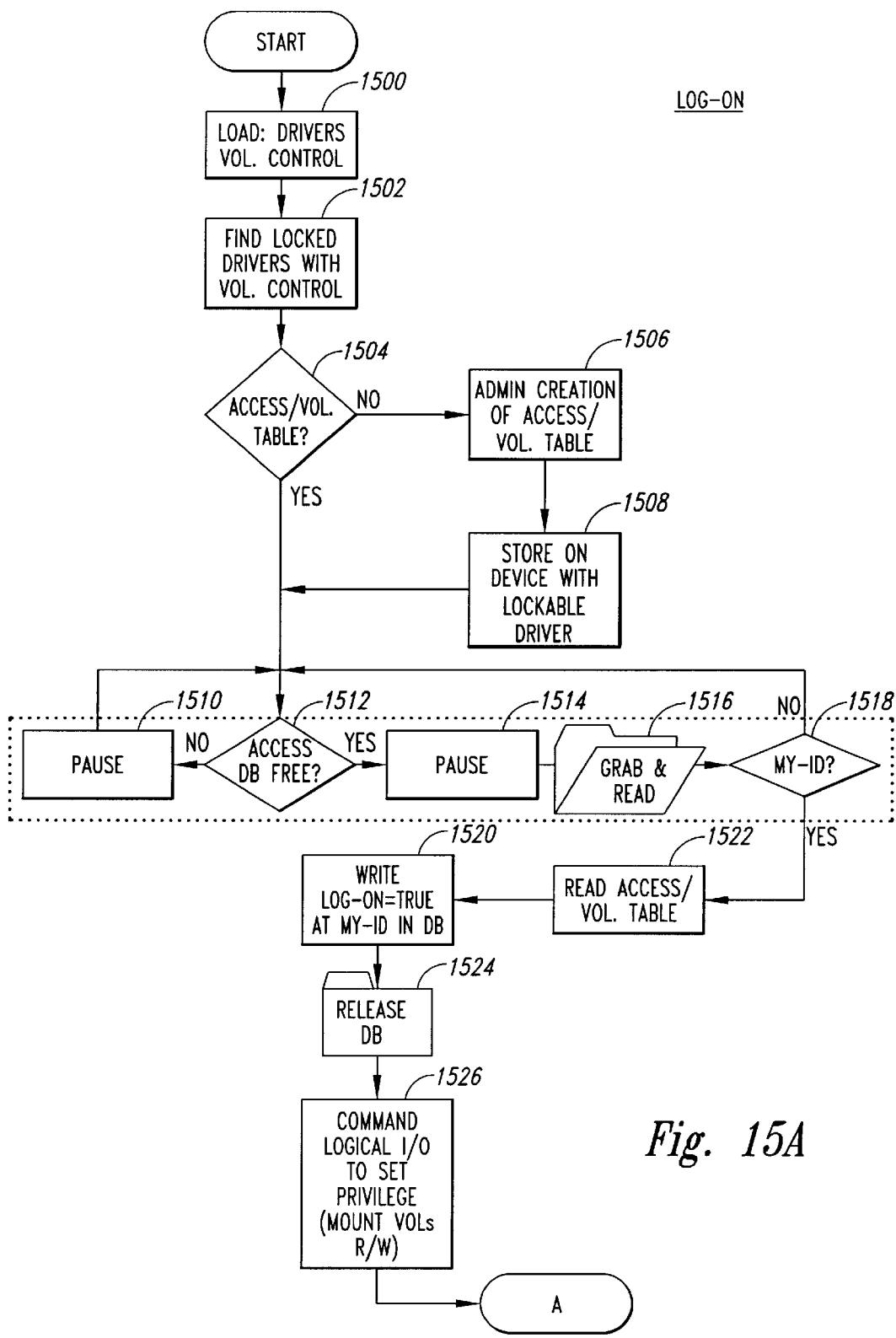
FIGS. 15A–E show the processes for allowing multiple clients to share read and write access to a shared storage volume.

The processes associated with power up and log on are shown in FIG. 15A. Commencing with process 1500, the device drivers and the volume control processes are loaded to the client. Control then passes to process 1502 in which device drivers which have been customized to include the locking feature are located. In addition, specific device driver connected to the physical volume which contains the volume and access control tables [see FIG. 12C] is identified. Control then passes to decision process 1504. In decision process 1504, a determination is made as to whether a volume and access control table has been created. If that determination is in the negative, then control passes to process 1506 in which the volume control. process presents to an administrator a template on which to create an access and volume control table. Control is then passed to process 1508 in which the newly created access and volume control tables are stored on a volume with a customized, i.e., lockable driver. Control then passes to decision process 1512. Alternately, if in decision process 1504, a determination in the affirmative is reached, i.e., that a volume control table does exist, then control passes directly to decision process 1512.

In decision process 1512, a determination is made as to whether the semaphore field 1352 [see FIG. 13A] is empty. In the event this determination is in the negative, control passes to processes 1510 for the introduction of a delay after which delay interval control returns to decision process 1512. When an affirmative determination is reached in decision process 1512, i.e., that the semaphore field 1352 of the access control table 1206 [see FIG. 12A] is empty then control passes to process 1514. In process 1514, the client identifier is written to the semaphore field. Control then passes to process 1516 in which the client who has seized the access and control table reads the access and control tables. Control then passes to decision process 1518. In decision process 1518, a determination is made as to whether the client identifier in field 1352 is the I.D. of the client running the process. In the event that determination is in the negative, the client has not seized control of the access and volume tables. Therefore, control returns to decision process 1512. If in the affirmative, a determination is made in decision process 1518 that a client has seized control of the access and control table then control passes to process 1522. In process 1522, the client reads the access and volume control tables. Control is then passed to process 1520. In process 1520, the client writes their I.D. in the corresponding log on field 1356 [see FIG. 13A] in the access control table 1206. Control then passes to process 1524. In process 1524, the client releases the access and control tables by removing their identifier from the semaphore field 1352. Control then passes to processes 1526 in which the access control module 1266 [see FIG. 12C] sets the access privileges for each physical device in accordance with those privileges indicated in the access and control table for the specific client running this process. As discussed above in FIG. 12C, these privileges are set by the volume control process sending mount volume commands to the command receipt module 1198, which are accompanied by either a read or read/write privilege. Control then passes to splice block A.

Figure 15B:
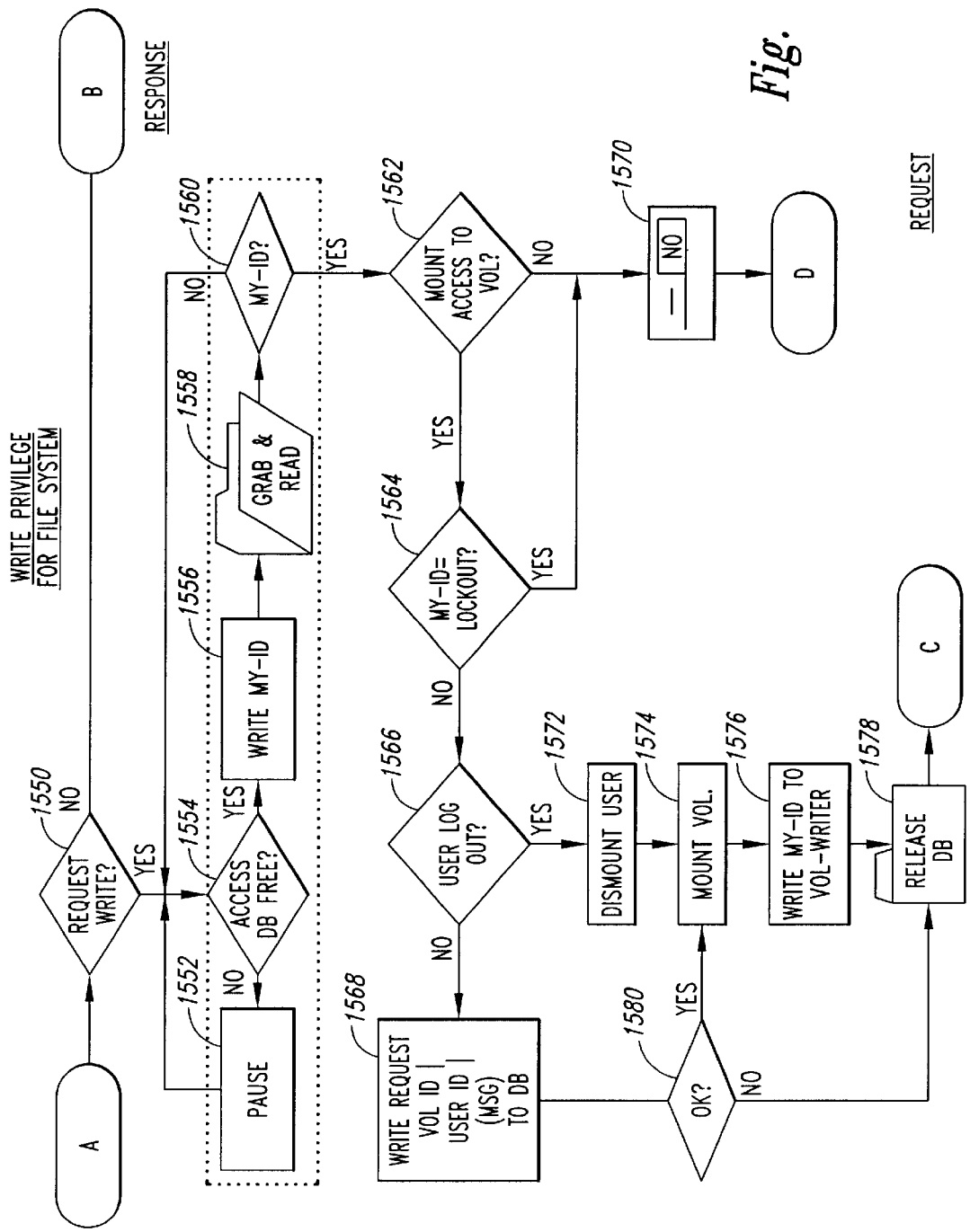

FIG. 15B shows the processes conducted on a client associated with requesting a write privilege for a file system or volume. Beginning at splice block A, control passes to decision process 1550. In decision process 1550, a determination is made as to whether a write to request has been received by the volume control process 1266 [see FIG. 12C]. This write request can be received at any time by the volume control process via a graphical user interface (GUI). The GUI allows a user to select a specific volume with respect to which the user has read privileges and to request that those privileges be altered to write privileges. Alternatively a write request can be made programatically via another process. If a determination in the negative is reached, i.e., that no write to request has been received or generated by the volume control process, then control passes to splice block D. Alternately, if in decision process 1550 an affirmative determination is reached, then control is passed to decision process 1554. In decision process 1554, a determination is made as to whether a semaphore is present in field 1352 in the access control table [see FIG. 13A]. In the event this determination is in the negative, control passes to process 1552 for the introduction of a pause. Control then returns to decision process 1554. When an affirmative determination is reached in decision process 1554, control passes to process 1556 in which a write command is issued and the identifier for the client running the process is written to field 1352. Control is then passed to process 1558. In process 1558, the value for field 1352 is read. Control is then passed to decision process 1560. In decision 1560, a determination is made as to whether the value in field 1352 corresponds to the client I.D. of the client running the process. In the event that determination is in the negative control returns to decision process 1554. Alternately, if a determination in the affirmative is reached in decision process 1560, then control passes to decision process 1562. In decision process 1562, a determination is made on the basis of the mount access field 1388 [see FIG. 13B] as to whether this particular client can mount the volume to which the write to request is directed. If this determination is in the negative, then control passes to process 1570 in which a notification is given that the write to request has been denied. Control then passes to splice block D. Alternately, if in decision process 1562 a determination is reached that the volume is mountable with respect to this particular client running the process, then control passes to decision process 1564. In decision process 1564, a determination is made on the basis of fields 1396 [see FIG. 13B] as to whether this client can obtain write access to the specific volume or whether the client is locked out of request access. If a determination is reached in the affirmative, i.e., that the client cannot obtain write access then control passes to process 1570 discussed above. Alternately, if a determination in the negative is reached in decision process 1564, i.e., that the client is not locked out from obtaining write access to the volume then control passes to decision process 1566. In decision process 1566 a determination is made on the basis of field 1394 [see FIG. 13B] and fields 1356 [see FIG. 13A] as to whether the current writer has in fact logged off the network. If that determination is in the affirmative, then control passes to process 1572 in which a dismount command is issued for the volume. Control is then passed to process 1574 in which a mount volume command is sent by the volume control process 1266 [see FIG. 12C] to the command receipt module 1198. This causes the volume to be mounted reflecting the most recent changes. Control then passes to process 1576 in which field 1394 [see FIG. 13B] in the volume control table is updated with the I.D. of the client running the process. Control then passes to process 1578 in which the client releases the access and volume control tables by removing their semaphore, i.e., I.D. from the semaphore field 1352 [see FIG. 13A] of the volume control table. Control then passes to splice block C.

Alternately, if in decision process 1566 a determination is made that the current writer has not logged out then control passes to process 1568. In process 1568, a write request is written to the request field 1360 [see FIG. 13A] of the access control table. This request includes an identifier of the volume to which the write request is directed; the identifier of the client making the request; and a textual message from the requester. The identifier of the volume to which the write request is directed is read from field 1394 of the volume record. The text message can be manually entered in a GUI interface provided by volume control process 1266 [see FIG. 12]. Control then passes to decision process 1580. In decision process 1580, the response message and response boolean fields respectively 1362 and 1354 [see FIG. 13A] are read and the determination is made on the basis of those fields as to whether the write privilege has been relinquished by the current writer. In the event that determination is in the affirmative, control passed to process 1574 discussed above. Alternately, if that determination is in the negative, then control passes to process 1578 in which the current requestor removes their I.D. from the access control table semaphore field 1352 [see FIG. 13A] control then passes to splice block C.

Figure 15C:
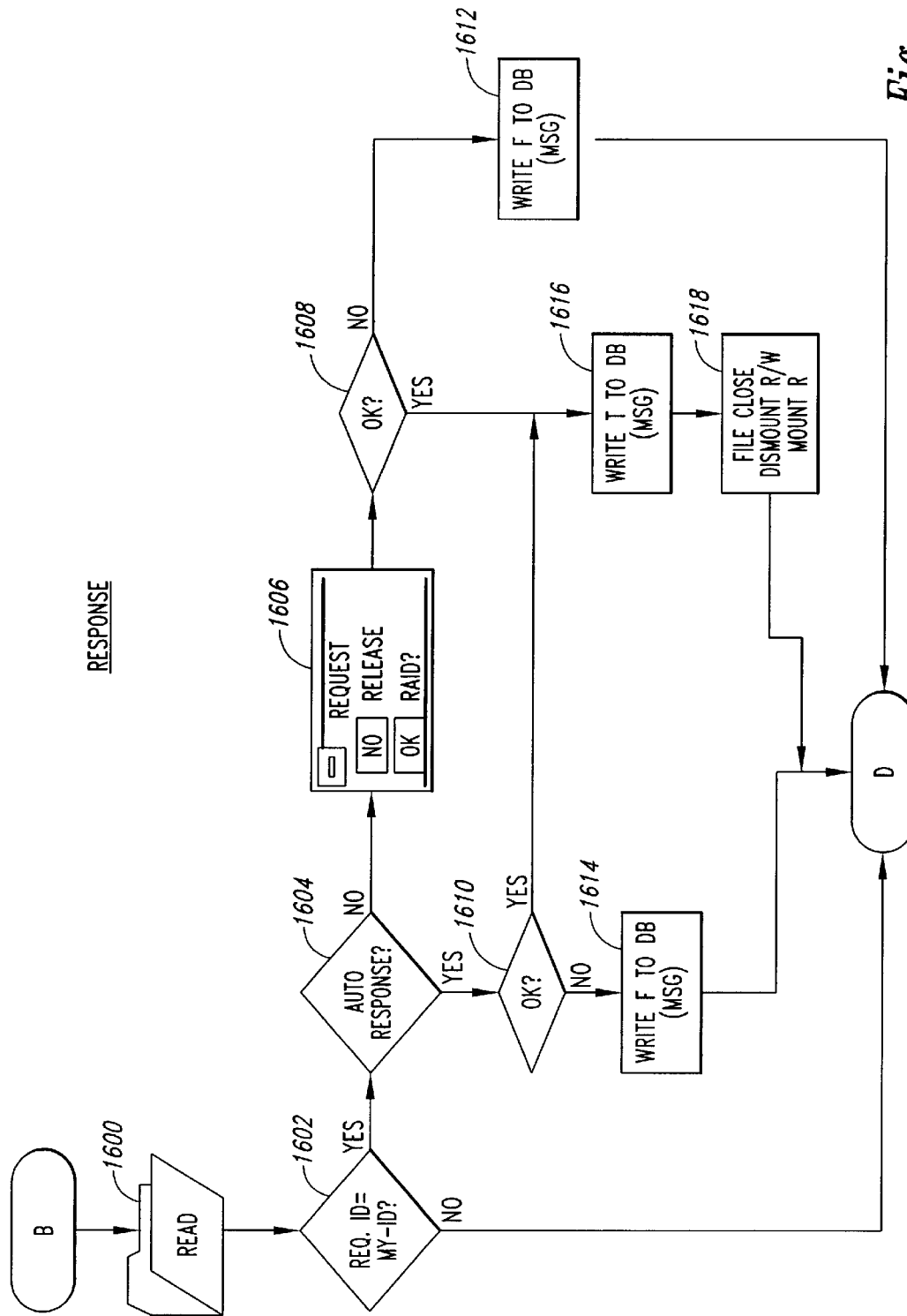

FIG. 15C shows the processes connected with a response to another client requesting write access privilege. Process portion begins at splice block B and control is passed to process 1600. In process 1600, the access control table and specifically request message field 1360 [see FIG. 13A] is read. Control is then passed to decision process 1602. In decision process 1602, a determination is made as to whether the client I.D. associated with the request corresponds to the I.D. of the client running the process. If a determination in the affirmative is made, i.e., that the client running the process is the client to which the request is directed then control is passed to decision process 1604. In decision process 1604 a determination is made as to whether an auto response capability has been enabled for this specific client. In a preferred embodiment, this determination could be made on the basis of yet another field entry in the access control table 1206 [see FIG. 13A]. There would in this embodiment be a field corresponding to each client in which a boolean true condition would indicate that auto response had been enabled and a boolean false condition would indicate that it had not been enabled. If a determination is made in decision process 1604 that auto response has been enabled, then control would pass directly to decision process 1610. In decision process 1610, a determination would be made on the basis of the current processing on the client as to whether control could be relinquished at this time. If for example, the client was in the middle of conducting a large rendering project, decision in the negative might be reached. In the event that such a determination was reached, control would be passed to process 1614. In process 1614, the responding client would write a boolean false condition in the response message field 1362 [see FIG. 13A] of the access control table. Control would pass to splice block D.

Alternately, if in decision process 1602 a determination is made that the client I.D. associated with the request was not the client I.D. running the process, then control would pass directly to splice block D.

Alternately, in decision process 1604, if a determination is made that the request was being made of a client running process (process block 1602 YES) and further that auto response feature had not be enabled, then control would pass directly to process 1606. In process 1606 a message prompt is presented by GUI portion of volume control process 1266 [see FIG. 12C] to the user. The user would be given the alternative of answering the request yes or no, and including in the response a text based message. This response would be written to the response message and boolean response fields respectively, 1362 and 1354 [see FIG. 13A]. Control is then passed to decision process 1608. In decision process 1608 a determination is reached as to whether the user has relinquished write privilege. If that determination is in the affirmative, then control passes to process 1616. In decision process 1610, if a determination is made that write control cannot be relinquished at the current time, then control is also passed to process 1616. In process 1616, the boolean true condition is written to the access control table and specifically boolean response field 1354 [see FIG. 13A]. This indicates that the client receiving the request and currently having write privileges is about to release those privileges. Control is then passed to process 1618. In process 1618 any files on the requested volume are closed and the volume is dismounted as to read and write access and remounted in a read only access mode. Control is then passed to splice block D.

Alternately, if in decision process 1608 a determination is made that the user has chosen not to relinquish write access privilege for the requested volume then control passes to process 1612. In process 1612 a boolean false condition is written to the access control table and specifically boolean response field 1354 thereof [see FIG. 13A]. Control is then passed to splice block D.

Figure 15D:
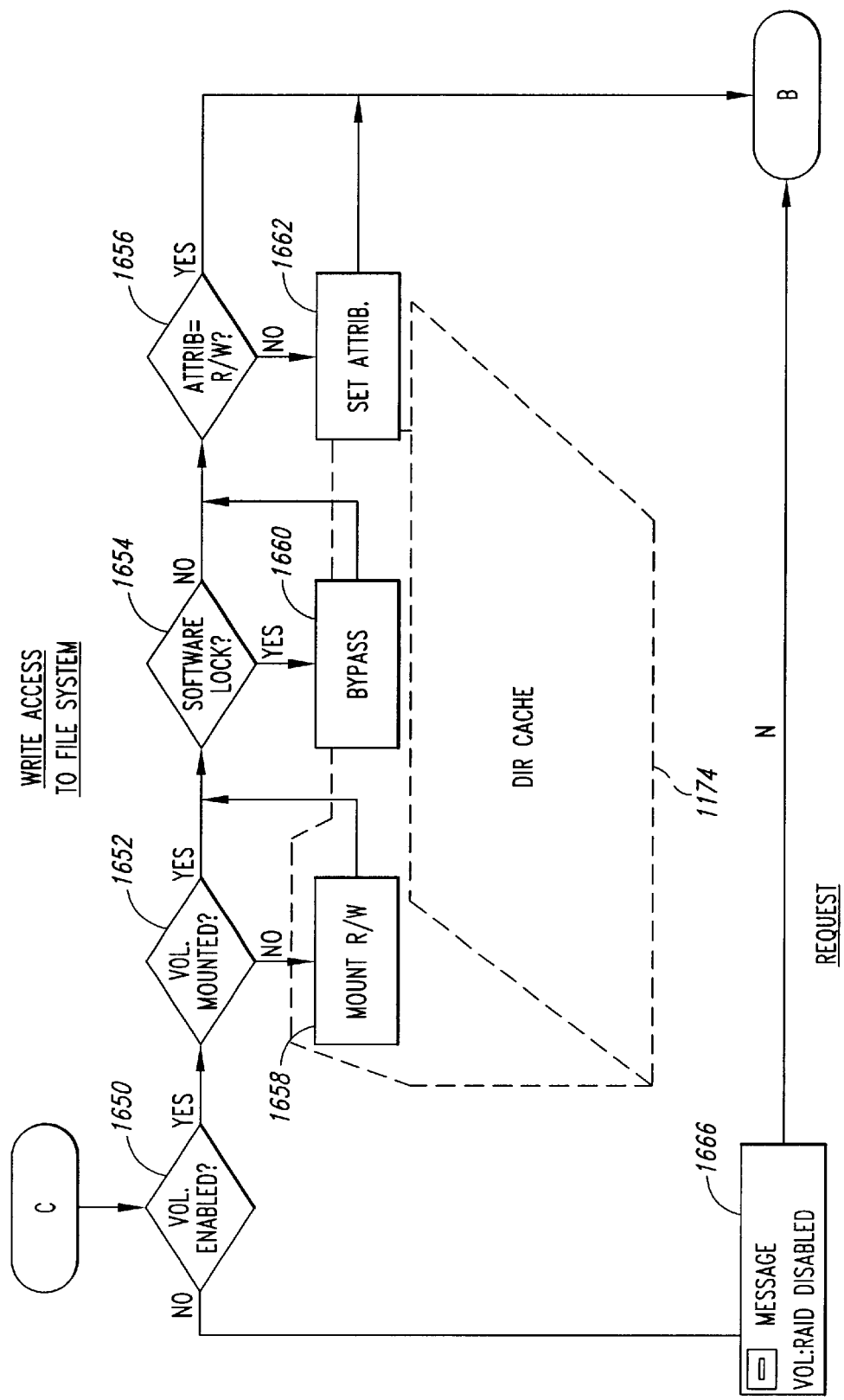

FIG. 15D shows the portion of the processes connected with converting a write privilege into actual write access to a file system. Process portion begins at splice block C where control is passed to decision process 1650. In decision process 1650 a determination is made on the basis of field 1392 in the volume control table [see FIG. 13B] as to whether the volume to which the write to request is directed is in fact enabled. If this determination is in the negative, then control is passed to process 1666 in which a message is delivered to the user by the GUI interface portion of volume control process 1266 [see FIG. 12C] indicating that the volume is disabled and write access cannot be provided. Control is then passed to splice block B. Alternately, if in decision process 1650 an affirmative determination is reached, i.e., that the volume to which the write to request is directed is in fact enabled, then control passes to decision process 1652. In decision process 1652, a determination is made as to whether the volume is mounted for the client running the process. If that determination is in the negative, then control is passed to process 1658 in which the volume control process 1266 [see FIG. 12C] sends a mount command with read write privileges to the command receipt module 1198 [see FIG. 12C]. This results in the volume being mounted with read write privileges. Control is then passed to decision block 1654. Alternately, if in decision process 1652, an affirmative determination is reached, i.e., that the volume is mounted with either read or read/write privilege then control is also passed to decision process 1654. In decision process 1654, a determination is made as to whether a file directory level a software lock bit is enabled as to this specific volume and whether that software lock bit precludes access to the volume. In the event that determination is in the affirmative, then control is passed to process 1660. In process 1660 the software lock and file directory is either bypassed or disabled. In a preferred embodiment, it is preferable to bypass the software lock. This has the benefit of preventing clients on the network which do not have the volume control process form inadvertantly accessing the controlled volume. Control is then passed to decision process 1656 Alternately, if in decision process 1654 determination is reached either that no software lock exists at the file directory level or that the software lock at the file directory level can be bypassed by the commands of the volume control process 1266, then control is passed directly to decision process 1656.

In decision process 1656, a determination is made as to whether the volume is currently mounted with read and write privileges. In the event that the determination is in the negative, control is passed to process 1662 in which the volume control process 1266 sends a volume dismount followed by a volume mount R/W for the requested volume to the command receipt module 1198 [see FIG. 12C]. This has the effect of remounting the volume with read write privileges as to this client. Control is then passed to splice block D. Alternately, if in decision process 1656 a determination in the affirmative is reached, i.e., that a volume is mounted and mounted with read write privileges, then control passes directly to splice block B. The changes in the file directory brought about by the processes of FIG. 15D are first evidenced in the cached copy 1174 of the file directory corresponding to the volume to which write access is provided [see FIG. 12C]. The cached copy updates are then flushed back or written back to the file directory on the physical device 1164 which results in a coherent set of file directories in which the new access privileges are evidenced.

Figure 15E:
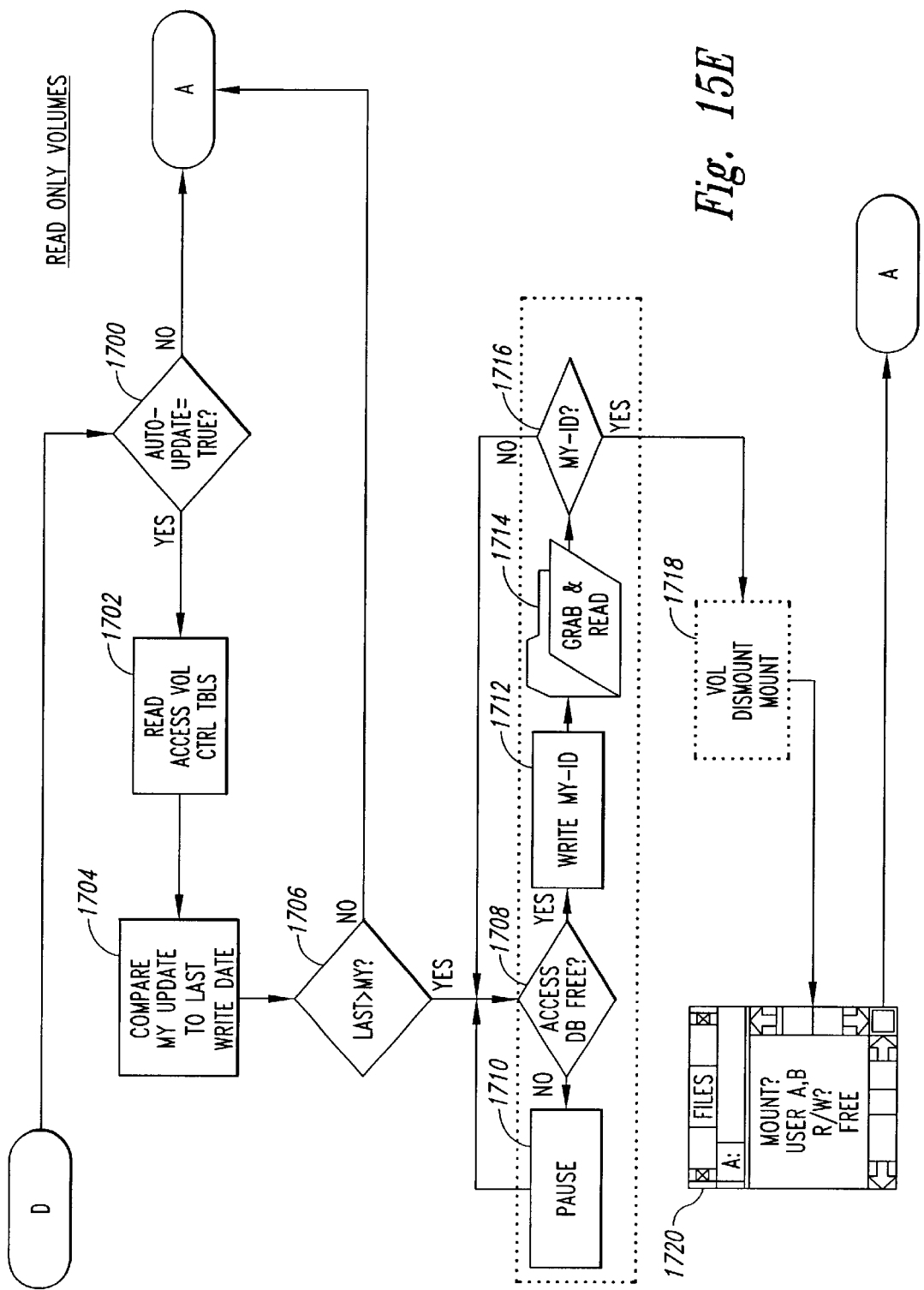

FIG. 15E includes that portion of the processes associated with read only volumes. A client mounted in a read only state to a volume will not be updated as to changes in the file directory that might take place with respect to that volume, i.e., when writes are conducted to that volume to other clients on the system. For those clients, therefore, which want auto updating capability, the processes of FIG. 15E provide that capability. The processes begin at splice block D where control passes to decision block 1700. In decision block 1700, a determination is made on the basis of fields 1384 [see FIG. 13B] of the volume control table as to whether any of the volumes to which the client is currently connected in a read only state, are indicated for auto updating. As to each of those volumes, the last modify time field 1386 [see FIG. 13B] for this particular client is read in process 1702 and compared with field 1382 [see FIG. 13B]. The Purpose of this Process is as Follows.

Normally a client with read only priviledges to a volume, will not refresh their local, cached, copy of the file directory for the volume. As a result the copy can become stale, i.e. either showing directories/files that no longer exist, or not showing directories/files that do exist. It is therefore important that clients with read only access be able to have the option of having their cached directory copies periodically refreshed when other clients make changes to the volume. This refresh and update option is provided by field 1384[see FIG. 13B]. The determination as to whether a refresh/update is needed is made in process 1704–1706 to which control is next passed. In process 1704, a comparison is conducted between the time stamps for the last volume change, i.e. field 1382, and the last time the client conducted a dismount and mount in order to get a fresh copy of the file directory, i.e. field 1386. In decision process 1706, a determination is made as to whether the clients cached directory copy is stale. In the event this determination is in the negative, the client contains the most recent copy of the file directory resident on the volume. Control therefore passes to splice block A since no updating is necessary. Alternately, if in decision process 1706 an affirmative determination is made, i.e., that the cached file directory 1174 [see FIG. 12C] is stale, then control is passed to decision process 1708. In decision process 1708, a determination is made as to whether the access control database semaphore field 1352 [see FIG. 13A] is empty. In the event this determination is the negative control is then passed to process 1710. In process 1710, a pause is introduced after which control returns to decision process 1708. Alternately, if in decision process 1708 a determination is made that the semaphore field 1352 is available, then control is passed to process 1712 in which the client I.D. is written to the semaphore field in the access control table 1206 [see FIG. 13A]. Control then passes to process 1714 in which the semaphore field portion of the access control table is read and control is then passed to decision process 1716. In decision process 1716, a determination is made as to whether the client I.D. present in the semaphore field is identical to the I.D. of the client conducting this process. If that determination is in the negative, then the client has not seized control of the access control table and processing returns to decision process 1708. Alternately, if a determination in the affirmative is reached, i.e., that the client has seized control of the access control table, then control passes to process 1718. In process 1718, a volume dismount command followed by a mount with read access only command is sent by the volume control process 1266 [see FIG. 12C] to the command receipt module 1198. This results in an updated copy of the file directory 1174 being displayed in process 1720 to the user. The user display may include information as to all volumes and the status of all clients with respect to those volumes; i.e. mount/dismount, read only, read/write, locked/unlocked. Control then passes to splice block A.

The foregoing description of embodiments of the present invention has been presented for purposes of illustration and description only. It is not intended to be exhaustive or to limit the invention to be forms disclosed. Obviously, many modifications and variations will be apparent to practitioners skilled in the art.

What is claimed is:

1. A method for load balancing a network, the network comprising a number of server computers that serve I/O requests directed by a number of client computers to resources via the server computers, each server computer receiving I/O requests from client computers, the resources initially served by at least two server computers, each resource associated with an administrative server computer that carries out an administrative portion of each I/O request directed to the resource, the method comprising:

receiving at a first server computer an I/O request directed to a resource;

carrying out the I/O request by the first server computer and, when the first server computer is not an administrative server computer for the resource, by an administrative computer assigned to the resource;

determining by the first server computer that the first server computer has exceeded a utilization threshold; and re-directing by the first server computer subsequent I/O requests directed to the resource by at least one client computer to an alternate server computer that serves I/O requests for the resource, wherein the at least one client computer needs to send the subsequent I/O requests directly to the alternate server computer.

2. The method of claim 1 wherein the I/O request is a read request for obtaining a data set on the resource.

3. The method of claim 1 wherein determining that the first server has exceeded a utilization threshold is performed on at least one of the client computer and the first server computer.

4. The method of claim 1 wherein re-directing subsequent I/O requests directed to the resource by at least one client computer to an alternate server computer that serves I/O requests for the resource is performed by at least one of the client computer and the first server computer.

5. The method of claim 1 wherein determining that the first server has exceeded a utilization threshold further comprises:

determining that the first server computer has exceeded a utilization threshold, wherein the utilization threshold comprises at least one of a fixed threshold utilization and a calculated threshold utilization.

6. The method of claim 5 wherein the utilization threshold is one of:
   a percentage of the I/O bandwidth of the first server computer; and
   a percentage of the processing capacity of the first server computer.

7. The method of claim 5 wherein re-directing subsequent I/O requests directed to the resource by at least one client computer to an alternate server computer that serves I/O requests for the resource further comprises:
   determining a second server computer that serves the resource;
   ascertaining that utilization of the first server computer exceeds utilization of the second server computer;
   sending a redirect message from the first server computer to the client computer containing an indication of the second server computer;
   receiving the redirect message by the client computer; and
   altering state information on the client computer to direct subsequent I/O requests to the second server computer.

8. The method of claim 1 wherein determining that the first server has exceeded a utilization threshold further comprises:
   tracking each of the number of server computers to determine a utilization for each of the number of server computers;
   detecting a second server computer that serves I/O requests directed to the resource;
   ascertaining that utilization of the second server computer is less than utilization of the first server computer; and
   re-directing subsequent I/O requests from the client computer directed to the resource to the second server computer.

9. The method of claim 8, wherein tracking each of the number of server computers to determine a utilization for each of the number of server computers further comprises:
   determining for each of the number of server computers a corresponding utilization; and
   updating for each of the number of server computers a corresponding entry in a file for storing utilization indications for the network.

10. The method of claim 9 wherein ascertaining that utilization of the second server computer is less than utilization of the first server computer further comprises:
    reading the file to detect that utilization of the second server computer is less than utilization of the first server computer.

11. The method of claim 10 wherein a corresponding entry in a file for storing utilization indications for the network is periodically updated at an interval recorded in the file.

12. The method of claim 1 further comprising:
    forming a single system image by the client computer showing all available paths through the number of server computers to the resource.

13. The method of claim 12 wherein re-directing subsequent I/O requests directed to the resource by at least one client computer to an alternate server computer that serves I/O requests for the resource further comprises:
    correlating, in the single system image, the resource with indications of all corresponding server computers that serve I/O requests directed to the resource;
    tagging each of the indications of corresponding server computers with a time tag indicating a time at which a redirect command was last received by the client computer from the server computer; and
    selecting as the alternate server computer the server computer having an indication tagged with a time tag earlier in time than the other indications of server computer.

14. The method of claim 13 further comprising:
    updating the single system image to exclude from among the indications of server computers those server computers that become unavailable for serving I/O requests and to include within the indications of server computers those server computers that becomes available for serving I/O requests.

15. A computer usable medium having computer readable program code for carrying out the load balancing method of claim 1.

16. A method for recovering from server computer failures in a network, the network comprising a number of server computers that serve I/O requests directed by a number of client computers to resources via the server computers, the resources initially served by at least two server computers, each resource associated with an administrative server computer that carries out an administrative portion of each I/O request directed to the resource, the method comprising:
    sending an I/O request directed to a resource from a client computer to a first server computer;
    determining that an I/O failure occurred on the first server computer; and
    re-directing subsequent I/O requests directed to the resource from the client computer to an alternate computer, wherein the client computer needs to send the subsequent I/O requests directly to the alternate computer.

17. The method of claim 16 further comprising:
    forming a single system image at the client computer showing all available paths through the number of server computers to the resource; and
    updating the single system image to exclude from all available paths those paths that include the first server computer.

18. The method of claim 17 further comprising:
    updating the single system image to include among the available paths all paths that include the first server computer when the first server computer becomes available.

19. The method of claim 18 further comprising the acts of:
    correlating, in the single system image, the resource with indications of all corresponding server computers that serve I/O requests directed to the resource;
    tagging each of the indications of corresponding server computers with a time tag indicating a time at which a redirect command was last received by the client computer from the server computer; and
    selecting as the alternate server computer the server computer having an indication tagged with a time tag earlier in time than the other indications of server computer.

* * * * *